(12) United States Patent
Forte et al.

(10) Patent No.: US 10,412,117 B2
(45) Date of Patent: Sep. 10, 2019

(54) METHOD AND SYSTEM FOR AUTOMATED CYBERSECURITY INCIDENT AND ARTIFACT VISUALIZATION AND CORRELATION FOR SECURITY OPERATION CENTERS AND COMPUTER EMERGENCY RESPONSE TEAMS

(71) Applicants: Dario V. Forte, Torre de' Picenardi (IT); Michele Zambelli, Cremona (IT)

(72) Inventors: Dario V. Forte, Torre de' Picenardi (IT); Michele Zambelli, Cremona (IT)

(73) Assignee: DFLABS S.P.A., Milan (IT)

( * ) Notice: Subject to any disclaimer, the term of this patent is extended or adjusted under 35 U.S.C. 154(b) by 352 days.

(21) Appl. No.: 14/521,328

(22) Filed: Oct. 22, 2014

(65) Prior Publication Data

US 2016/0044061 A1 Feb. 11, 2016

Related U.S. Application Data

(60) Provisional application No. 62/033,543, filed on Aug. 5, 2014.

(51) Int. Cl.
*G06F 16/901* (2019.01)
*G06F 16/904* (2019.01)
(Continued)

(52) U.S. Cl.
CPC ............ *H04L 63/20* (2013.01); *G06F 3/0482* (2013.01); *G06F 3/04817* (2013.01);
(Continued)

(58) Field of Classification Search
CPC ......... G06F 17/30014; G06F 17/30017; G06F 17/2235; G06F 17/30873; G06F 3/04817;
(Continued)

(56) References Cited

U.S. PATENT DOCUMENTS 5,590,250 A * 12/1996 Lamping ............... G06T 11/206
345/427
5,619,632 A * 4/1997 Lamping ............... G06T 11/206
345/441
(Continued)

FOREIGN PATENT DOCUMENTS

WO 2001025935 A1 4/2001

OTHER PUBLICATIONS

Handbook for Computer Security Incident Response Teams (CSIRTs). Handbook [online]. Software Engineering Institute Carnegie Melon University, Apr. 2003 [retrieved on Dec. 22, 2016]. Retrieved from http://resources.sei.cmu.edu/library/asset-view.cfm?assetid=6305.*

(Continued)

*Primary Examiner* — David S Posigian
(74) *Attorney, Agent, or Firm* — Browdy and Neimark, P.L.L.C.

(57) ABSTRACT

A method and system is provided for visualizing and navigating cybersecurity information. A hypertree is displayed on a display device of a computerized system. The hypertree includes a plurality of nodes linked by edges, one or more of the nodes representing cybersecurity incidents, and one or more of the nodes representing elements or artifacts of cybersecurity incidents, the edges representing a specific relationship between the nodes linked by the edges. The computerized system displays an interactive navigation aid to enable a user to navigate the hypertree, and receives a navigation command from the user through the interactive navigation aid. The computerized system modifies the displayed hypertree in response to the navigation command. The navigation command comprises selective elimination or restoration of edges or nodes on the hypertree so as to enable the user to readily visualize interrelationships between the (Continued)

displayed nodes that are significant to a cybersecurity investigation or response.

14 Claims, 49 Drawing Sheets

(51) Int. Cl.
| | | |
|---|---|---|
| G06F 9/451 | (2018.01) | |
| G06F 16/954 | (2019.01) | |
| G06F 3/0481 | (2013.01) | |
| G06F 3/0482 | (2013.01) | |
| G06F 3/0484 | (2013.01) | |
| H04L 12/24 | (2006.01) | |
| H04L 29/06 | (2006.01) | |
| G06F 16/9538 | (2019.01) | |

(52) U.S. Cl.
CPC ...... *G06F 3/04847* (2013.01); *G06F 16/9024* (2019.01); *G06F 16/9027* (2019.01); *H04L 41/065* (2013.01); *H04L 41/12* (2013.01); *H04L 41/22* (2013.01); *G06F 9/451* (2018.02); *G06F 16/904* (2019.01); *G06F 16/954* (2019.01); *G06F 16/9538* (2019.01); *H04L 41/0654* (2013.01)

(58) Field of Classification Search
CPC .... G06F 3/0482; G06F 3/04847; G06F 9/451; G06F 16/40; G06F 16/94; G06F 16/954; G06F 16/9024; G06F 16/9027; G06F 16/904; G06F 16/9538; H04L 41/22; H04L 63/20; H04L 41/065; H04L 41/12; H04L 41/0654
See application file for complete search history.

(56) References Cited

U.S. PATENT DOCUMENTS

| | | | | |
|---|---|---|---|---|
| 5,768,578 A * | 6/1998 | Kirk | ......... | G06F 17/30433 |
| 5,877,766 A * | 3/1999 | Bates | ......... | G06F 3/0481 |
| | | | | 707/E17.013 |
| 6,108,698 A * | 8/2000 | Tenev | ......... | G06F 17/30958 |
| | | | | 707/E17.011 |
| 6,237,006 B1 * | 5/2001 | Weinberg | ......... | G06F 11/32 |
| | | | | 345/419 |
| 6,505,209 B1 * | 1/2003 | Gould | ......... | G06F 17/30126 |
| | | | | 707/769 |
| 8,232,995 B2 * | 7/2012 | Lamping | ......... | G06T 11/206 |
| | | | | 345/419 |
| 8,314,683 B2 | 11/2012 | Pfeffer | | |
| 9,503,467 B2 * | 11/2016 | Lefebvre | ......... | H04L 43/0894 |
| 2005/0060562 A1 * | 3/2005 | Bhattacharya | ...... | H04L 63/1416 |
| | | | | 726/26 |
| 2006/0174200 A1 * | 8/2006 | Boyles | ......... | G06F 17/30873 |
| | | | | 715/734 |
| 2006/0282454 A1 * | 12/2006 | Hernandez-Sherrington | ............. | |
| | | | | G06F 3/0481 |
| 2008/0098219 A1 | 4/2008 | Forte | | |
| 2008/0104225 A1 * | 5/2008 | Zhang | ......... | H04L 67/36 |
| | | | | 709/224 |
| 2010/0318963 A1 * | 12/2010 | Kajiya | ......... | G06F 8/30 |
| | | | | 717/119 |
| 2012/0137367 A1 * | 5/2012 | Dupont | ......... | G06F 21/00 |
| | | | | 726/25 |
| 2012/0304300 A1 * | 11/2012 | LaBumbard | ......... | G06F 21/577 |
| | | | | 726/25 |
| 2014/0214744 A1 * | 7/2014 | Froelich | ......... | G06N 5/02 |
| | | | | 706/46 |
| 2014/0278664 A1 * | 9/2014 | Loomis | ......... | G06Q 10/063118 |
| | | | | 705/7.17 |
| 2015/0047034 A1 * | 2/2015 | Burnham | ......... | H04L 63/1441 |
| | | | | 726/23 |
| 2015/0244734 A1 * | 8/2015 | Olson | ......... | G06F 21/577 |
| | | | | 726/25 |
| 2015/0288712 A1 * | 10/2015 | Jones | ......... | H04L 63/1433 |
| | | | | 726/25 |

OTHER PUBLICATIONS

Computer Security Incident Handling Guide. Guidebook [online]. National Institue of Standards and Technology U.S. Department of Commerce, Aug. 2012 [retrieved on Dec. 22, 2016]. Retrieved from https://www.nist.gov/node/563301.*
Hypertree—Tree Animation, https://web.archive.org/web/20130409091733/http://philogb.github.io/jit/static/v20/Jit/Examples/Hypertree/example1.html, Apr. 9, 2013, p. 1.
Hypertree—Graph Operations, https://web.archive.org/web/20130409085348/http://philogb.github.io/jit/static/v20/Jit/Examples/Hypertree/example3.html, Apr. 9, 2013, p. 1.
Nicolas Garcia Belmonte, Hypertree.js, https://web.archive.org/web/20140117233357/philogb.github.io/blog/assets/jit-1.0a/doc/core/files/Hypertree-js.html, Jun. 17, 2014, pp. 1-33.

* cited by examiner

METHOD AND SYSTEM FOR AUTOMATED CYBERSECURITY INCIDENT AND ARTIFACT VISUALIZATION AND CORRELATION FOR SECURITY OPERATION CENTERS AND COMPUTER EMERGENCY RESPONSE TEAMS

CROSS-REFERENCE TO RELATED APPLICATION

This patent application claims the benefit of U.S. provisional patent application Ser. No. 62/033,543, filed Aug. 5, 2014, which is hereby incorporated herein by reference.

TECHNICAL FIELD

The field of this invention generally relates to automated cybersecurity visualization and correlation, and more particularly to a correlation finder that retrieves, displays, and enables navigation of cybersecurity incidents and incident elements that match details of an incident under investigation, and to an artifacts correlator that enables display and navigation of incident element artifacts that have points of correlation with other incident element artifacts.

BACKGROUND

The present invention may be implemented as a module to be added to an existing incident management system. For example, one such incident management system, to which the embodiments described herein may be added, is the DF Labs IncMan Suite, which is an incident management system that enables management of many kinds of information security incidents. This Suite is described in the IncMan Suite v. 2.2.3 User Manual, published by DF Labs, which manual is hereby incorporated herein by reference in its entirety.

The IncMan Suite supports the entire incident management process for every type of incident, including cybersecurity incidents, by supporting digital forensics, case management, and incident response. Although the modules of the IncMan Suite are designed to ensure maximum integration, customers can choose to use only the modules that most appropriately cover their needs.

The forensics and response section of the IncMan Suite is composed of two modules: the incident manager and the digital investigation manager.

The incident manager module ("IMAN") of the IncMan Suite manages and tracks security incidents during incident response operations, and manages information related to response to an incident. This tool covers all aspects of incident assessment, either simple or complex. The incident manager module provides help for tracking of incidents coming from external sources, including security alerts in syslog format, for creating a case related to the incident, for managing all information and data related to the case, including task assignments, and for generating incident reports compliant with rigorous security standards. (The "case" is a sort of virtual container of an incident that allows the user to assemble, organize, and catalog elements that are part of digital forensic operations or incident response.) The incident manager allows the insertion of dozens of different items of information related to an incident, organized according to theme areas: hosts involved in the incident; methods used to perpetrate the attack; identification of the assets involved and the respective economic impacts; attachments such as log files, reports produced by the security software, and other information; actions taken or to be taken for the resolution or containment of the incident; and the point of contact for coordination of operations.

The digital investigation manager module ("DIM") of the IncMan Suite manages digital evidence, and is designed to be used for managing information gathered during a forensics operation. The digital investigation manager supports investigators in performing case management, preparing notes, tracking evidence and records, creating clones of evidence with automatic upload of acquisition data, snapshots, and bookmarks, and generating chain of custody reports. This module can import data from all of the common computer forensic tools. The digital investigation manager module is designed to be used in information technology and investigative environments during incident response and forensic acquisition. This module enables the user to catalog all of the relevant information gathered and to generate reports. The digital investigation manager allows operations to be organized by case. Each case may contain an unlimited number of hosts (workstations, servers, laptops, etc.). Items of evidence are associated with each host (hard disk, optical disk, etc.). The digital investigation manager module makes it possible to describe the destination media and tools used in making forensic copies of the original stored media, as well as the log files generated by common computer forensic tools. One example of a digital investigation manager, which may be a module of existing incident management systems to which the embodiments described herein may be added, is described in Forte, U.S. patent application Ser. No. 11/784,794, filed Apr. 10, 2007, and published as US Patent Publication 2008/0098219, which is hereby incorporated herein by reference in its entirety.

The "ITILity" module of the IncMan Suite is built on the Information Technology Infrastructure Library (ITIL) framework, which is a set of best practices for the management of operations and IT incidents. This troubleshooting and help desk module is available for companies that need also to manage the IT incident under the ITIL standard.

The compliance and risk manager module (CoRM) of the IncMan suite is a module to enforce, track, document, and support compliance with IT regulations to gain law conformity and maintain a secure and productive business. With the compliance and risk manager module it is possible to upload all relevant compliance documents, create hierarchies of controls built on the compliance documents, assign controls to the various assets in an organization, create assessments on the various controls and assets, assign these assessments to the relevant responsible persons in the organization, and track their answers. The compliance and risk manager module provides a centralized repository for tracking compliance levels and managing risks related to an organization's assets.

SUMMARY

It is an object of the invention to provide a correlation finder and an artifacts correlator that can be added as at least one module to an incident management system such as the IncMan Suite.

The invention features a method and apparatus for visualizing and navigating cybersecurity information. A hypertree is displayed on a display device of a computerized system. The hypertree includes a plurality of nodes linked by edges. One or more of the nodes represent cybersecurity incidents. One or more of the nodes represent elements or artifacts of cybersecurity incidents. The edges represent a specific relationship between the nodes linked by the edges.

An interactive navigation aid is displayed, through the computerized system, to enable a user to navigate the hypertree. A navigation command is received at the computerized system from the user through the interactive navigation aid. The computerized system modifies the displayed hypertree in response to the navigation command. The navigation command includes selective elimination or restoration of edges or nodes on the hypertree so as to enable the user to readily visualize interrelationships between the displayed nodes that are significant to a cybersecurity investigation or response.

The visualization capabilities provided by the navigation commands according to the invention guarantee flexibility to the user during incident response operations and allow better granularity during an incident response investigation, reducing possible false positives and enabling the user quickly and efficiently to focus the scope of the potential common incident elements or artifacts, due to the ability to selectively eliminate or restore edges or nodes. These advantages are especially important in cybersecurity investigations because time is often of critical importance in cybersecurity investigations, with reduced investigation time leading to reduced response time.

In certain embodiments of the invention one or more of the nodes represent elements of cybersecurity incidents including evidence, hosts, forensic images, and e-discovery objects. In other embodiments one or more the nodes represent artifacts of cybersecurity incidents.

In some embodiments of the invention the computerized system enables the user to select an alikeness ratio defining a minimum alikeness that the nodes representing artifacts must have with respect to other nodes in the hypertree, and the computerized system, in response to the user selecting an alikeness ratio, re-plots the hypertree to include nodes representing artifacts that are connected with other nodes by edges that exceed the alikeness ratio selected by the user. This particular capability can dramatically reduce the time required for an incident investigation and, consequentially, can dramatically reduce reaction time.

The computerized system may enable the user to navigate the hypertree by selecting a node of the hypertree as a selected node. The interactive navigation aid may include a mechanism to enable the user to eliminate or restore the selected node in the displayed hypertree.

In certain embodiments of the invention the computerized system modifies the displayed hypertree in response to the user selecting a node of the hypertree as the selected node, at least by re-centering the displayed hypertree around the selected node. The automatic re-centering of the hypertree gives the user a more organic view of incidents and artifacts and makes it possible for the user to focus only on the incident elements and artifacts that are truly relevant to a cyber-incident operation.

The interactive navigation aid may list active connections between a selected node of the hypertree and other nodes of the hypertree, together with options for the user to eliminate or restore edges representing the active connections listed in the navigation aid or nodes linked by the active connections. The interactive navigation aid may include a table of nodes having active connections with the selected node.

The interactive navigation aid may also include a mechanism to enable the user to eliminate or restore all edges connected to the selected node in the displayed hypertree. By performing this action, users are able to save critical time during their investigation and to perform more automated and focused response actions. The possibility of performing a "restore" can also allow users to repeat any investigative actions, anytime, in order to simulate alternative correlations.

In certain embodiments of the invention the hypertree displays links differentiated by color and the interactive navigation aid enables the user to selectively eliminate or restore edges by color. This differentiation technique helps the user in better refining the scope of the current investigation and automatically finding eventual points in common with other incidents and artifacts included in a given knowledge base.

In certain embodiments, the computerized system enables the user to enable or disable nodes in the hypertree representing cybersecurity incidents other than a cybersecurity incident being investigated by the user. In response to instruction from the user to enable or disable the nodes representing the other cybersecurity incidents, the computerized system re-plots the displayed hypertree.

The interactive navigation aid may list active connections between a selected node of the hypertree and other nodes of the hypertree and may include a mechanism to enable the user to view details of any node listed in the interactive navigation aid.

The computerized system may enable the user to zoom onto a portion of the displayed hypertree. Using the zoom in the hypertree can help the user in identifying single artifacts, responsible for a particular type of intrusion or attack, and perform further chained correlation.

The details of various embodiments of the invention are set forth in the accompanying drawings and the description below. Numerous other features and advantages of the invention will be apparent from the description, the drawings, and the claims.

DESCRIPTION OF THE DRAWINGS

FIGS. 3-24 are screen displays corresponding to the steps of the flowchart of FIG. 2.

FIGS. 26-47 are screen displays corresponding to the steps of the flowchart of FIG. 2.

DETAILED DESCRIPTION

The present invention provides a correlation module that may be incorporated into or used in conjunction with an incident management system that provides data to the correlation module pertaining to cybersecurity incidents, incident elements, and incident artifacts.

Figure 1:
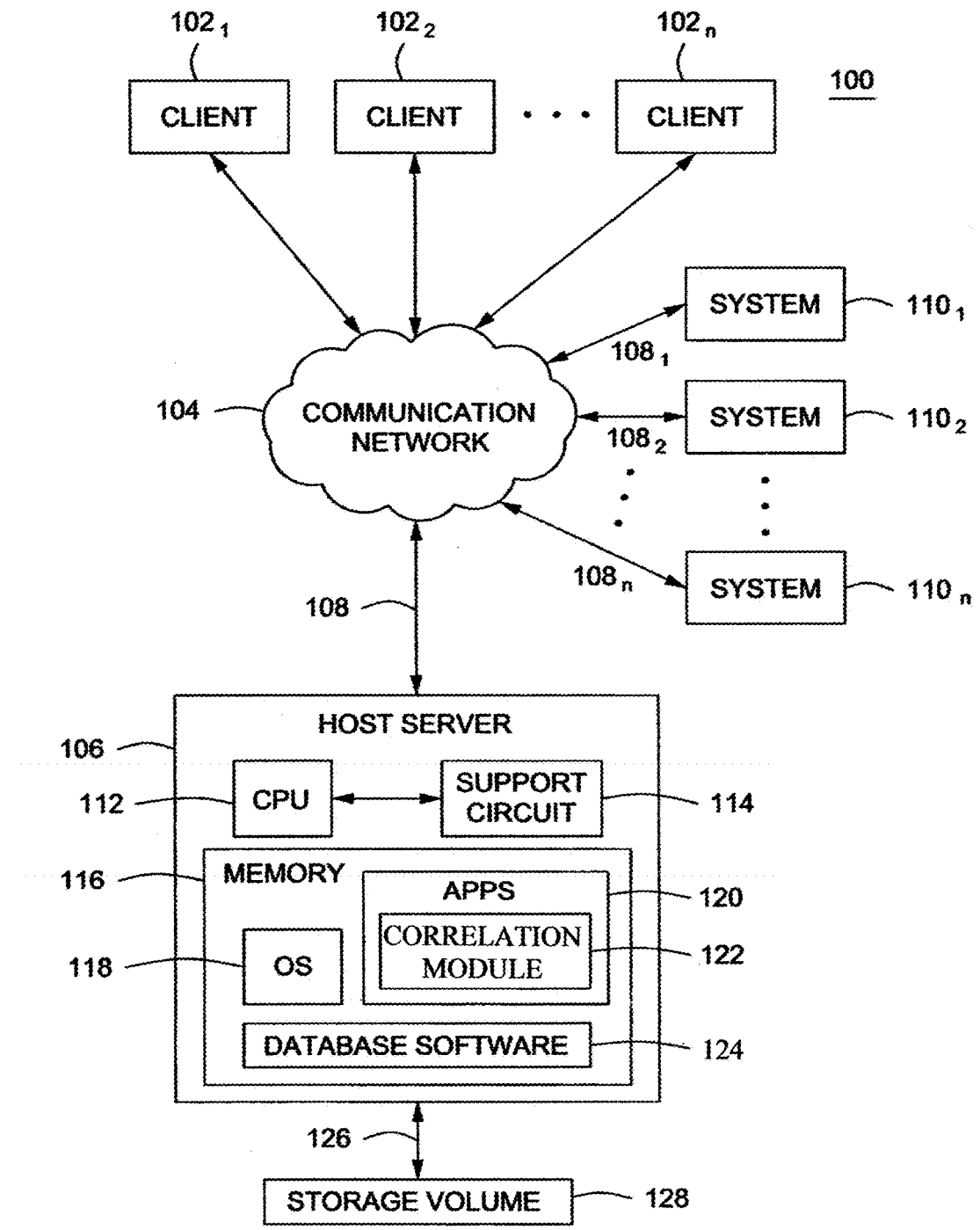
FIG. 1 is a schematic diagram of the hardware forming an exemplary embodiment of a computer system that operates in accordance with the present invention.

FIG. 1 is a schematic diagram of the hardware forming an exemplary embodiment of a computer system 100 that operates in accordance with the present invention and employs and executes the correlation module of the present invention and the incident management system with which the correlation module is associated. This figure portrays only one variation of the myriad of possible network configurations. The present invention can function in a variety of computing environments; such as, a distributed computer system, a centralized computer system, a stand-alone computer system, or the like. One skilled in the art will appreciate that computing system 100 may or may not contain all the components listed below.

The computer system 100 comprises a plurality of client computers $102_1$, $102_2$ ... $102_n$, which may connect to one another through a conventional data communications network 104. A host server 106 is coupled to the communication network 104 to supply application and data services as well as other resource services to the clients $102_1$, $102_2$ ... $102_n$. The communication network 104 is coupled to host server 106 via communication link 108. Similarly, systems $110_1$, $110_2$ ... $110_n$ are coupled to the communication network 104 via communication links $108_1$, $108_2$ ... $108_n$. The communication link $108_1$, $108_2$ ... $108_n$ may be a physical link, a wireless link, a combination there of, or the like. Systems $110_1$, $110_2$ ... $110_n$ may be another computer system, another communication network, a wireless device, or the like.

The host server 106 comprises at least one central processing unit (CPU) 112, support circuits 114, and memory 116. The CPU 112 may comprise one or more conventionally available microprocessors. The microprocessor may be an application specific integrated circuit (ASIC). The support circuits 114 are well known circuits used to promote functionality of the CPU 112. Such circuits include, but are not limited to, a cache, power supplies, clock circuits, input/output (I/O) circuits and the like. The memory 116 contained within the host server 106 may comprise random access memory, read only memory, removable disk memory, flash memory, and various combinations of these types of memory. The memory 116 is sometimes referred to main memory and may, in part, be used as cache memory or buffer memory. The memory 116 generally stores the operating system 118 of the host server 106. In addition, the memory 116 stores database software 108, various forms of application software 120, such as correlation module 122 of the present invention, and database software 124. Application software 120 may also include all of the modules of an incident management system such as the DF Labs IncMan Suite described above. The operating system may be one of a number of commercially available operating systems. The database software 124 may comprise a relational database.

The communications network 106 may be coupled to the input/output (I/O) ports 126 of the host server 106. The I/O ports 126 are coupled to the storage volume 128. The storage volume 128 generally comprises one or more disk drives, or disk drive arrays, that may be used as a mass storage device for the host server 106 or systems $110_1$, $110_2$ ... $110_n$. The storage volume 124 may support a plurality of host servers 106 (only one of which is depicted).

To support the operation and functionality of the present invention, the memory 116 may be partially used as cache memory to temporarily store cached information. The correlation module of the present invention may use the memory 116 for evidence control functions, such as, storing, viewing, editing, and the like.

Under normal operation, the host server 106 supports application programs 120, such as, the correlation module 122 of the present invention. In one embodiment, the correlation module 122 allows for correlation finding and artifacts correlation on the host server 106. In addition, the correlation module 122 enables a plurality of client computers $102_1$, $102_2$ ... $102_n$, in different locations, to perform correlation finding and artifacts correlation.

Correlation module 122 includes a correlation finder and an artifacts correlator. The correlation finder allows an incident investigator and manager to retrieve all incidents and incident elements that match some of the most important details of the incident. The correlation finder puts into a graphical, easy-to-read and easy-to-use interface all of the information derived from a correlation algorithm.

Figure 2A:
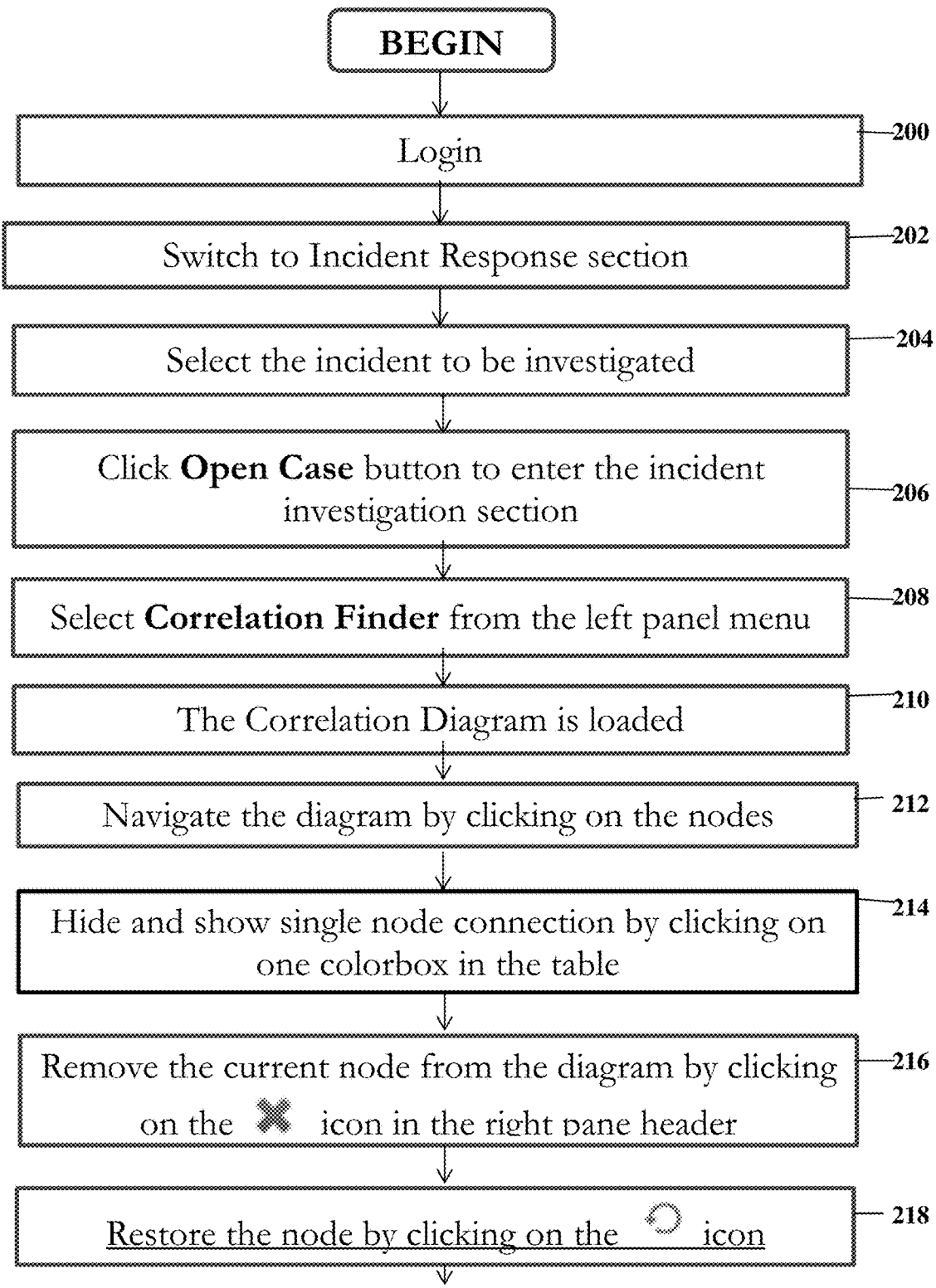
FIGS. 2A and 2B are a flowchart diagram of steps that a user of the correlation finder according to the invention might perform in interacting with the interface provided by the correlation finder
Figure 2B:
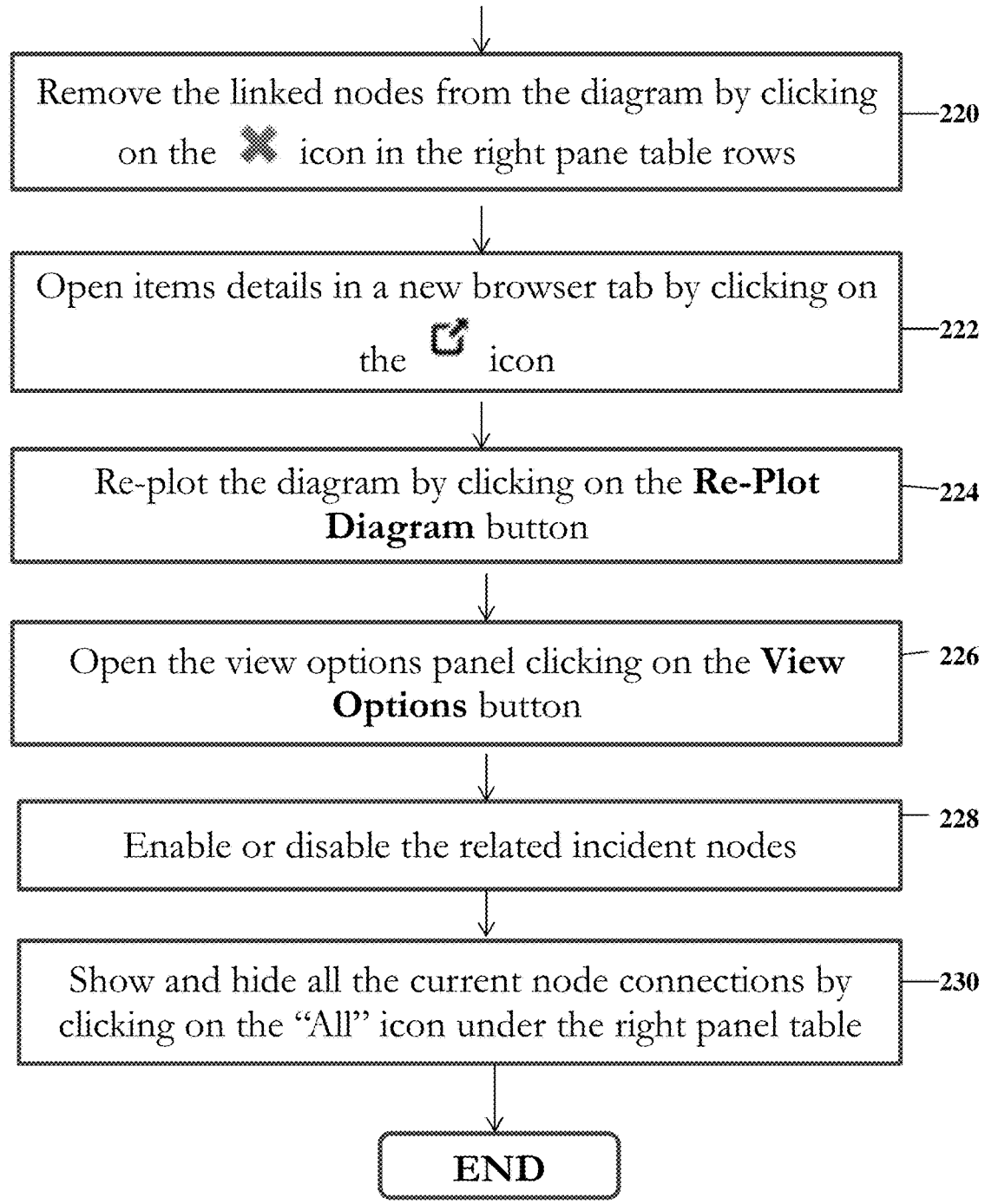

With reference to FIGS. 2A and 2B, there is shown a flowchart diagram of steps that a user of the correlation finder might perform in interacting with the interface provided by the correlation finder. This flowchart diagram illustrates only one particular sequence of steps that a user might perform, and it will be appreciated that the steps shown in the flowchart might alternatively be performed in a different order, or with certain steps omitted, etc. FIGS. 3-24 are screen displays corresponding to various steps in the flowchart diagram of FIGS. 2A and 2B.

Figure 3:
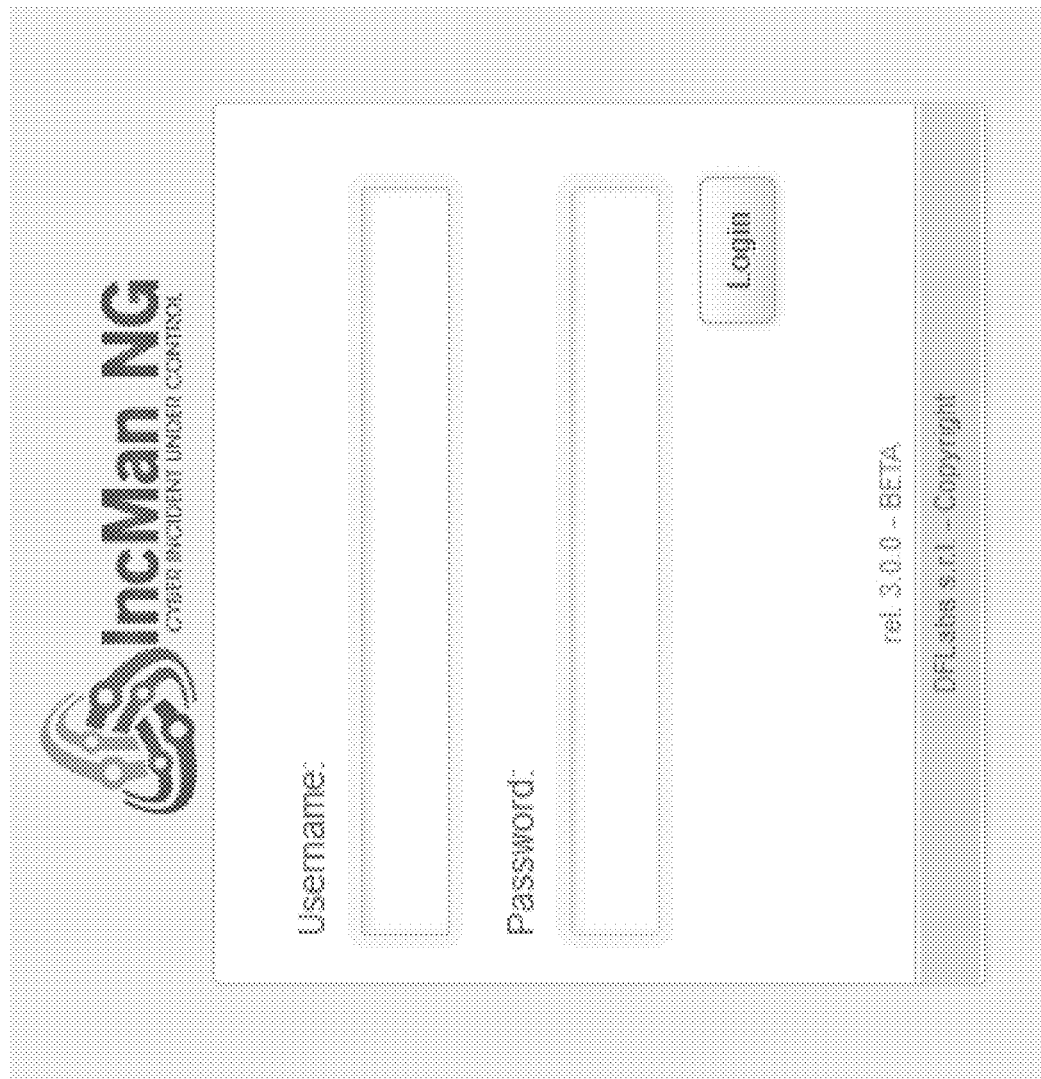
Figure 4:
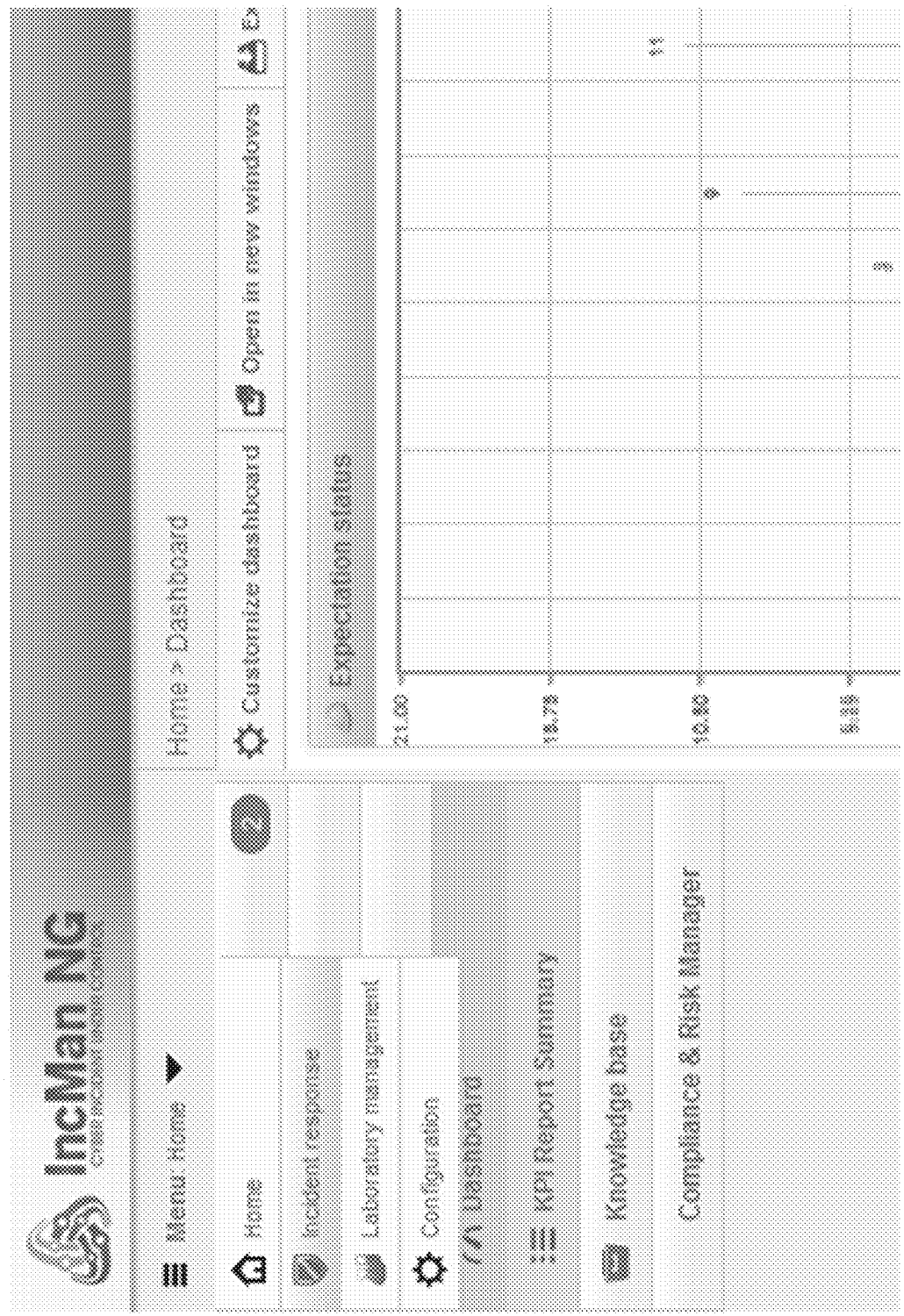
Figure 5:
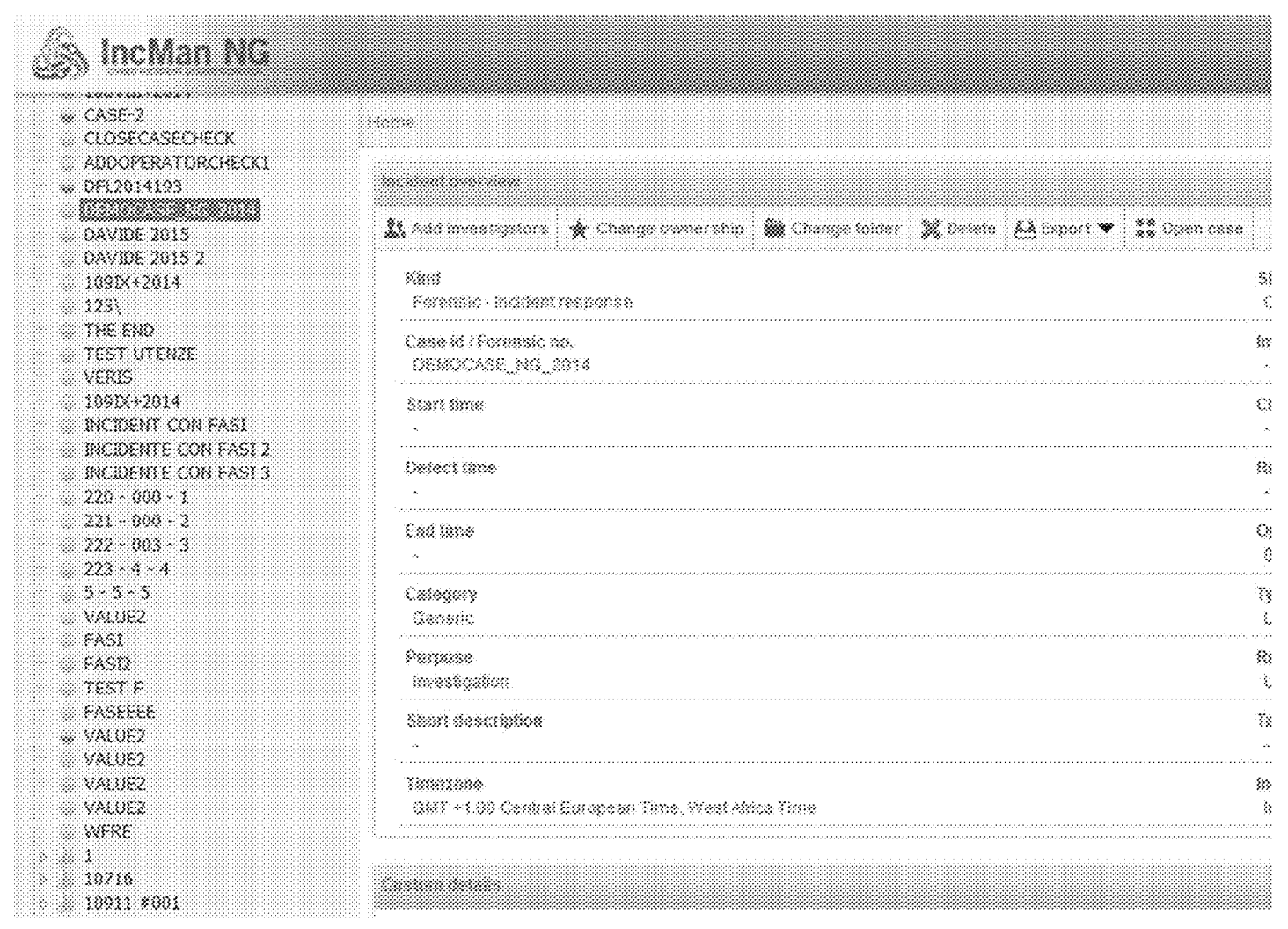
Figure 6:
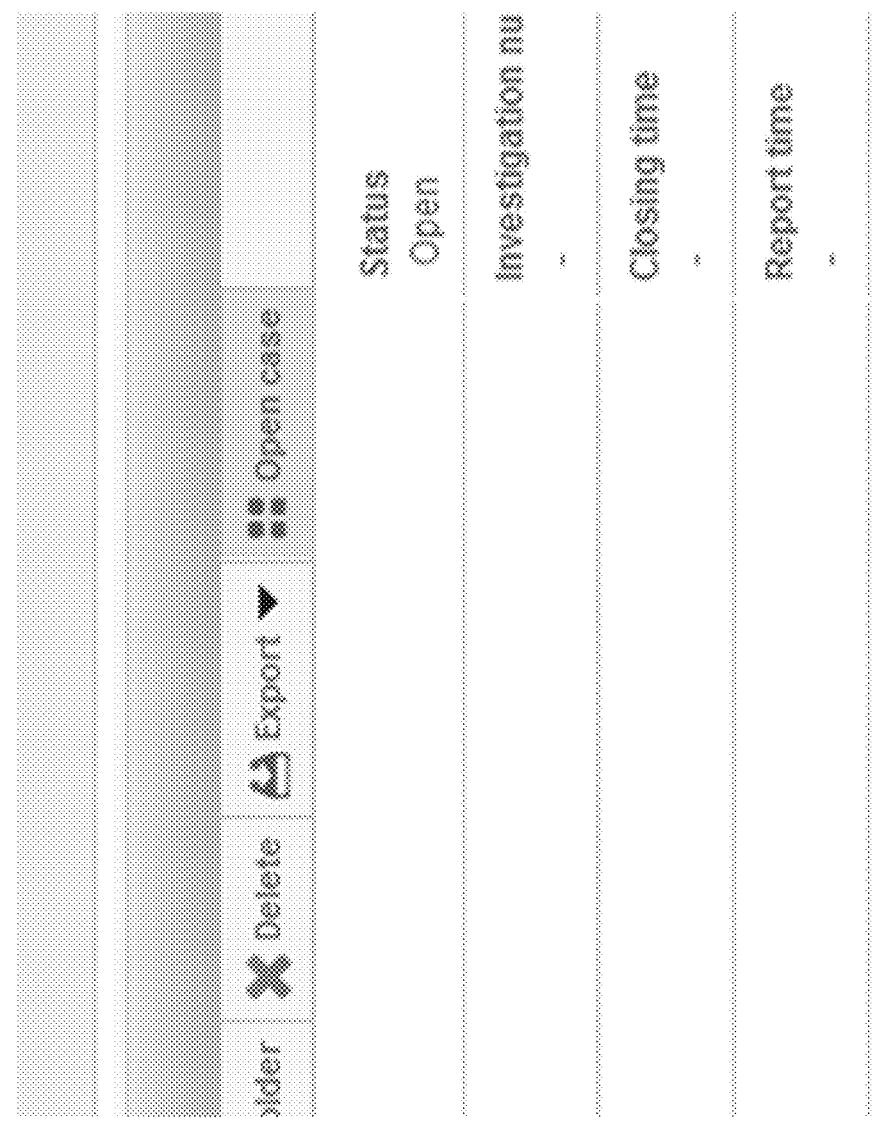
Figure 8:
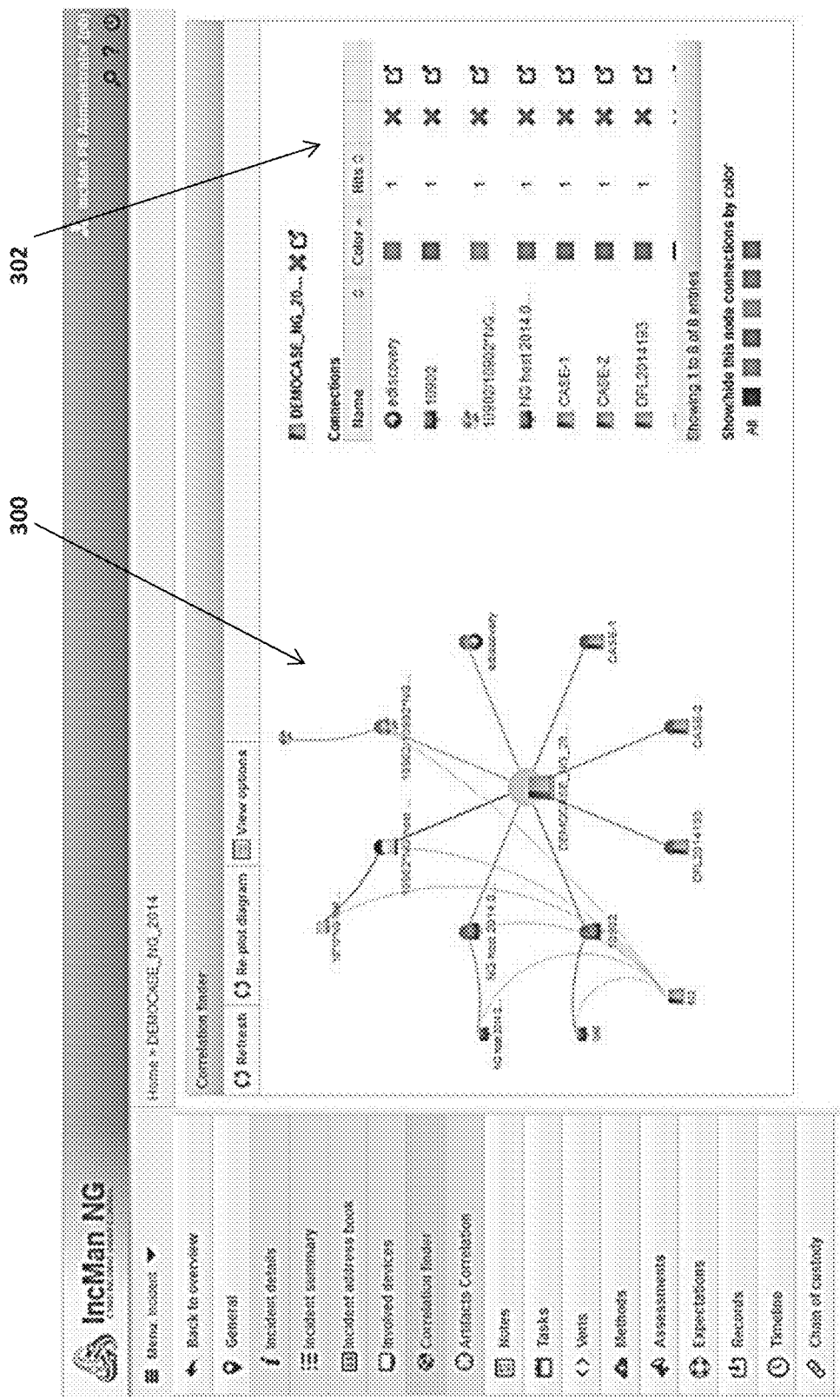
Figure 9:
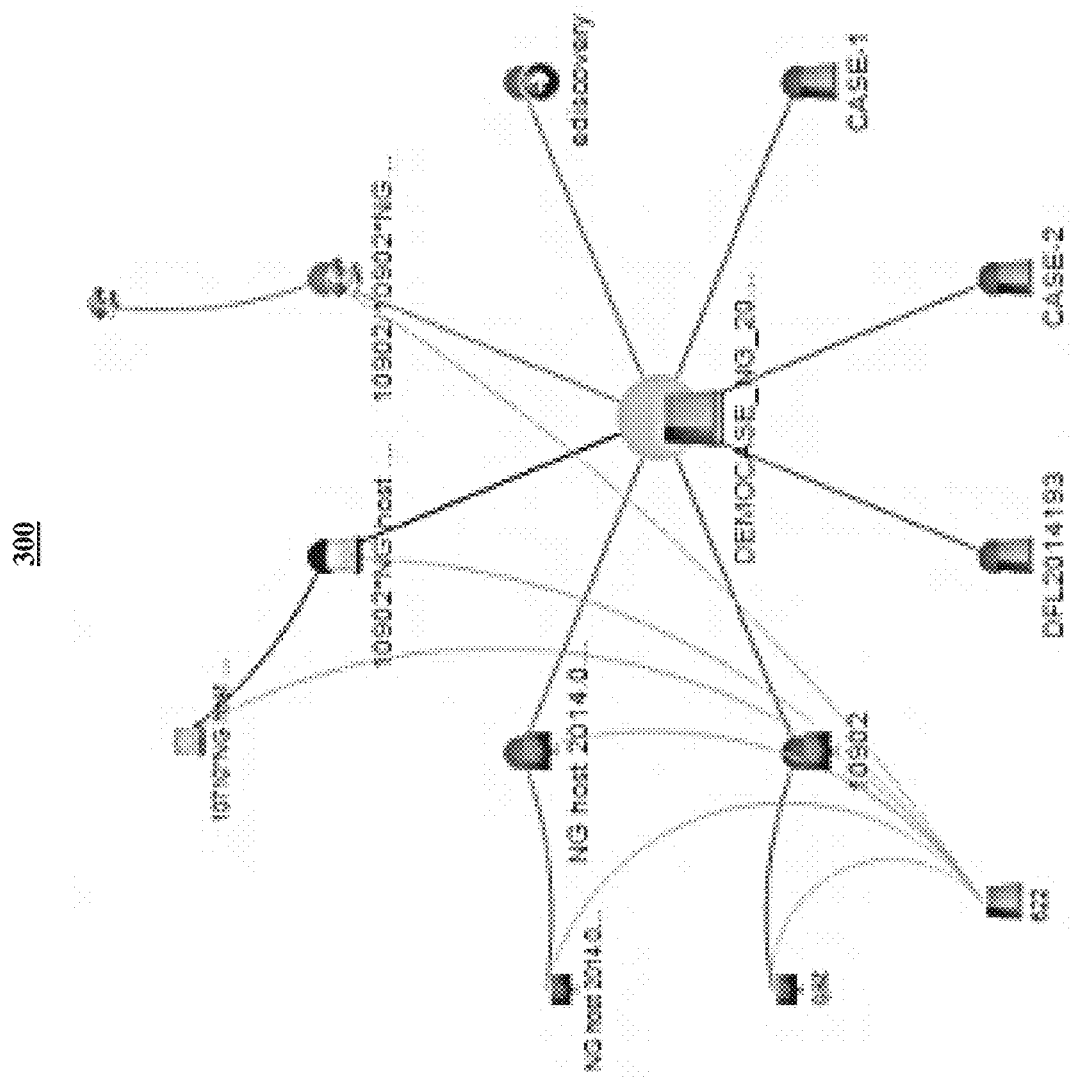

In order to use the correlation finder, the user first logs in to the incident management system by entering a user name and password and clicking on a "login" button (step 200; FIG. 3). Then, the user switches to the incident response section of the incident management system by selecting "incident response" from a drop-down menu (step 202; FIG. 4). Next, the user selects an incident to be investigated by selecting an incident from a list displayed on a screen (step 204; FIG. 5). In FIG. 5, the user selects "DEMOCASE_NG_2014" as the incident to be investigated. The user clicks an "open case" button on the screen display to enter the incident investigation section of the incident management system (step 206; FIG. 6). Next, the user selects "correlation finder" from a panel menu on the display (step 208; FIG. 7). A correlation diagram is then loaded and displayed (step 210; FIGS. 8 and 9).

As is shown in FIGS. 8 and 9, the correlation finder uses a correlation algorithm to provide a hypertree 300. In hypertree 300 the books ("DEMOCASE_NG_20 ... ," "CASE 1," "CASE 2," "DFL2014193," "622") represent incidents, the hard disks ("10902*NG host ... ," "10710*NG host ... ,") represent evidence related to an incident, the monitors ("NG host 2014.0 ... ," "10902, "qaz ") represent a host involved in an incident, the hard disks with arrows ("10902 10902 NG ... ") represent forensic images of evidence, and the right arrows("ediscovery") represent e-discovery objects created in connection with an incident. Thus, in hypertree 300, the nodes represent the incident itself and elements of the incident (evidence, hosts, forensic images, e-discovery objects), linked by edges to any incident and incident element related to the single node by meaningful objects details. The hypertree shows the nodes that are linked by edges to the node representing the current incident, as well as the nodes that are in turn linked by edges to those aforementioned nodes that are linked by edges to the node representing the current incident. The different edges to the node representing the current incident are colored differently from each other when there are differences in the nature of the relationships of the node representing the current incident to the other nodes, and colored similarly to each other when the nature of the relationship of the node representing the current incident to the other nodes is the same. Thus, some of the edges to the node representing the current incident might be colored the same while simultaneously other edges to the node representing the current incident might be colored differently. Similar color coding techniques are used with respect to the other nodes displayed in the hypertree. As used herein, the term "colored" also encompasses methods of differentiation such as differences in line thickness, dashed or dotted lines as opposed to continuous lines, etc., even if actual differences in color hue are not shown. A table 302 on the screen display identifies the node representing the current incident and lists the connections to the node representing the current incident, by the names of the nodes linked to the node representing the current incident, and by the respective color of the edges linking the respective nodes to the node representing the current incident. Thus, table 302 provides a summary about the selected node and lists all the active connections between the selected node and other nodes. The user can zoom in on a portion of the hypertree by selecting a zoom feature under the "view options" button.

Figure 10:
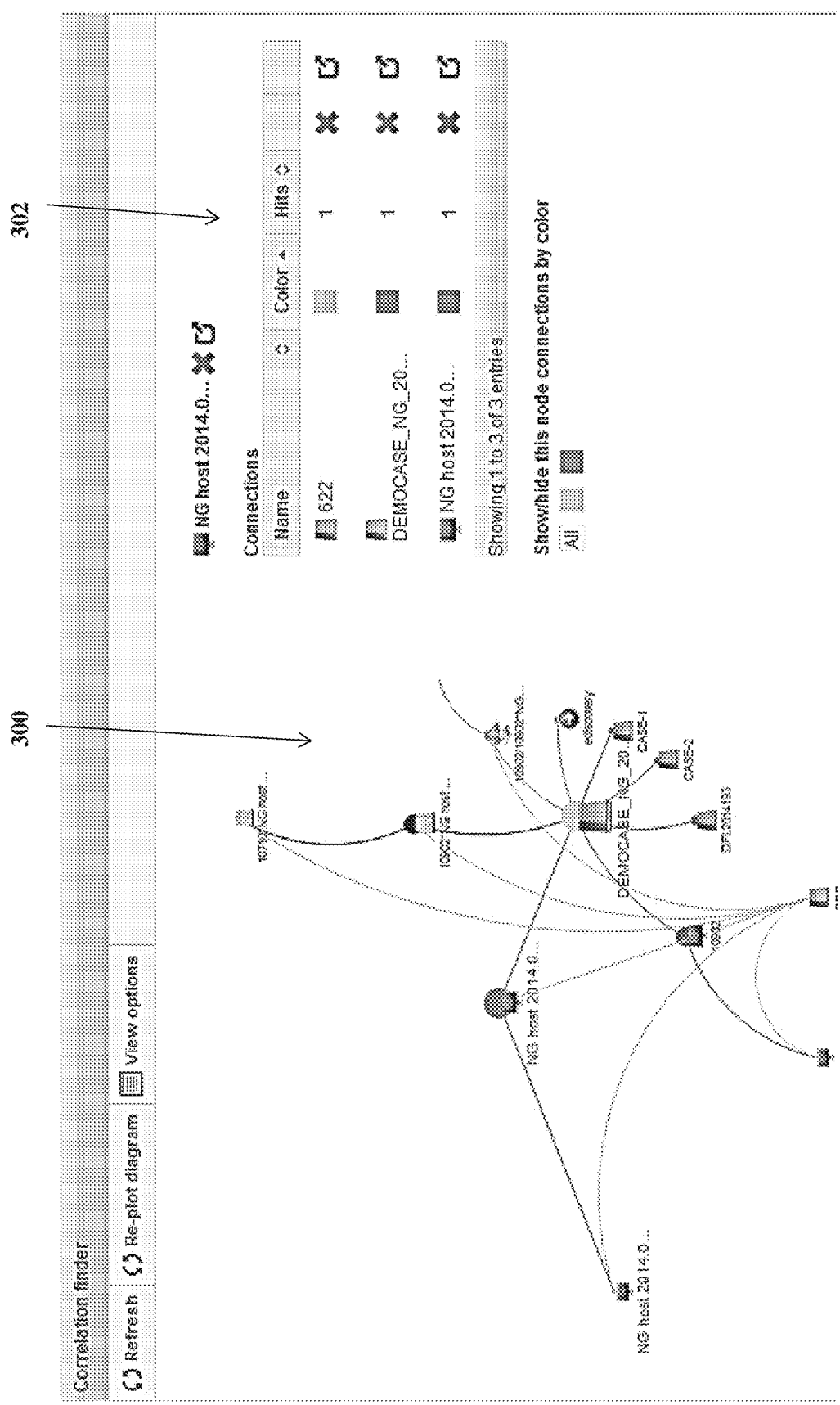
Figure 11:
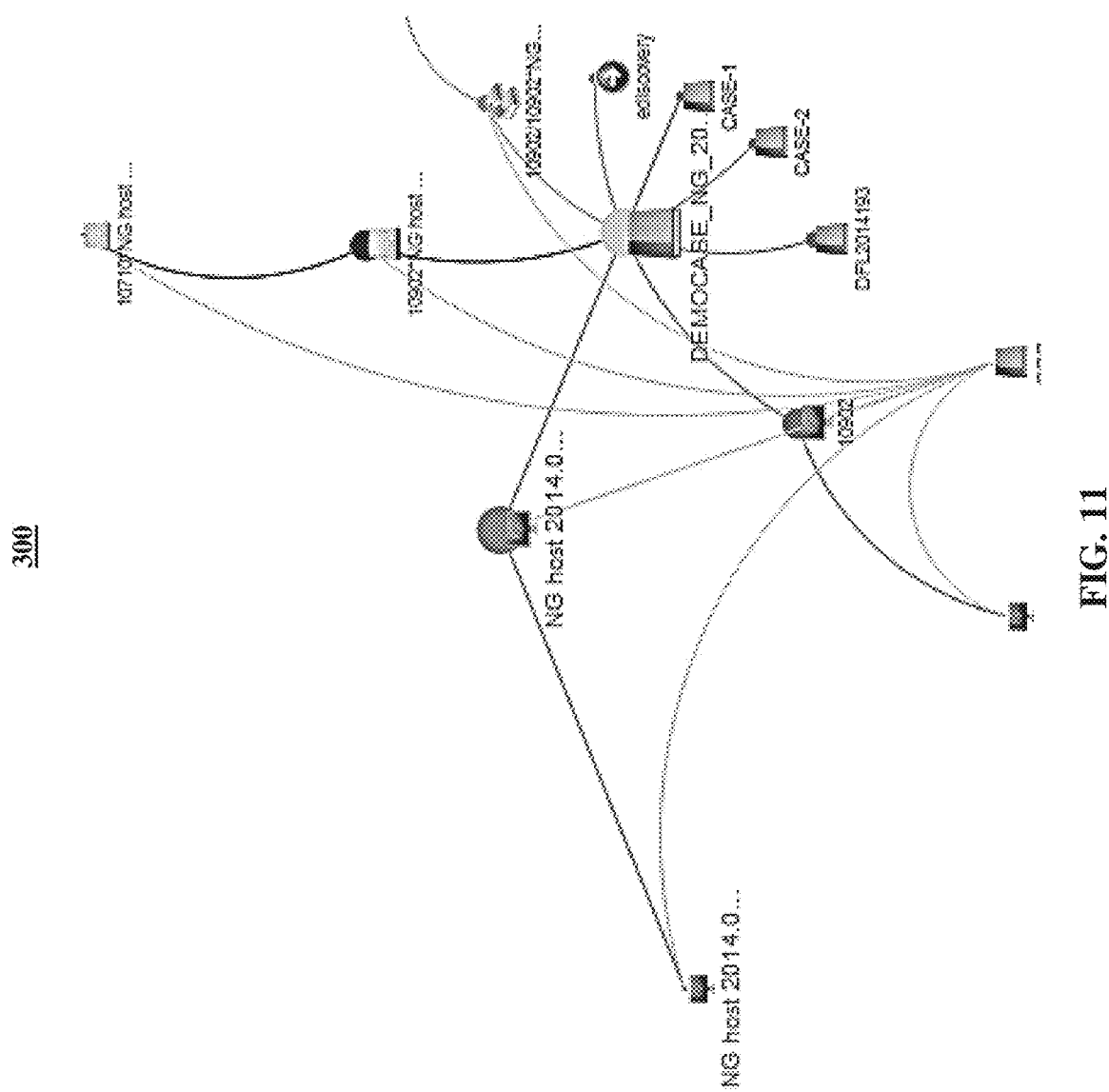

In step 212, the user navigates the displayed hypertree by clicking on one of the nodes, causing the hypertree to be re-centered around the clicked node, in this case "NG host 2014.0 . . . " The hypertree 300 is re-centered around the clicked node, and the edges to the clicked node are lengthened while the edges to the original node, in this case "DEMOCASE_NG_2014," are shortened, as is shown in FIGS. 10 and 11. The table 302 on the screen display identifies the clicked node and lists the connections to the clicked node, by the names of the nodes linked to the clicked node, and by the respective color of the edges linking the respective nodes to the clicked node.

Figure 12:
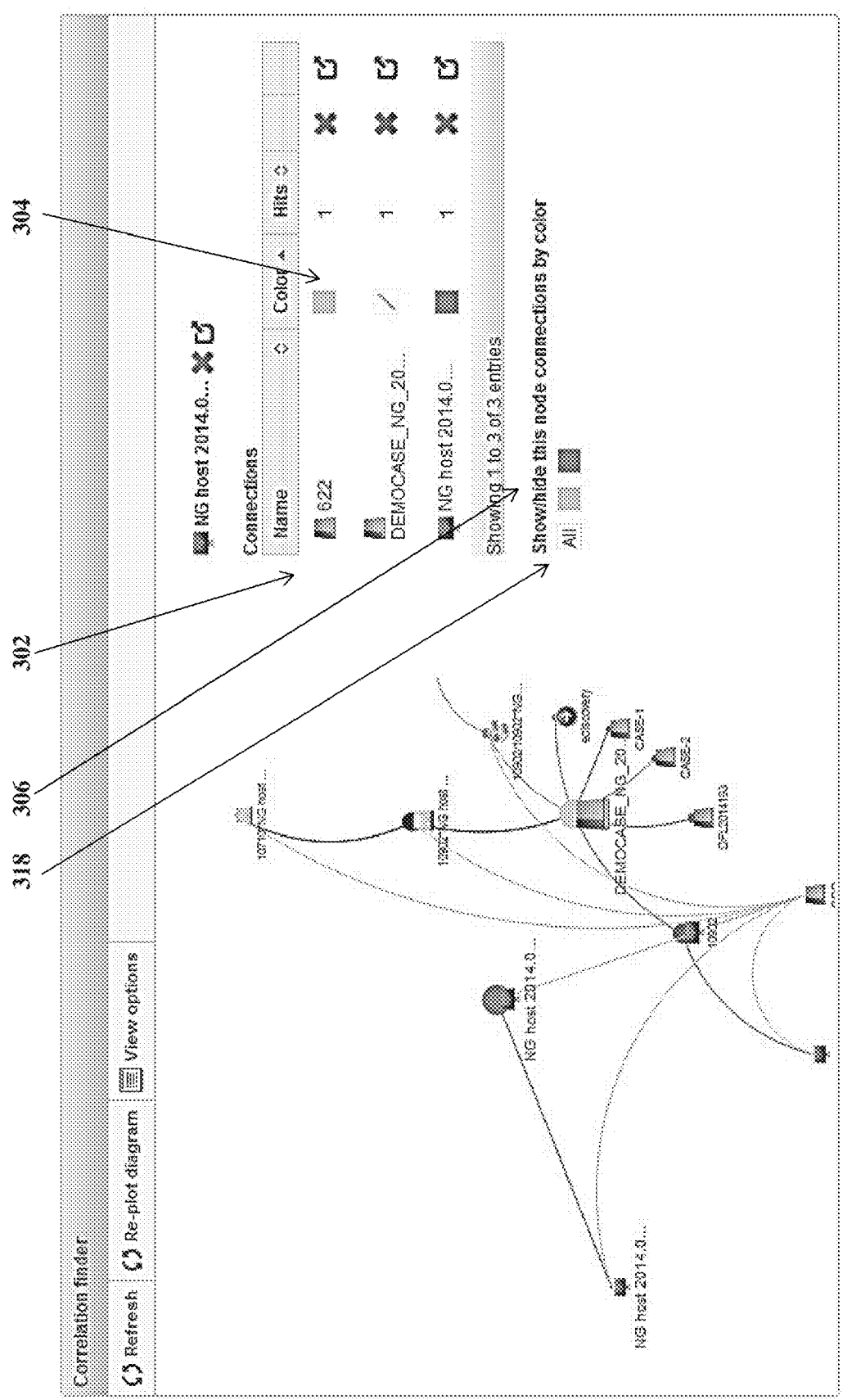
Figure 13:
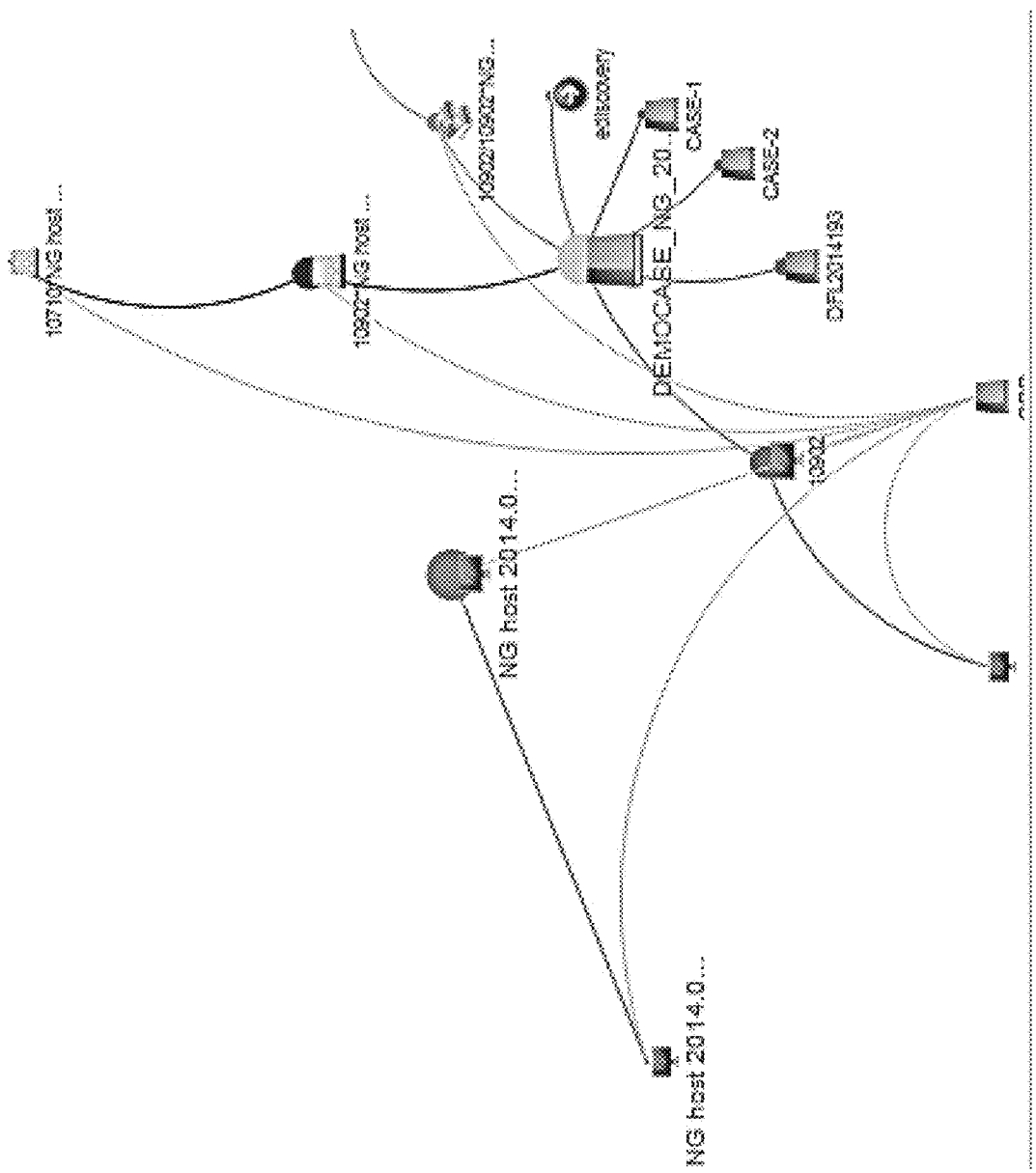

In step 214, the user hides or shows a single node connection by clicking on a one of a set of colorboxes 304 on the table 302 corresponding to respective connections to the clicked node (FIGS. 12 and 13). In this case, the user clicks on the colorbox corresponding to the connection between "NG host 2014.0 . . . " and "DEMOCASE_NG_2014," and the edge between these two nodes is omitted from the displayed hypertree. Underneath the table 302 is a set of colorboxes 306 that can be clicked by the user to hide or show all links of the same color, and an "All" icon 318 that can be clicked by the user to hide or show all links regardless of their color.

Figure 14:
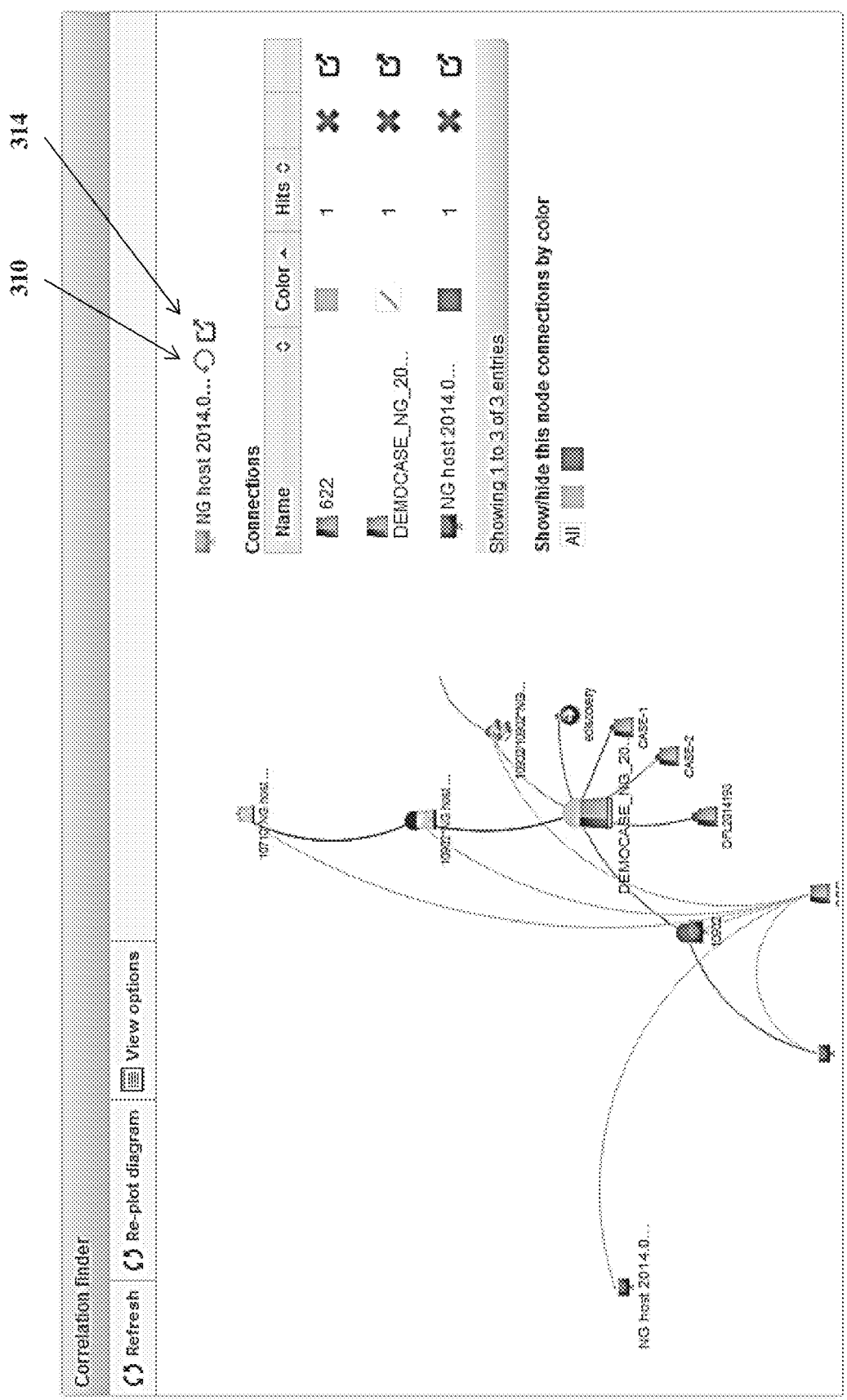
Figure 15:
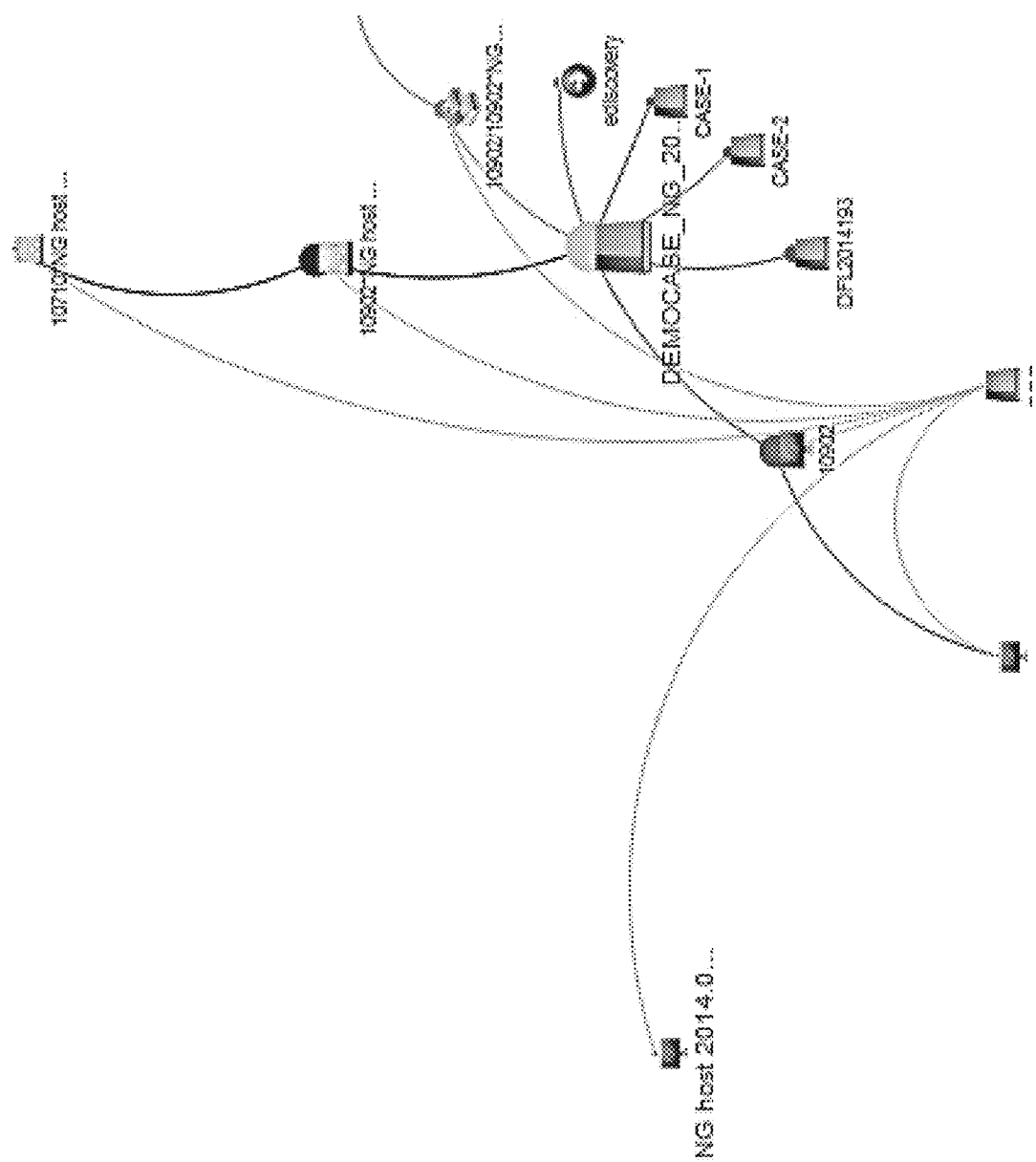
Figure 16:
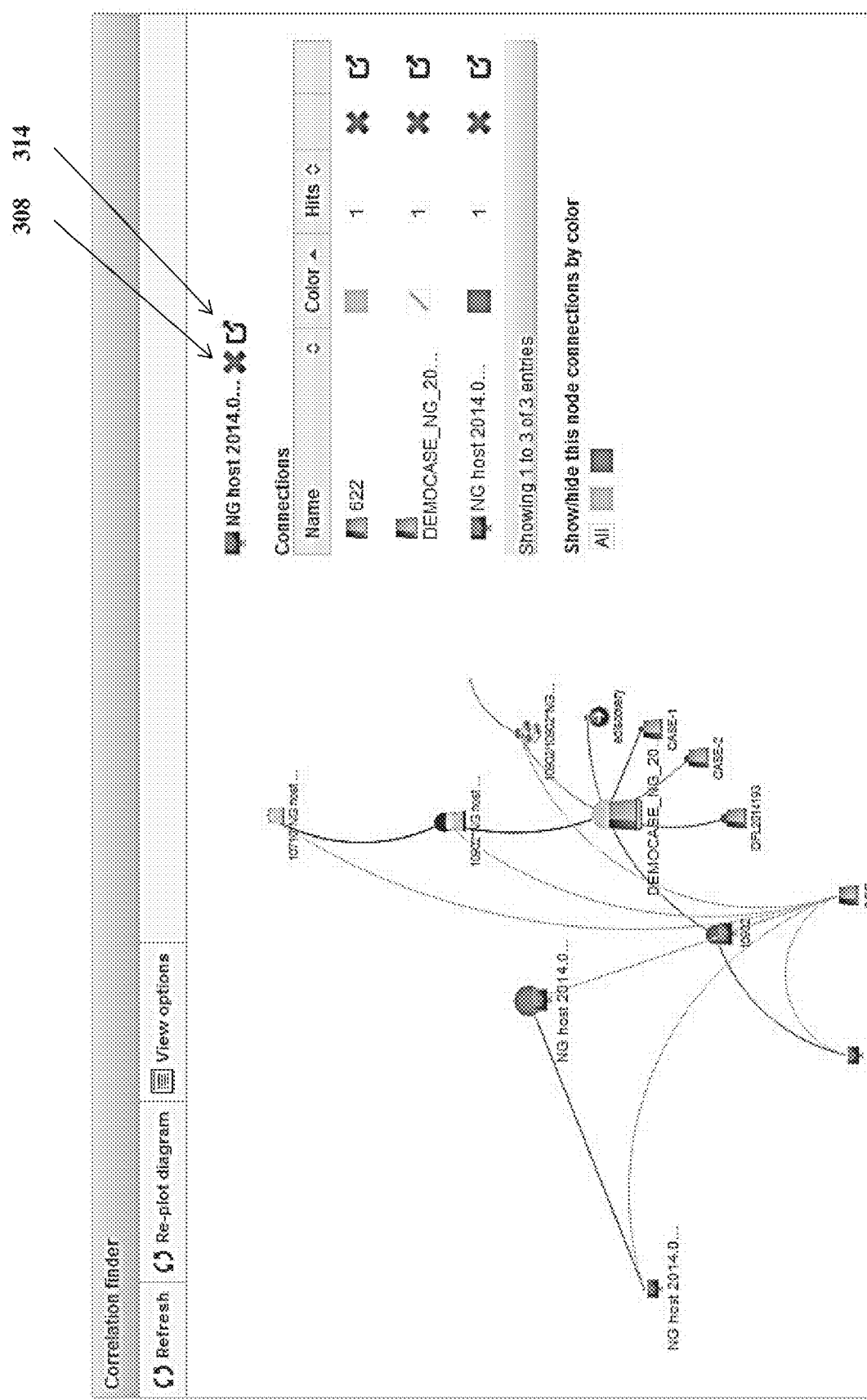
Figure 17:
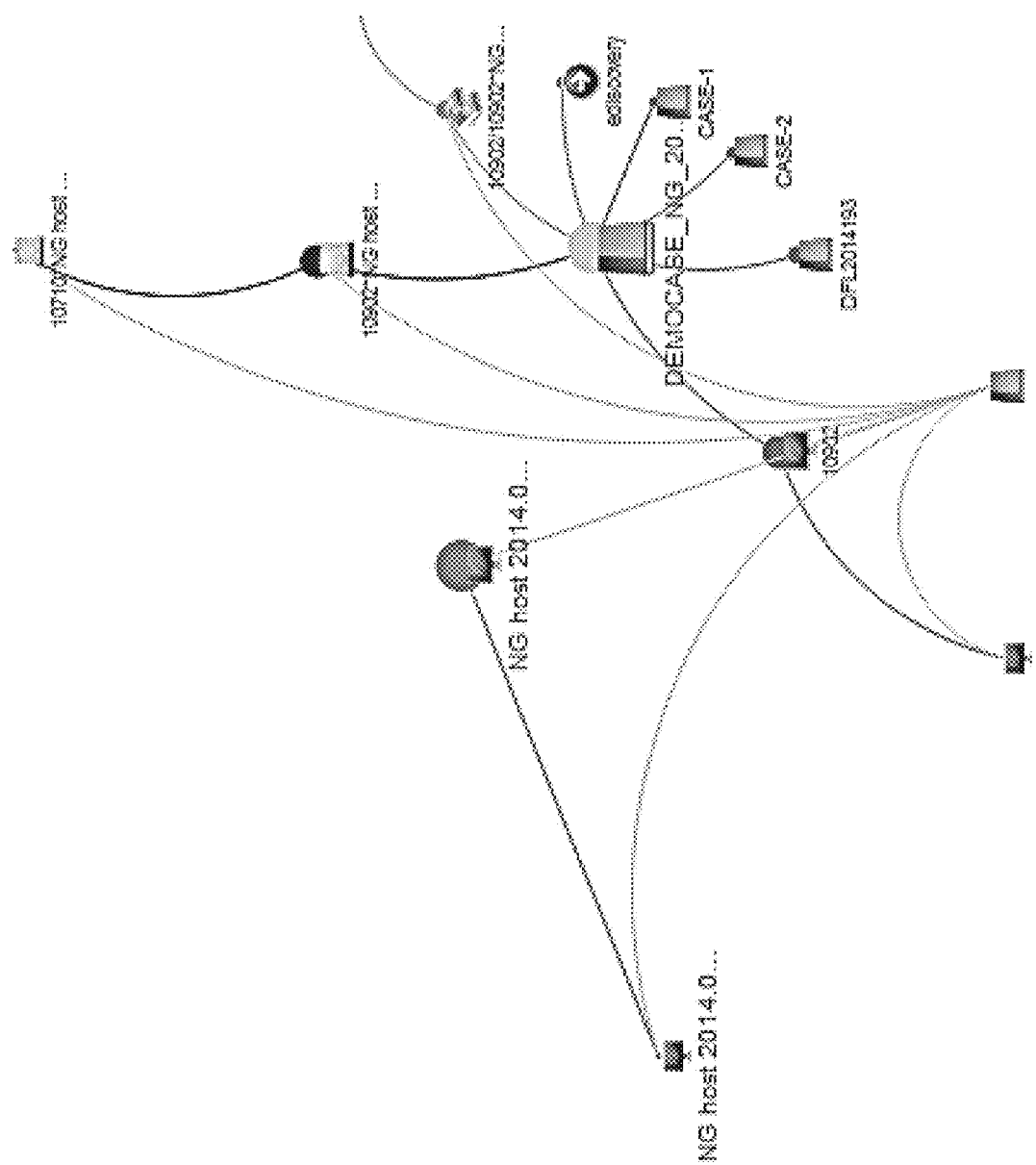

Next, the user might remove the current, clicked node from the hypertree diagram by clicking on an "X" icon 308 adjacent to the identification of the current, clicked node, and the hypertree is displayed with the current, clicked node and the edges connecting it with other nodes omitted from the hypertree (step 216; FIGS. 14 and 15). The user might restore the current node by clicking on a "restore" icon 310 adjacent to the identification of the current node, and the hypertree is displayed with the omitted nodes and edges restored (step 218; FIGS. 16 and 17).

Figure 18:
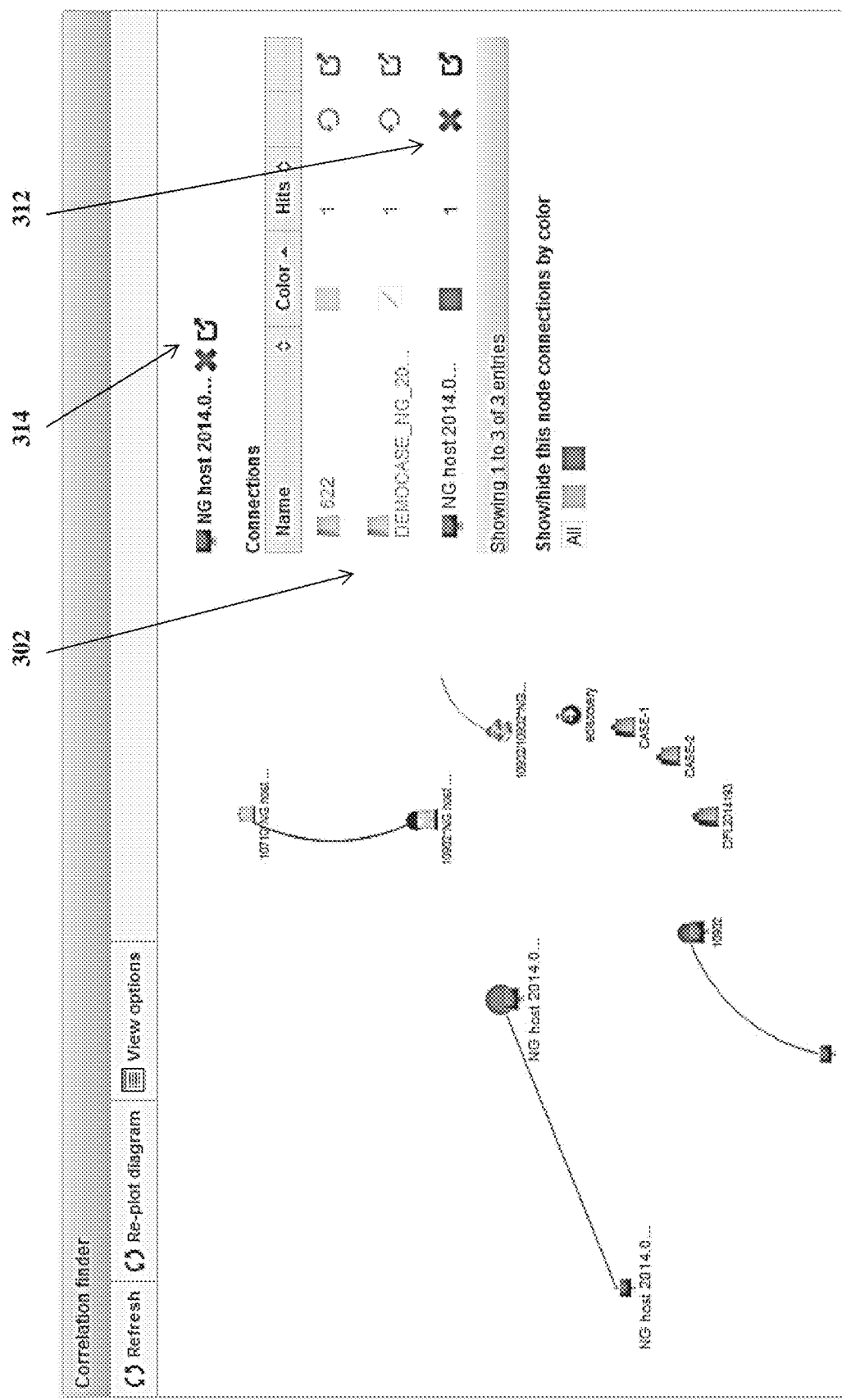
Figure 19:
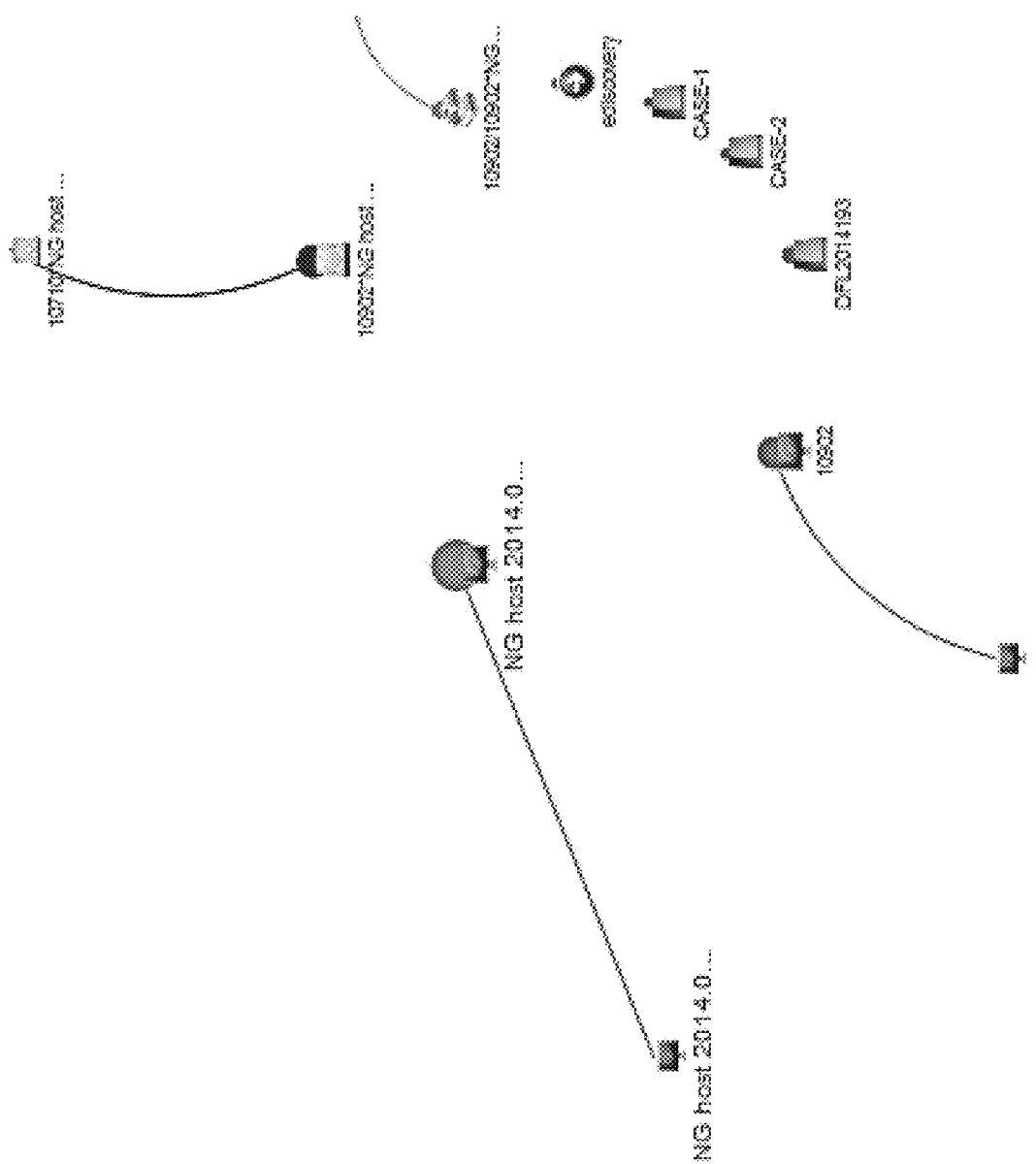

In step 220, the user removes from the hypertree diagram nodes linked to the current node, by clicking on an "X" icon 312 in the rows of table 302 that list the respective nodes connected the current node, and the hypertree is displayed with those nodes and the edges connecting those nodes with other nodes omitted from the hypertree (FIGS. 18 and 19).

In step 224, the user can open details of any node listed in table 302 by clicking on a "details" icon 314 in the table.

Figure 20:
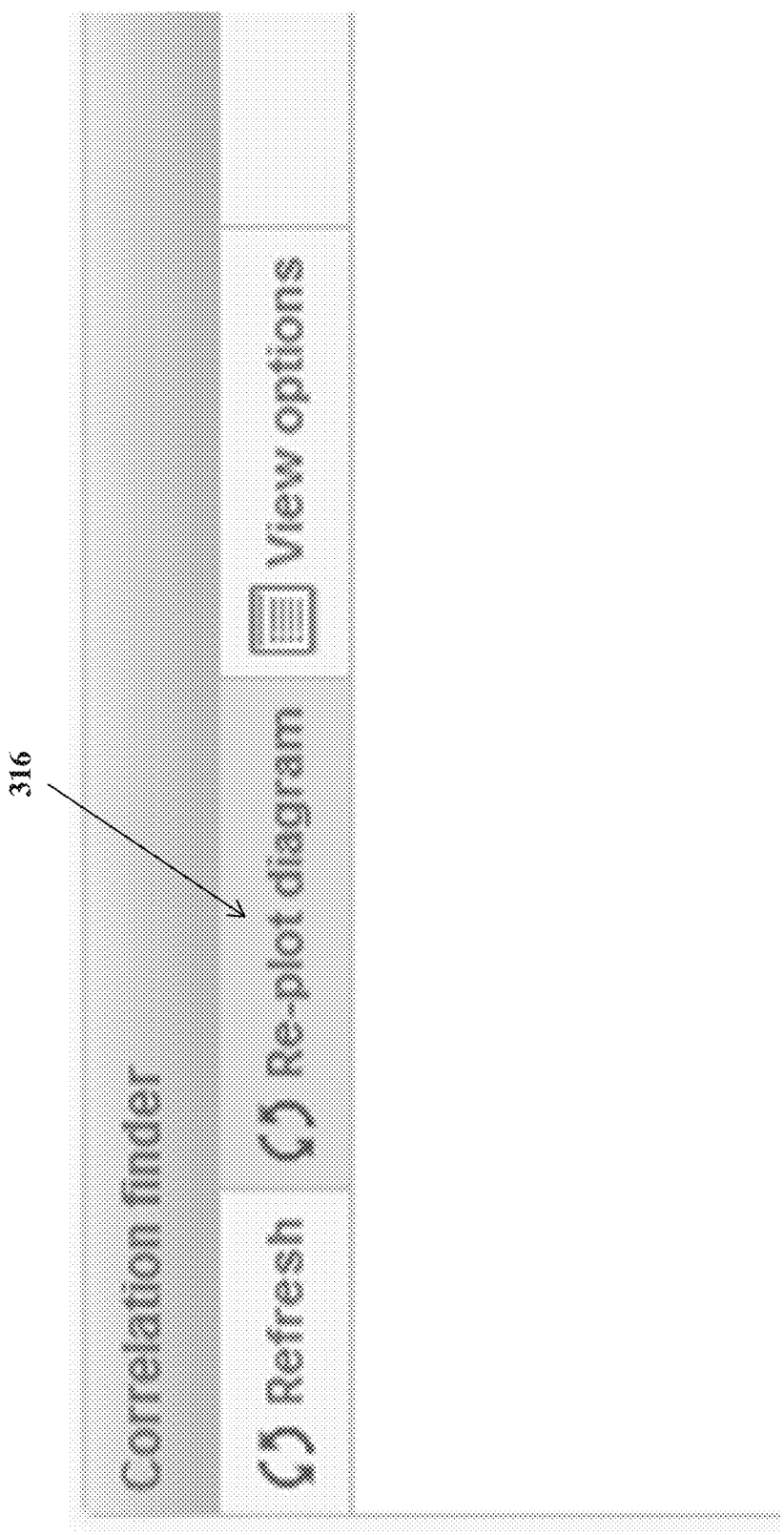
Figure 21:
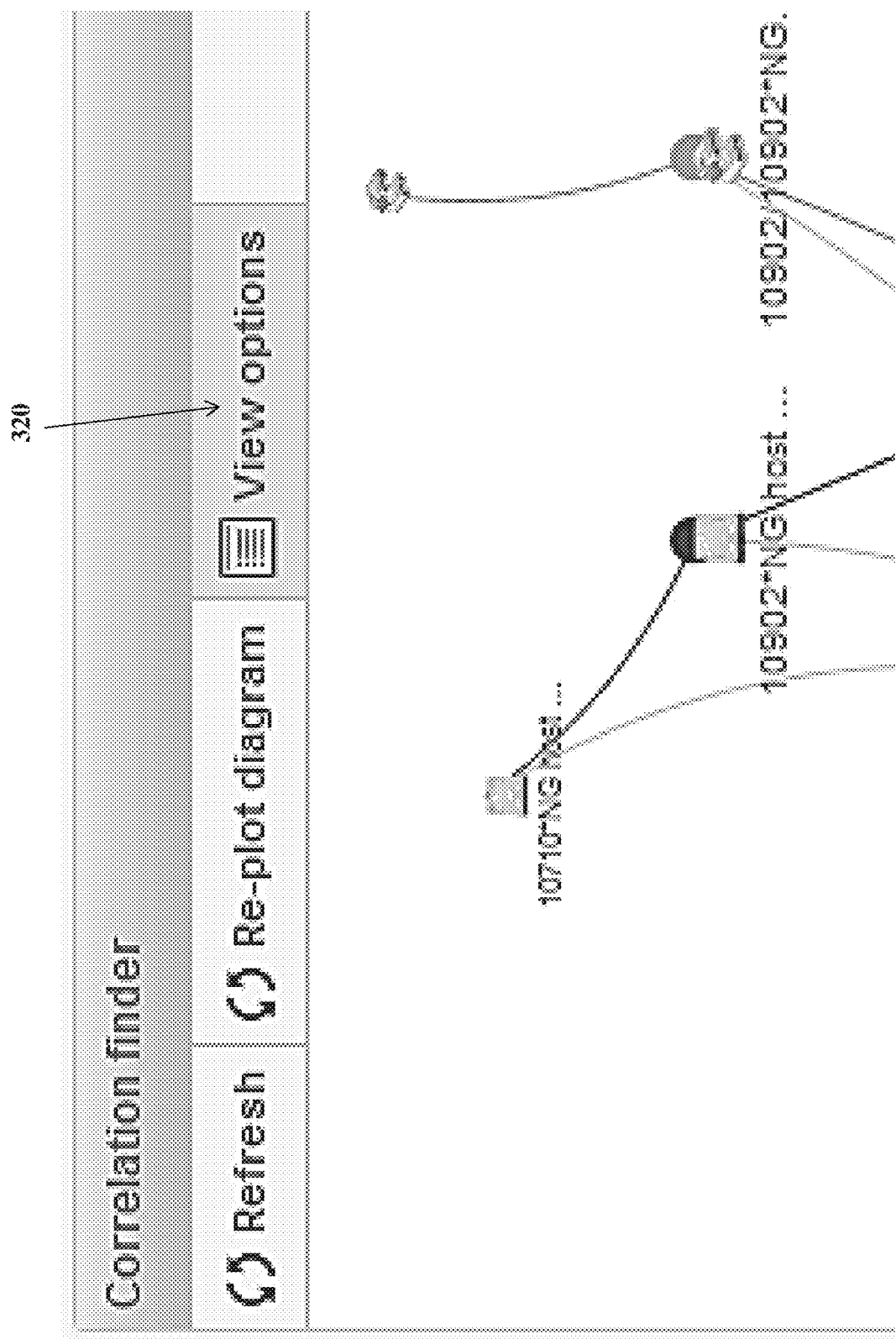
Figure 22:
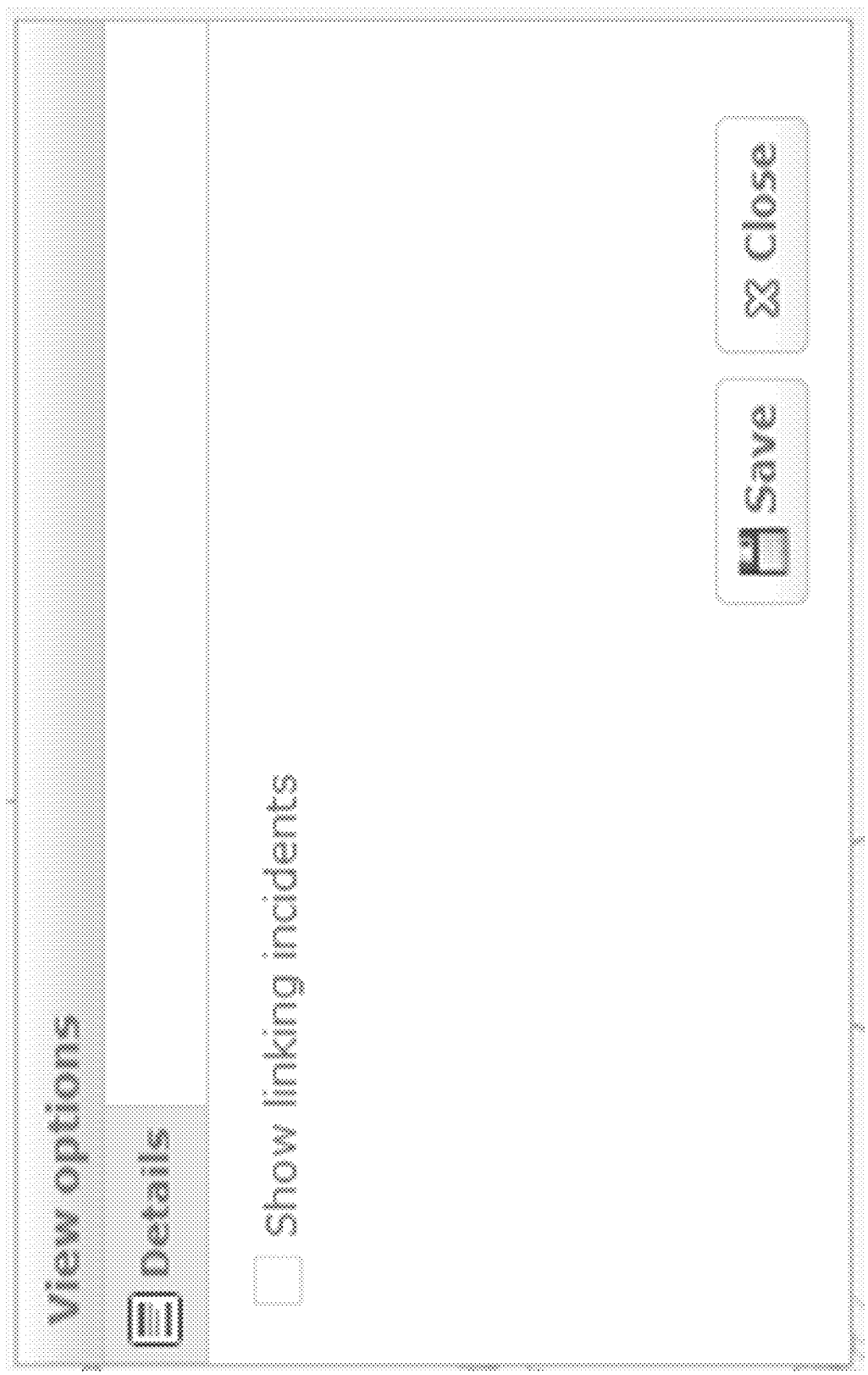
Figure 23:
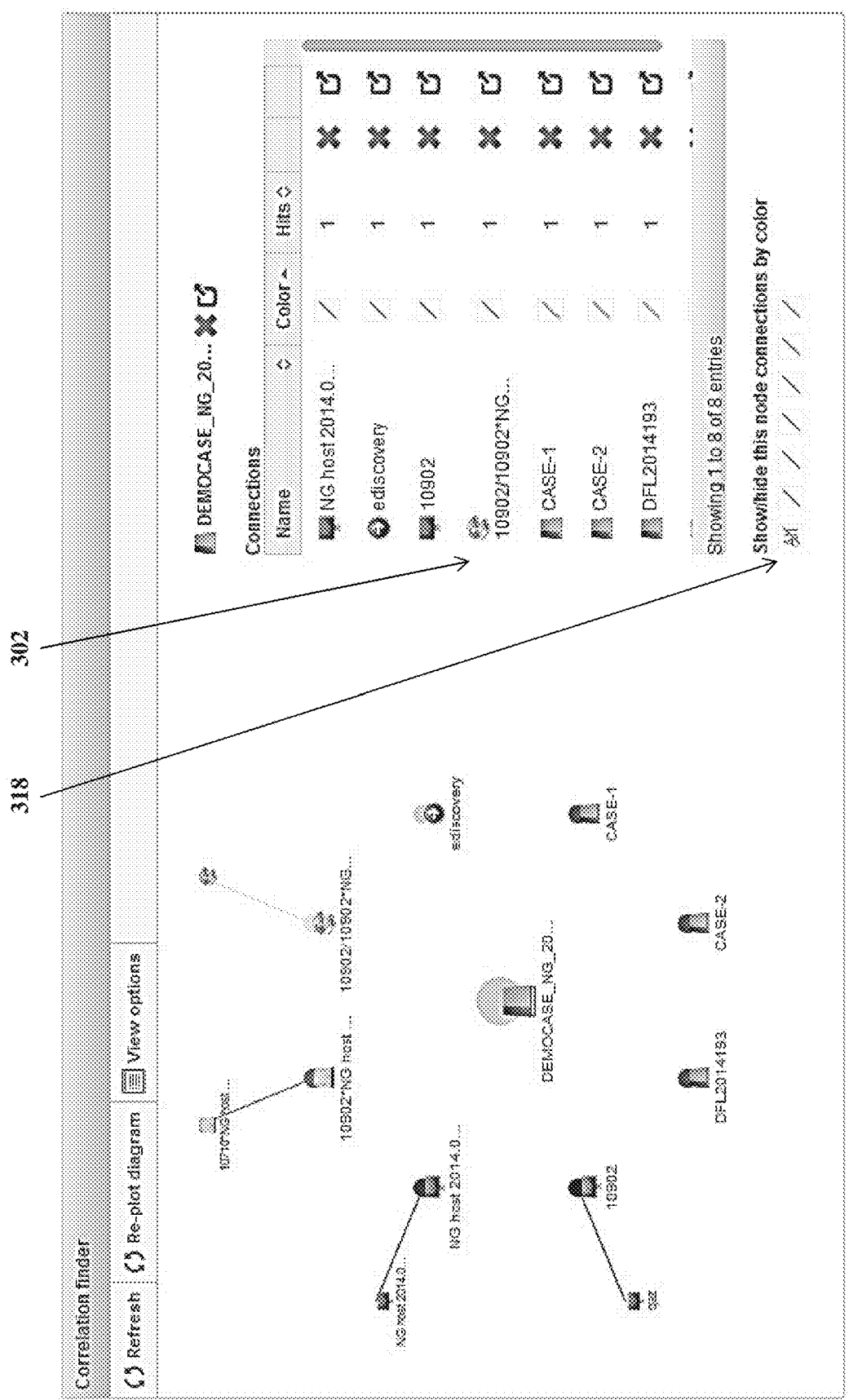
Figure 24:
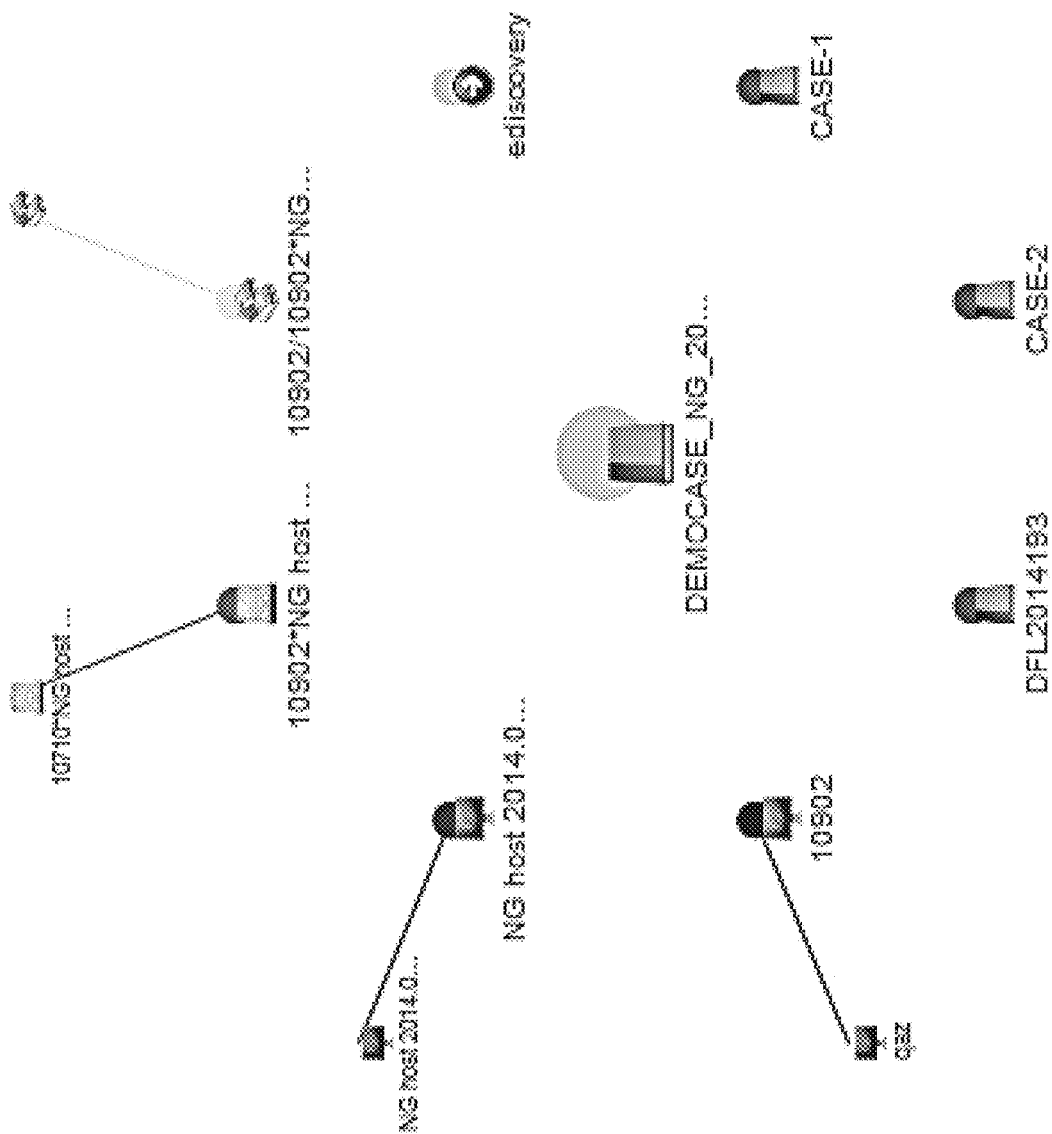

After having modified the hypertree diagram by removing nodes or links or both, the user might choose to re-plot the hypertree diagram without the removed nodes or links, and centered on the node representing the incident being investigated (in this case "DEMOCASE_NG_2014") by clicking on a "re-plot diagram" button 316 (step 226; FIG. 20). The user might open the "view options" panel by clicking on a "view options" button 320 (step 228; FIG. 21), and in the "view options" panel the user might enable or disable related incident nodes (step 230; FIG. 22). Then the re-plotted hypertree diagram is displayed, in this case without the related incident nodes "CASE 1," "CASE 2," "DFL2014193," "622") displayed because they were not disabled by the user in step 230 (FIGS. 23 and 24). Note that in the re-plotted hypertree diagram, the edge between "NG host 2014.0 . . . " and "622" is omitted, because the user previously omitted "622" from the hypertree in step 220. In FIGS. 23 and 24, the user has hidden all the current node connections by clicking on the "All" icon 318 under the table 302 (step 232).

Figure 25A:
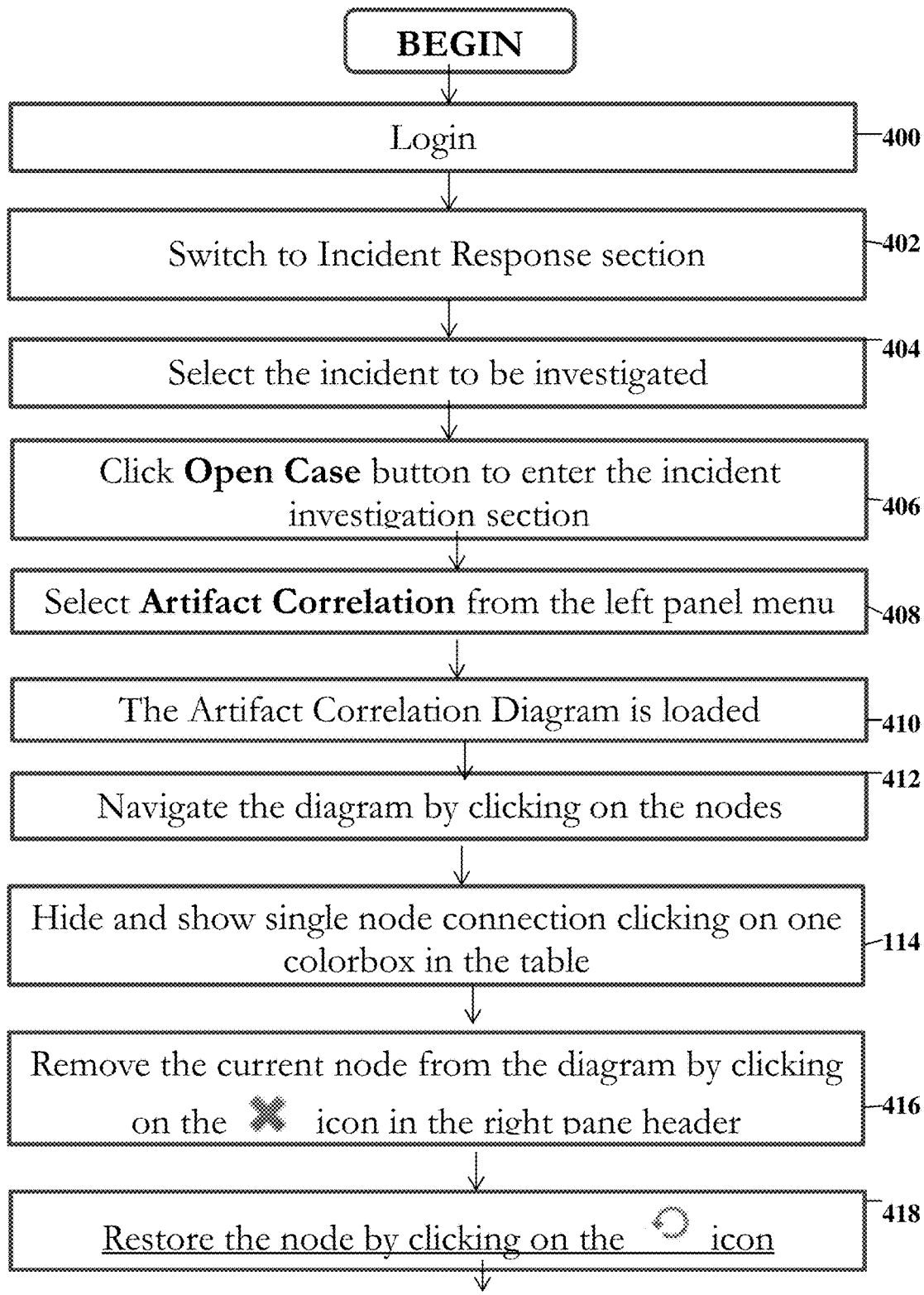
FIGS. 25A and 25B are a flowchart diagram of steps that a user of the artifact correlator according to the invention might perform in interacting with the interface provided by the artifact correlator.
Figure 25B:
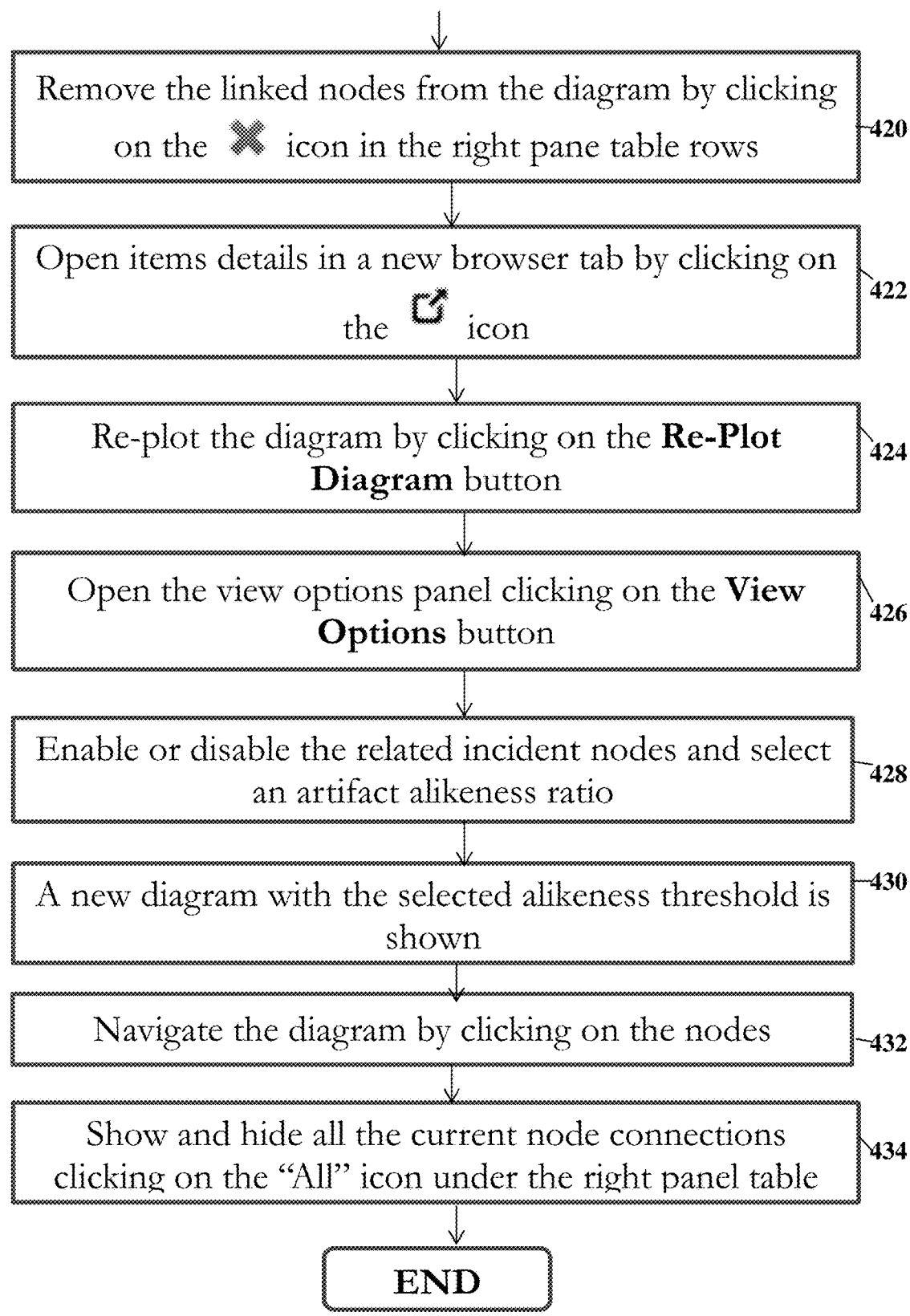

With reference to FIGS. 25A and 25B, there is shown a flowchart diagram of steps that a user of the artifacts correlator according to the invention might perform in interacting with the interface provided by the artifacts correlator. The artifacts correlator displays and allows navigation of artifacts that have points of correlation with incidents or other incident element artifacts. This feature uses an interface similar to the one described above with respect to the correlation finder, but using an artifacts correlation algorithm that returns all the incident element artifacts, available from a local or remote data repository, that have some point of correlation with other incident element artifacts. This flowchart diagram illustrates only one particular sequence of steps that a user might perform, and it will be appreciated that the steps shown in the flowchart might alternatively be performed in a different order, or with certain steps omitted, etc. FIGS. 3-6 and 26-47 are screen displays corresponding to various steps in the flowchart diagram of FIG. 25.

Figure 26:
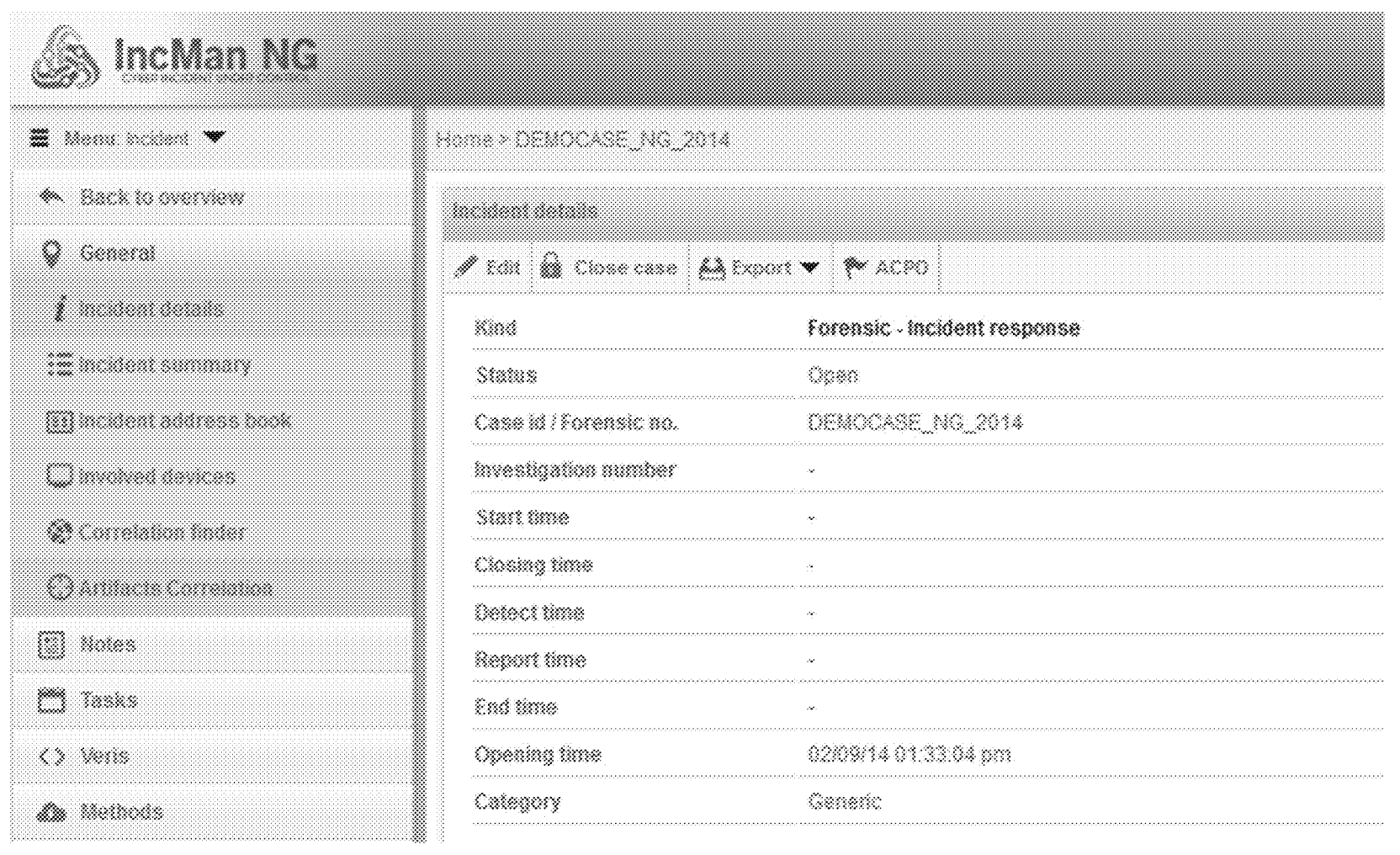
Figure 27:
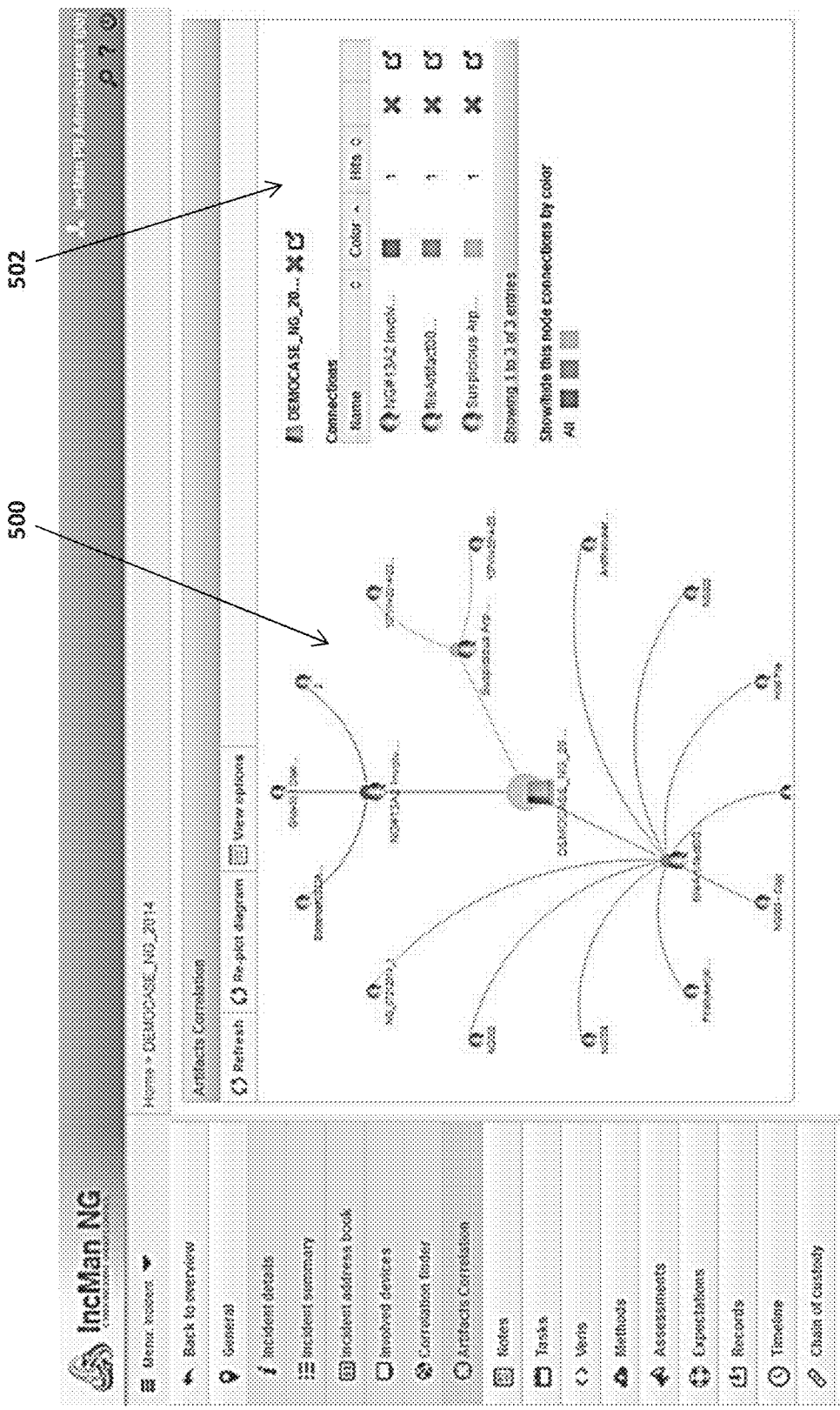
Figure 28:
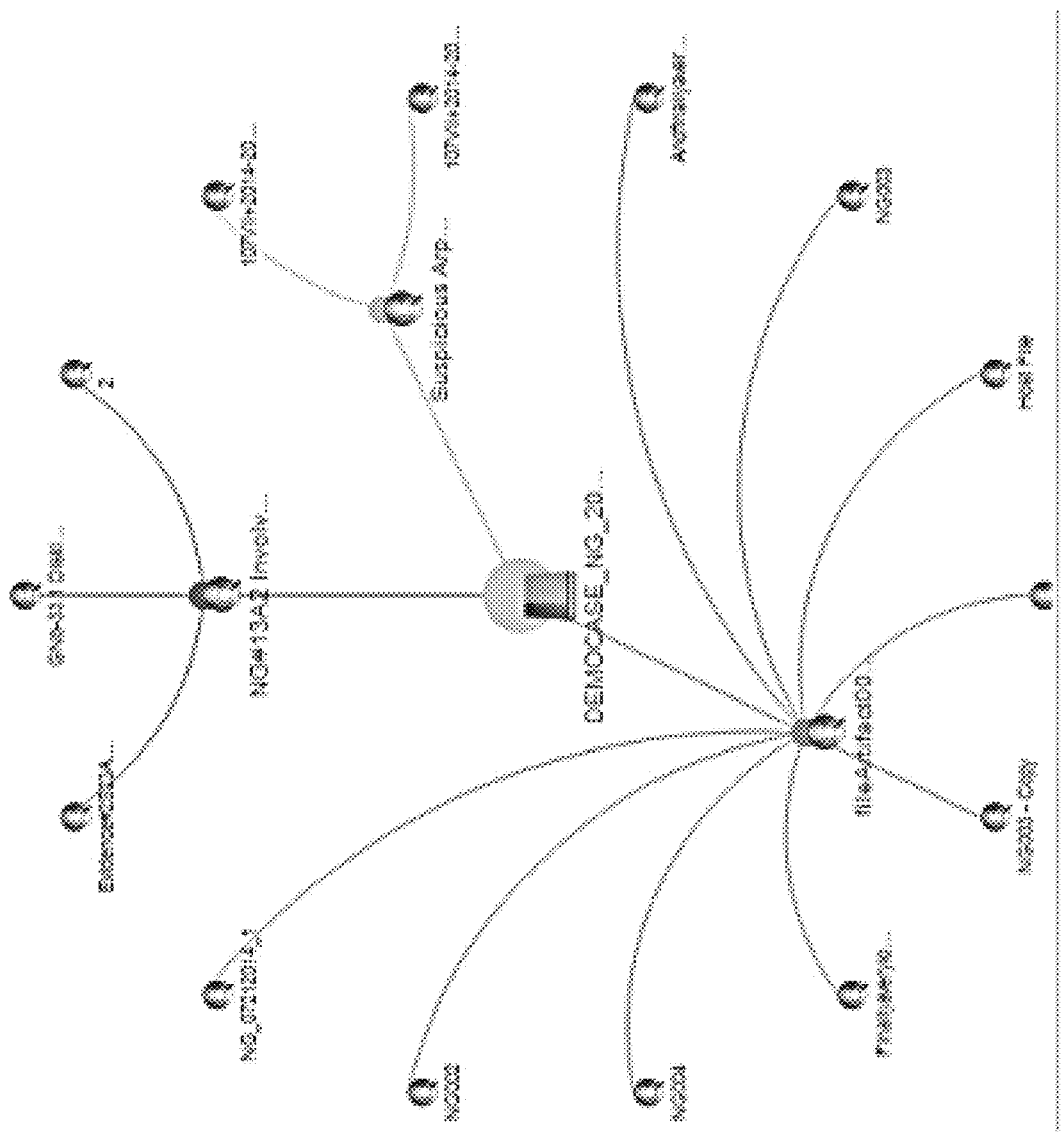

In order to use the artifacts correlator, the user first logs in to the incident management system by entering a user name and password and clicking on a "login" button (step 400; FIG. 3). Then, the user switches to the incident response section of the incident management system by selecting "incident response" from a drop-down menu (step 402; FIG. 4). Next, the user selects an incident to be investigated by selecting an incident from a list displayed on a screen (step 404; FIG. 5). In FIG. 5, the user selects "DEMOCASE_NG_2014" as the incident to be investigated. The user clicks an "open case" button on the screen display to enter the incident investigation section of the incident management system (step 406; FIG. 6). Next, the user selects "artifacts correlation" from a panel menu on the display (step 408; FIG. 26). An artifact correlation diagram is then loaded and displayed (step 410; FIGS. 27 and 28).

As is shown in FIGS. 27 and 28, the artifacts correlator uses an artifacts correlation algorithm that matches artifacts elements using an alikeness ratio as a cutoff threshold so that only artifacts elements having an alikeness exceeding the alikeness ratio are displayed in a hypertree 500. In hypertree 500 the books ("DEMOCASE_NG_20 . . . ,") represent incidents, and all other elements are "artifacts," which represent vulnerabilities, means used to conduct an attack, etc. In hypertree 500 the nodes linked by edges to the node representing the current incident, "DEMOCASE_NG_20," are artifacts having an alikeness exceeding the alikeness ratio with respect to "DEMOCASE_NG_20." The hypertree shows the nodes that are linked by edges to the "DEMOCASE_NG_20," as well as the nodes that are in turn linked by edges to those aforementioned nodes that are linked by edges to "DEMOCASE_NG_20." The different edges to the node representing the current incident are colored differently from each other when there are differences in the nature of the relationships of the node representing the current incident to the other nodes, and colored similarly to each other when the nature of the relationship of the node representing the current incident to the other nodes is the same. Thus, some of the edges to the node representing the current incident might be colored the same while simultaneously other edges to the node representing the current incident might be colored differently. Similar color coding techniques are used with respect to the other nodes displayed in the hypertree. A table 502 on the screen display identifies the node representing the current incident and lists the connections to the node representing the current incident, by the names of the nodes linked to the node representing the current incident, and by the respective color of the edges linking the respective nodes to the node representing the current incident. The user can zoom in on a portion of the hypertree by selecting a zoom feature under the "view options" button.

Figure 29:
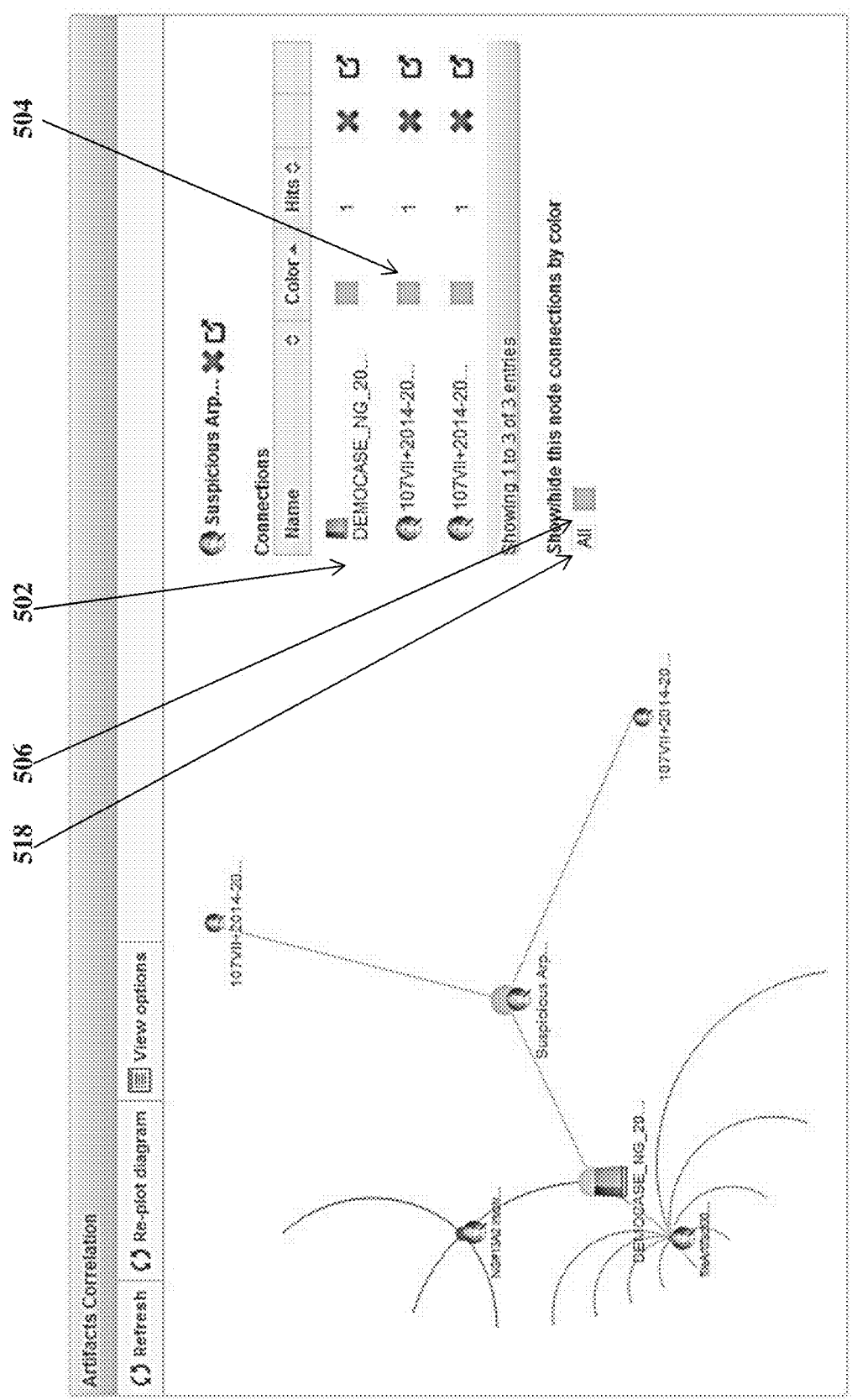
Figure 30:
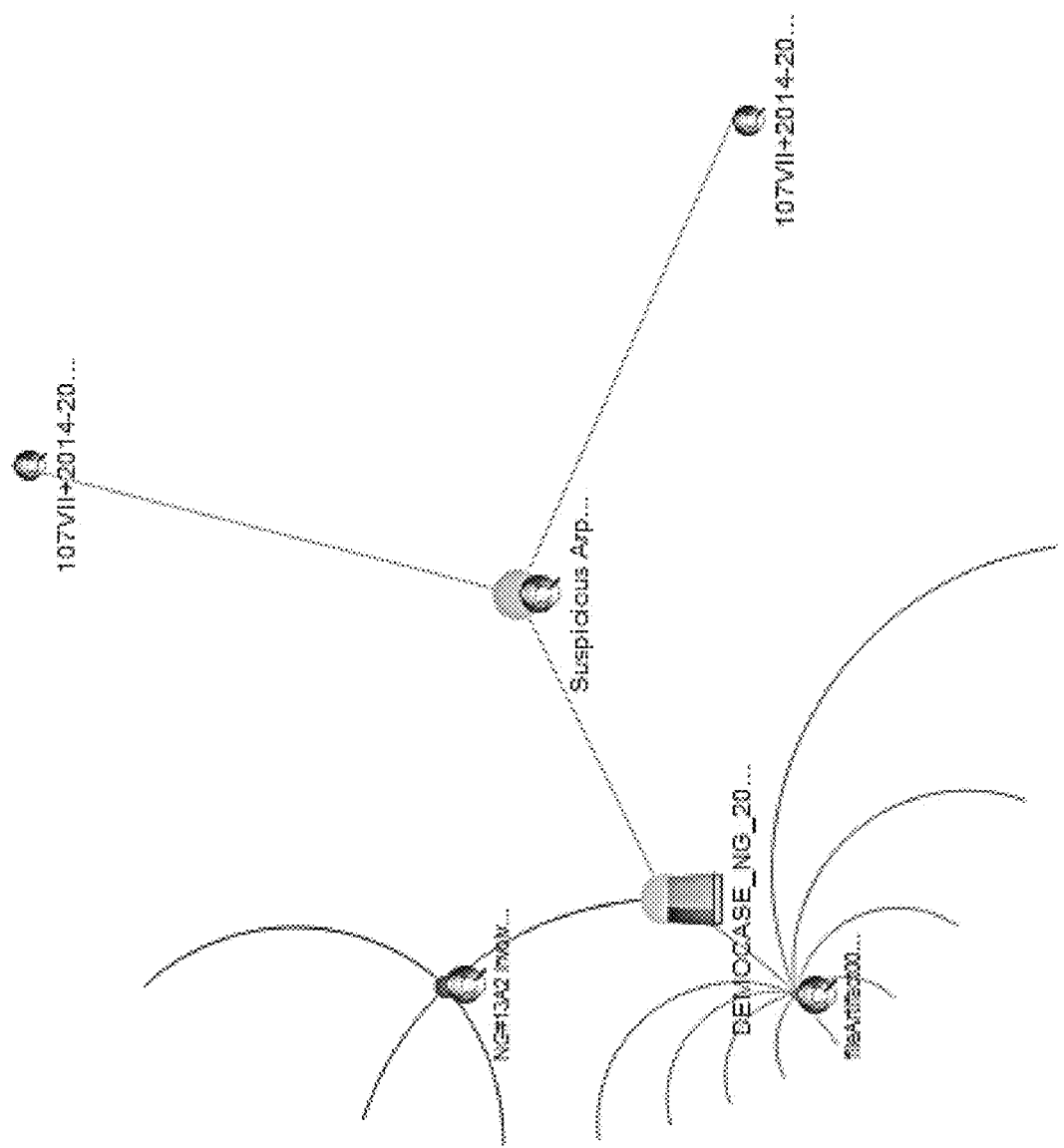

In step 412, the user navigates the displayed hypertree by clicking on one of the nodes, causing the hypertree to be re-centered around the clicked node, in this case "Suspicious Arp . . . " The hypertree 500 is re-centered around the clicked node, and the edges to the clicked node are lengthened while the edges to the original node, in this case "DEMOCASE_NG_20 . . . ," are shortened, as is shown in FIGS. 29 and 30. The table 502 on the screen display identifies the clicked node and lists the connections to the clicked node, by the names of the nodes linked to the clicked node, and by the respective color of the edges linking the respective nodes to the clicked node.

Figure 31:
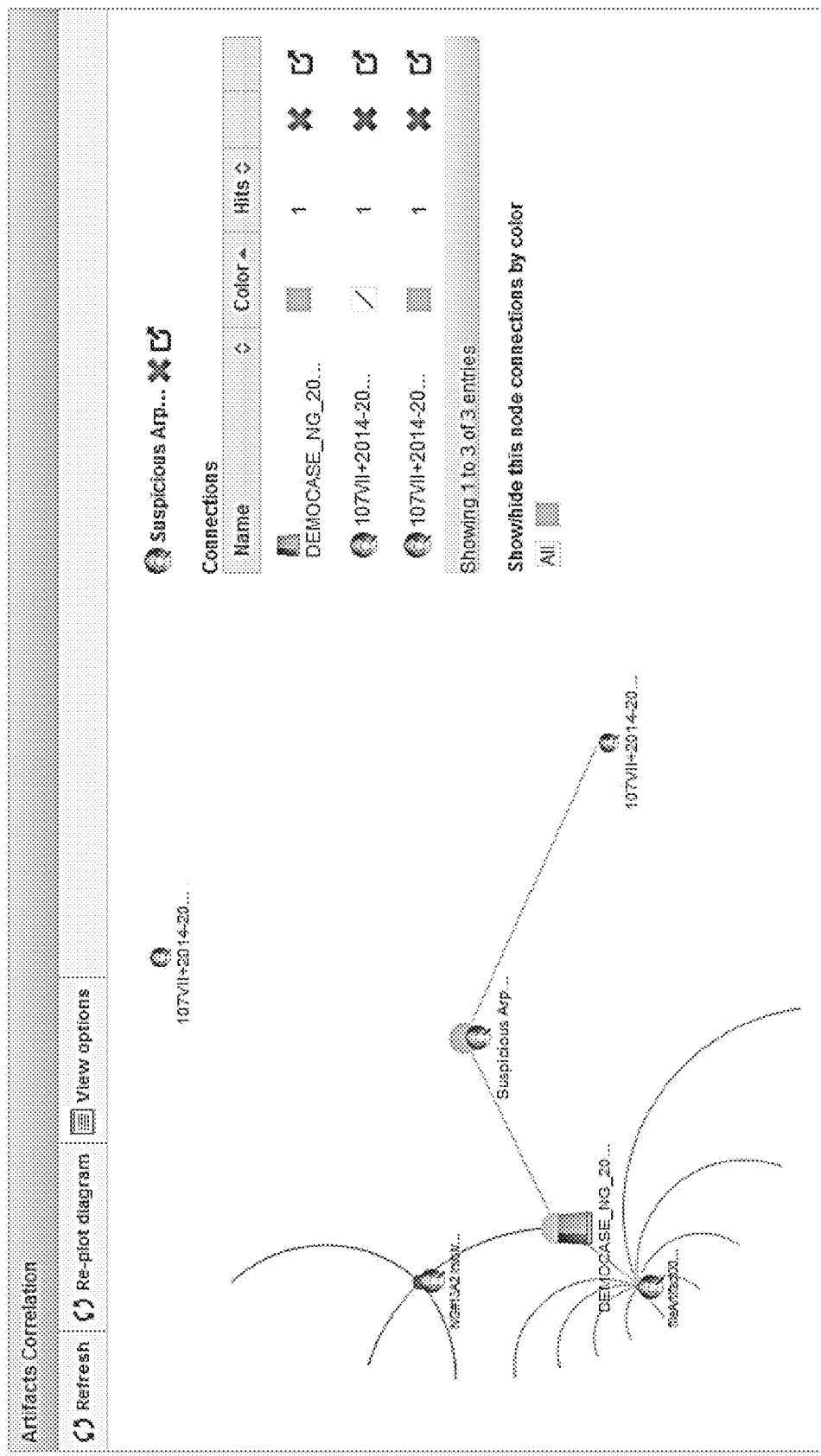
Figure 32:
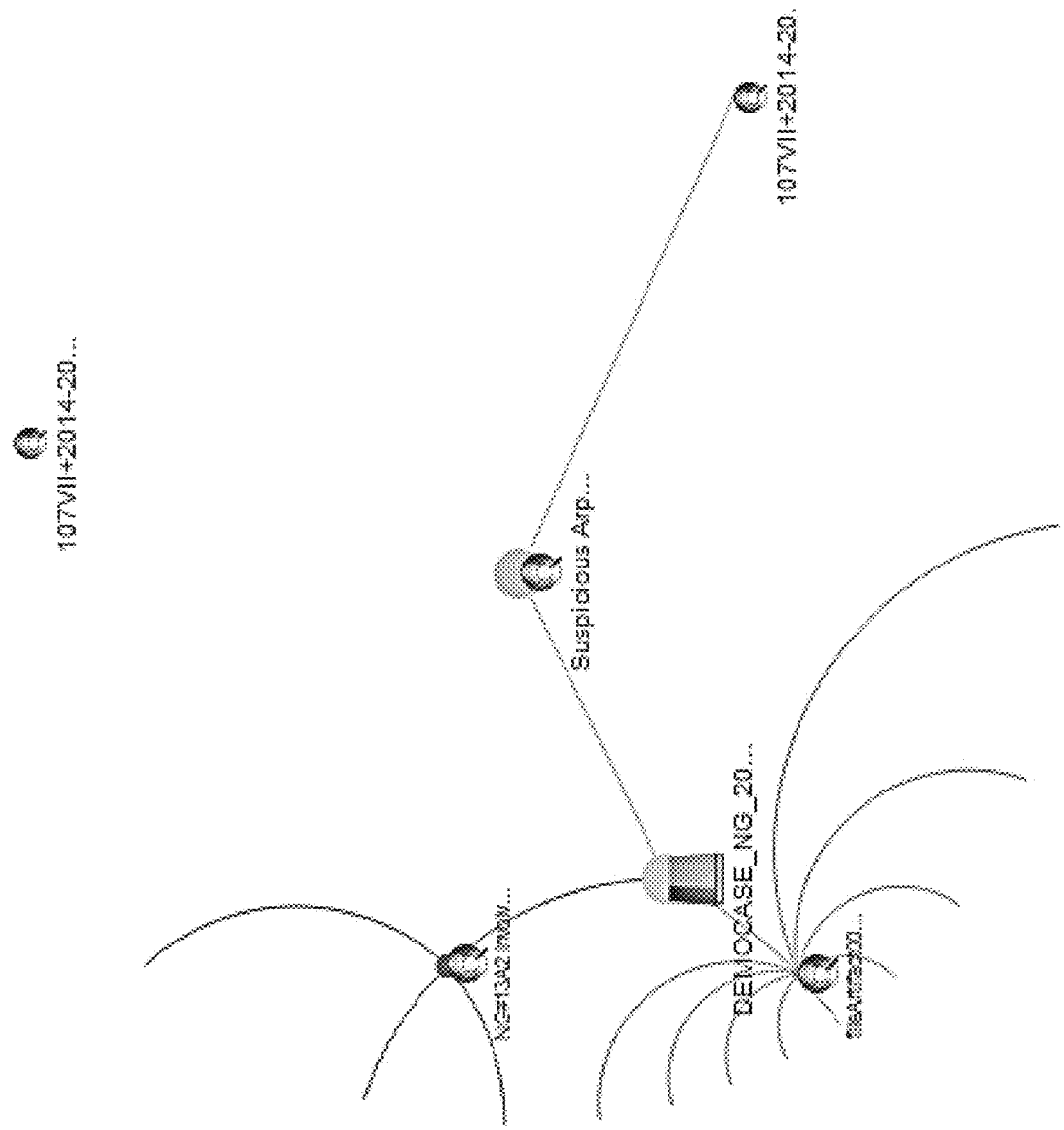

In step 414, the user hides or shows a single node connection by clicking on one of a set of colorboxes 504 on the table 502 corresponding to respective connections to the clicked node (FIGS. 31 and 32). In this case, the user clicks on the colorbox corresponding to the connection between "Suspicious Arp . . . " and "107VII+2014-20," and the edge between these two nodes is omitted from the displayed hypertree. Underneath the table 502 is a set of colorboxes 506 that can be clicked by the user to hide or show all links of the same color, and an "All" icon 518 that can be clicked by the user to hide or show all links regardless of their color.

Figure 33:
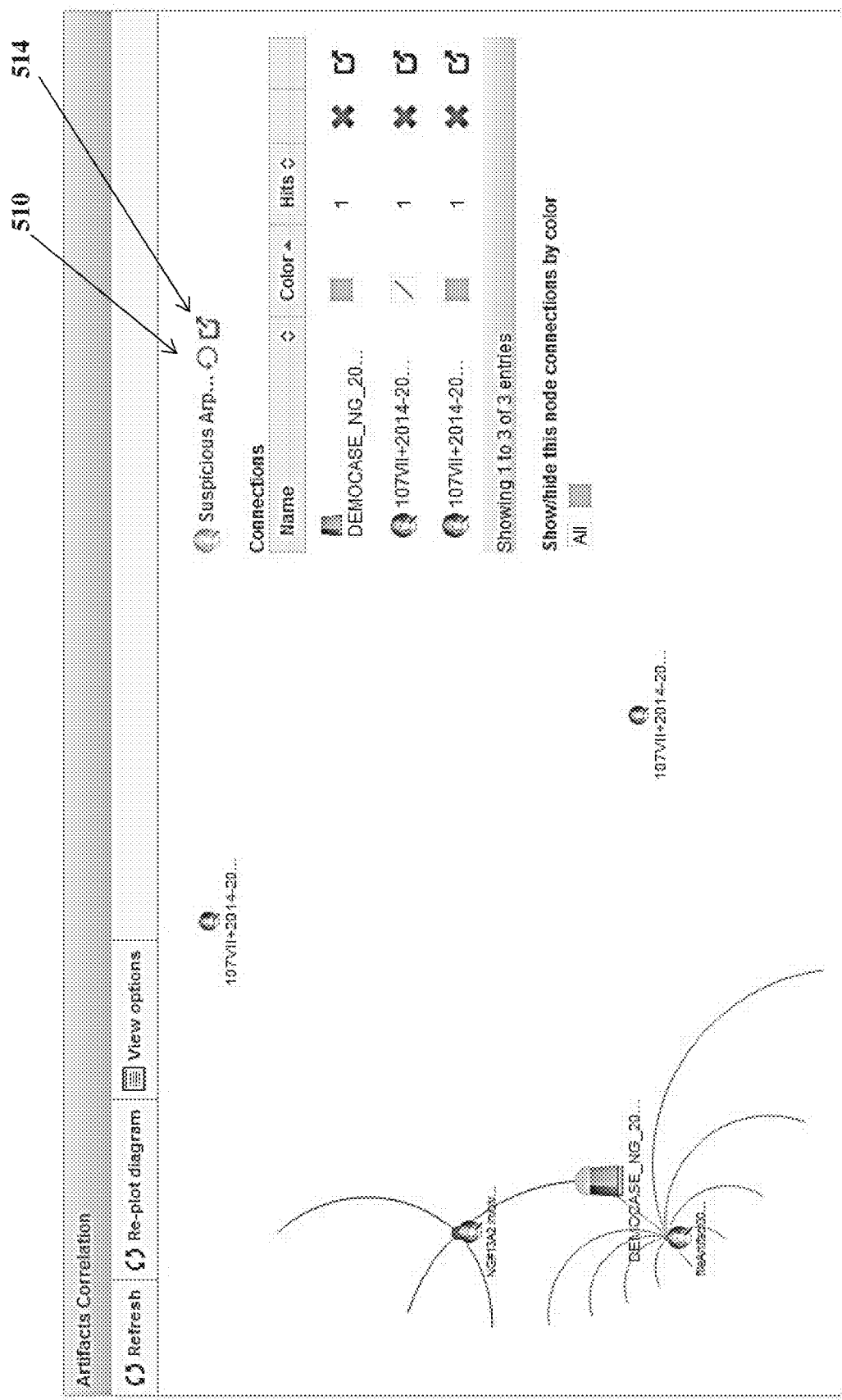
Figure 34:
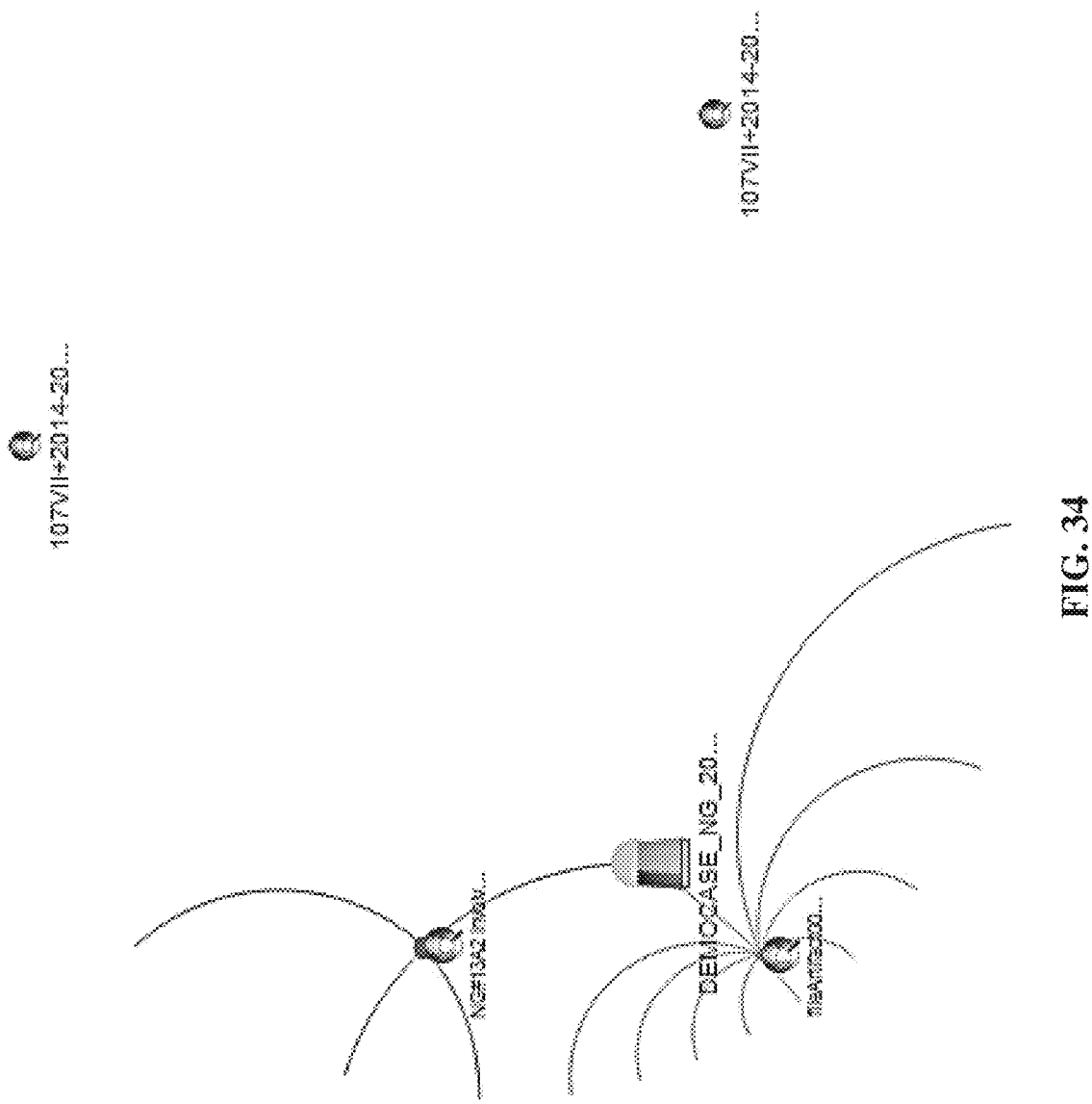
Figure 35:
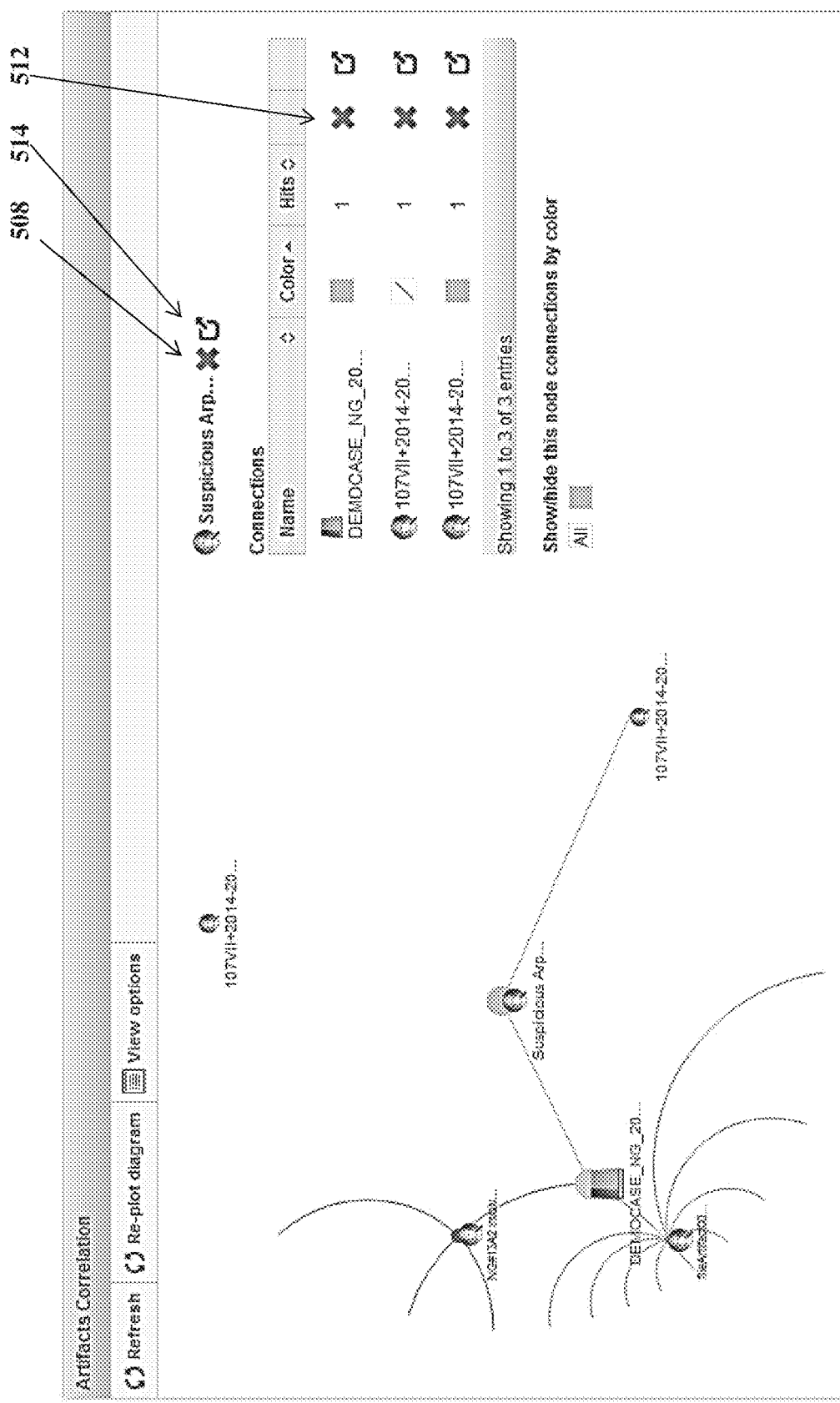
Figure 36:
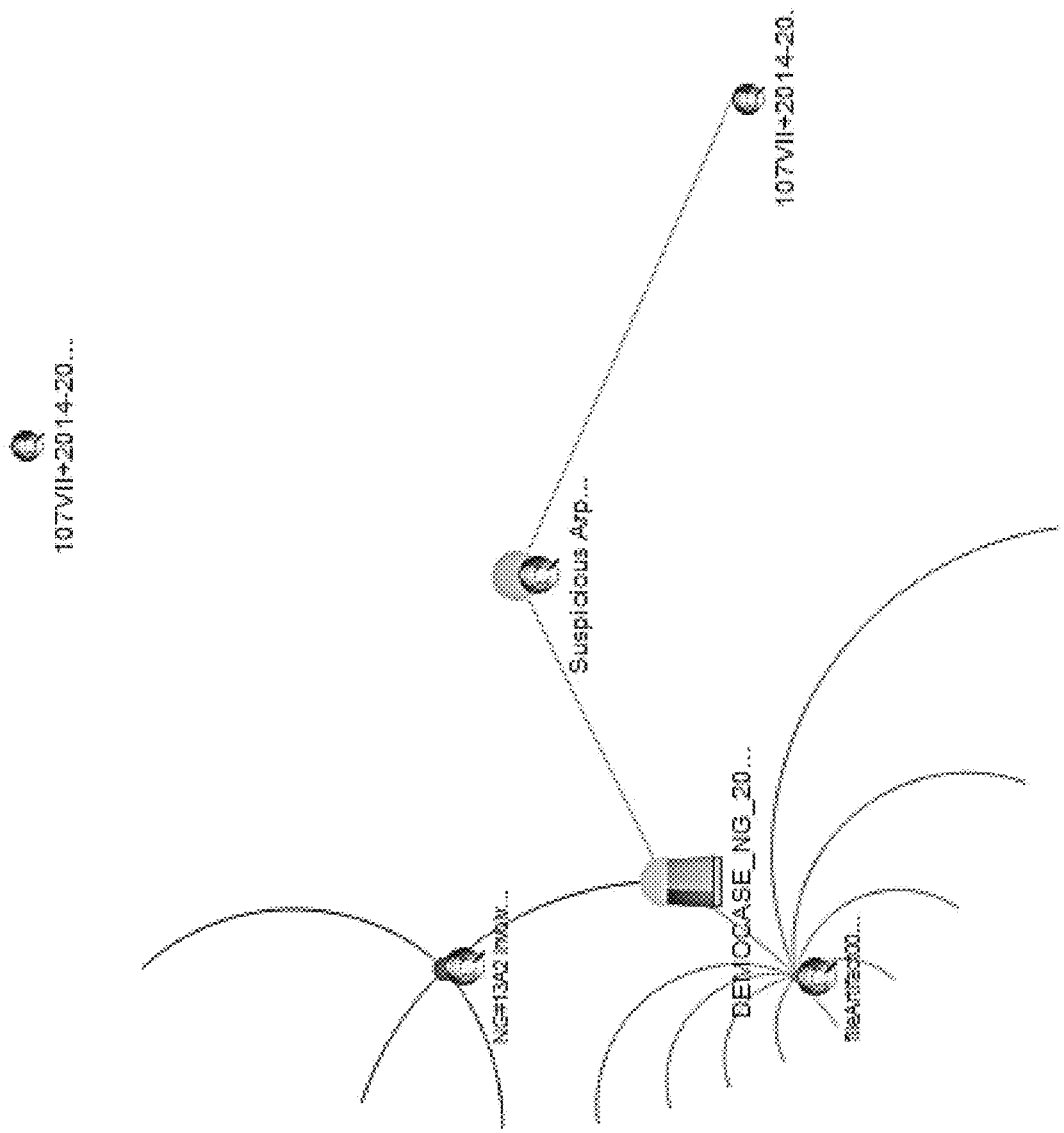

Next, the user might remove the current, clicked node from the hypertree diagram by clicking on an "X" icon 508 adjacent to the identification of the current, clicked node, and the hypertree is displayed with the current, clicked node and the edges connecting it with other nodes omitted from the hypertree (step 416; FIGS. 33 and 34). The user might restore the current node by clicking on a "restore" icon 510 adjacent to the identification of the current node, and the hypertree is displayed with the omitted nodes and edges restored (step 418; FIGS. 35 and 36).

Figure 37:
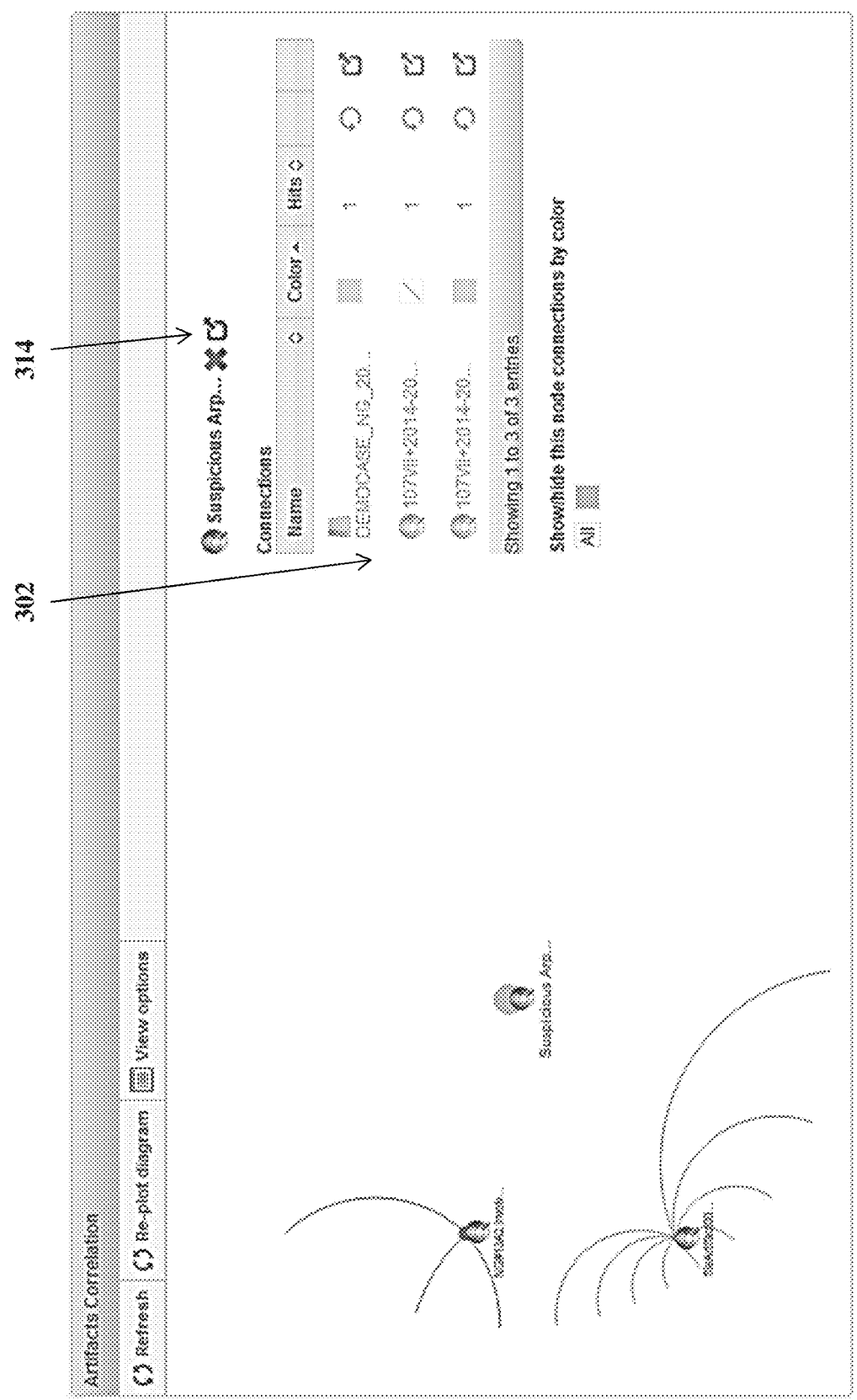
Figure 38:
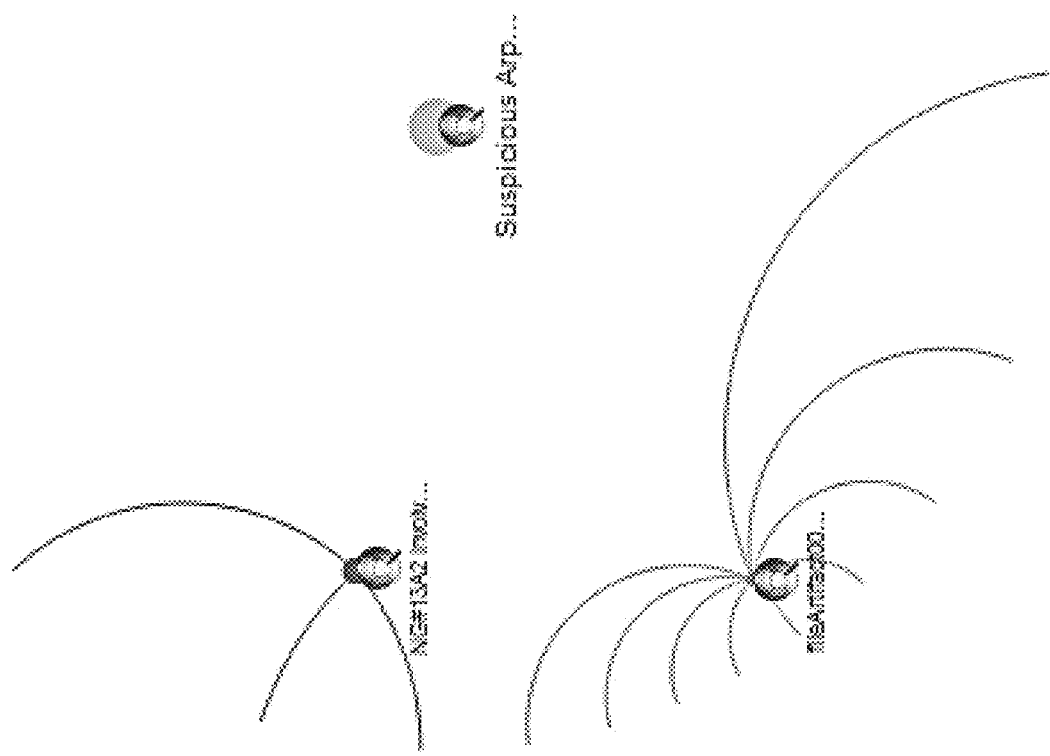

In step 420, the user removes from the hypertree diagram nodes linked to the current node, by clicking on an "X" icon 512 in the rows of table 502 that list the respective nodes connected the current node, and the hypertree is displayed with those nodes and the edges connecting those nodes with other nodes omitted from the hypertree (FIGS. 37 and 38).

In step 424, the user can open details of any node listed in table 502 by clicking on a "details" icon 514 in the table.

Figure 39:
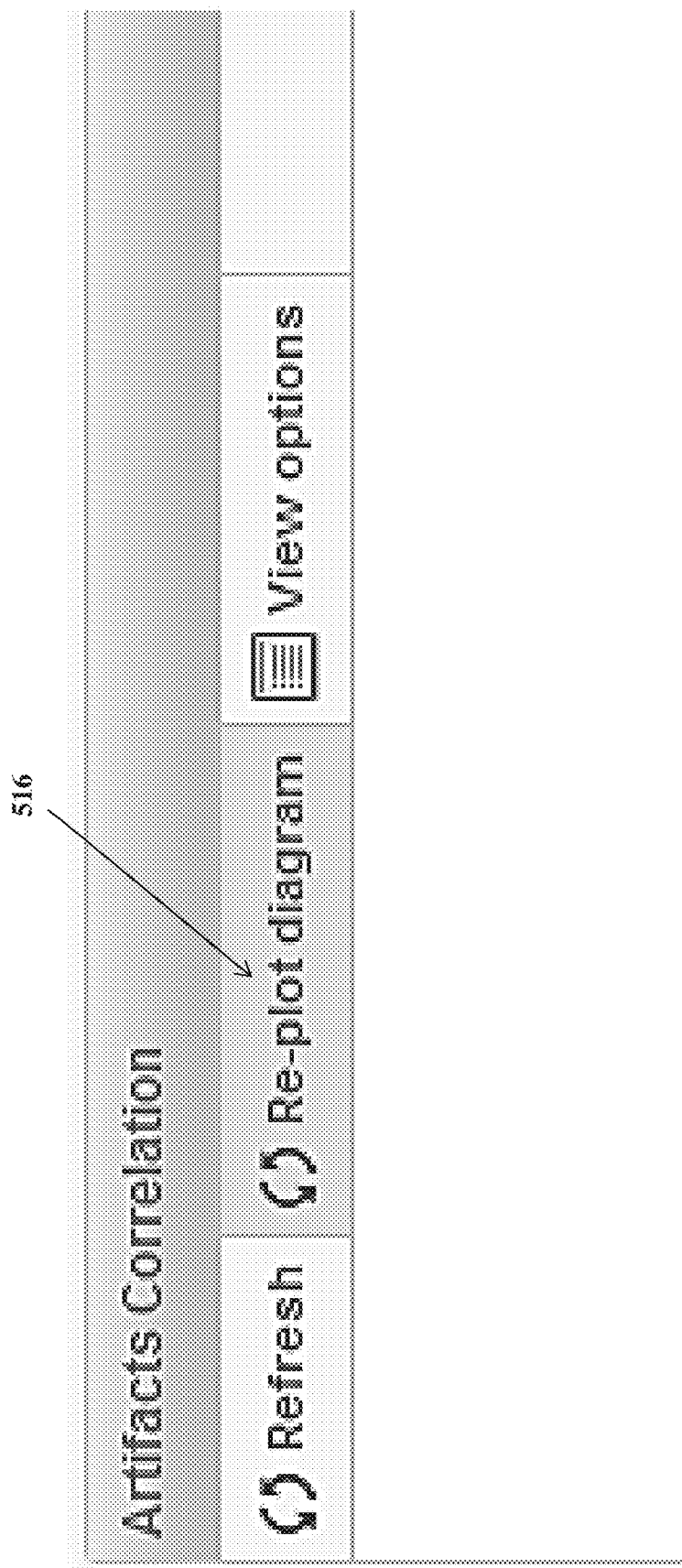
Figure 40:
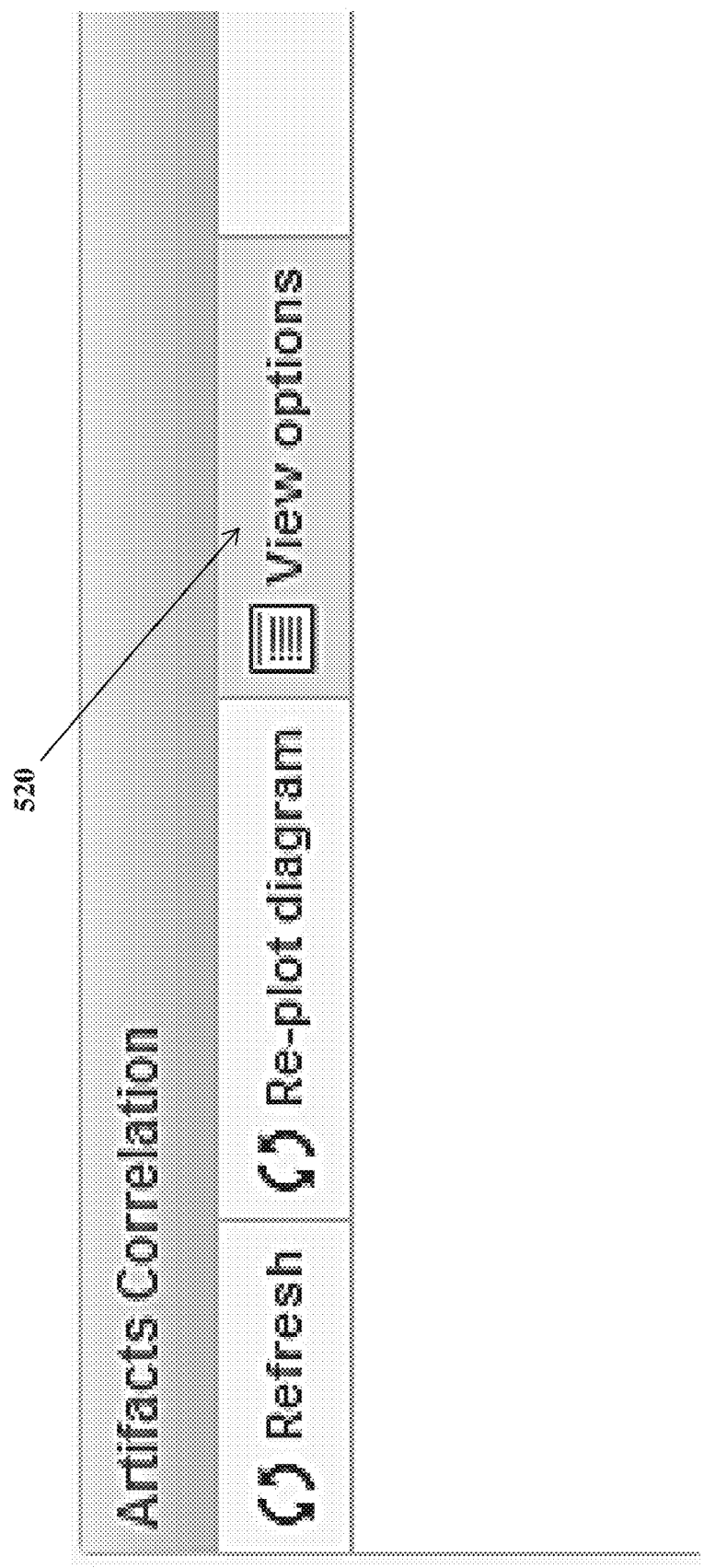
Figure 41:
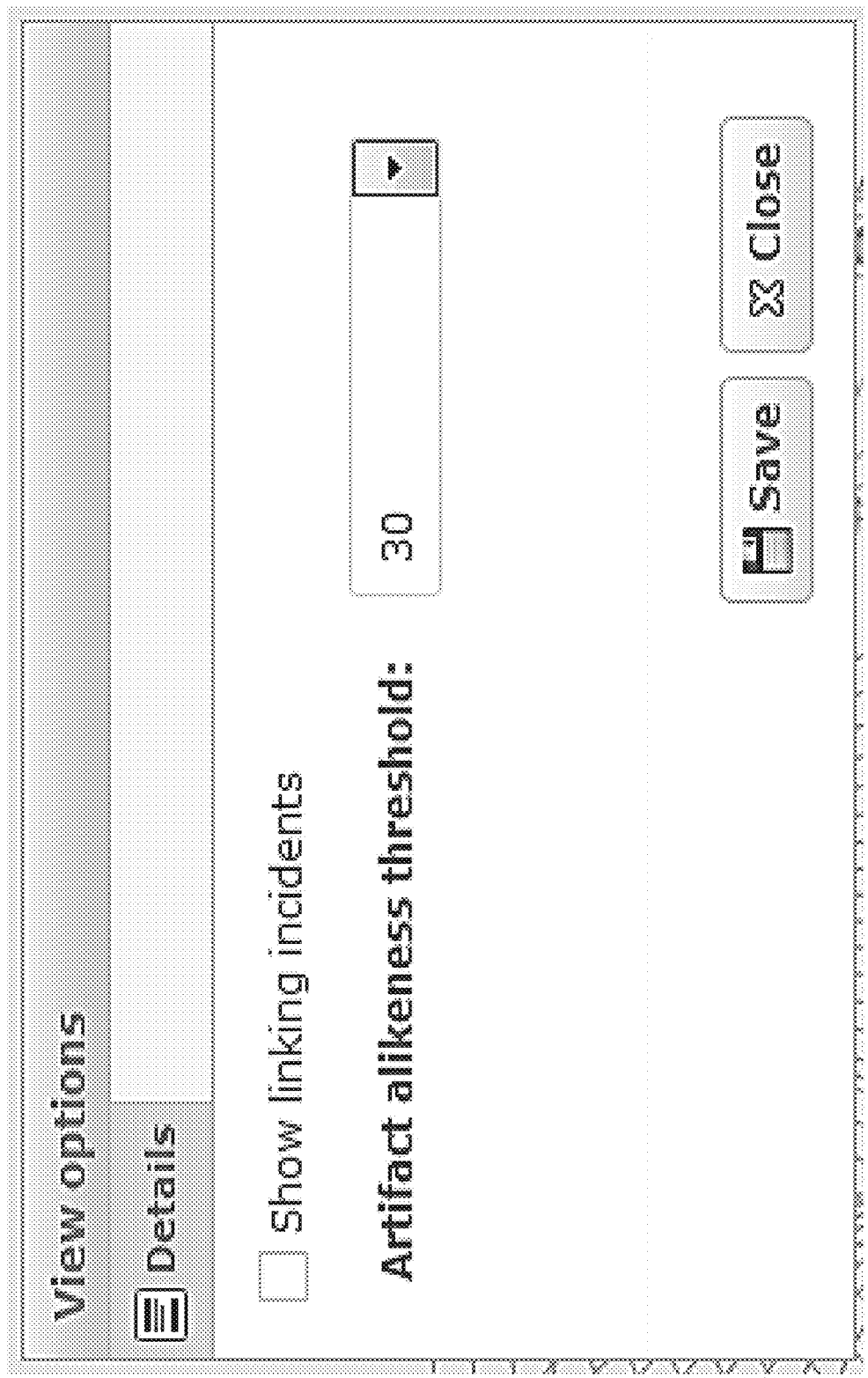
Figure 42:
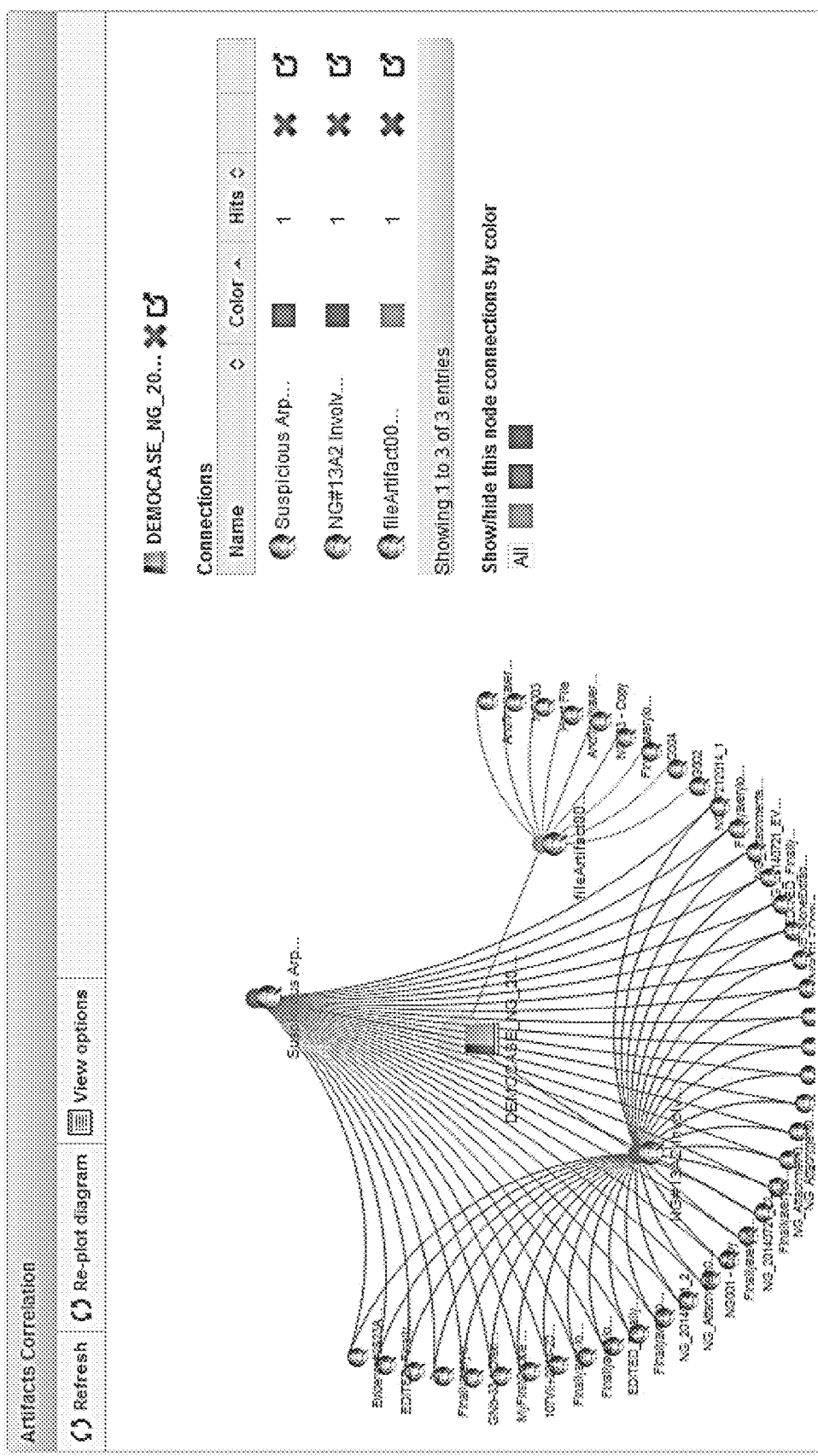
Figure 43:
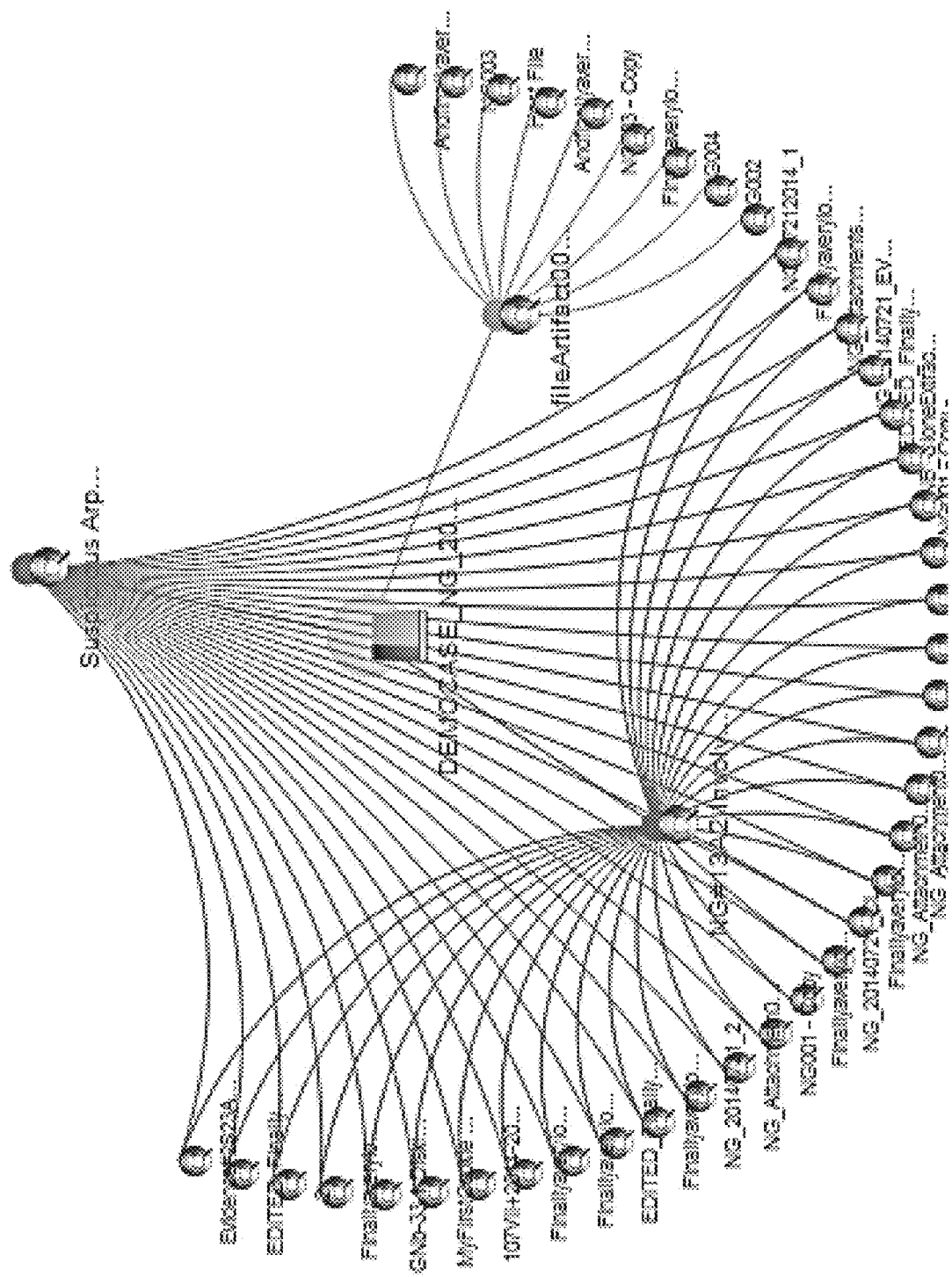

After having modified the hypertree diagram by removing nodes or links or both, the user might choose to re-plot the hypertree diagram without the removed nodes or links, and centered on the node representing the incident being investigated (in this case "DEMOCASE_NG_20 . . . ") by clicking on a "re-plot diagram" button 516 (step 426; FIG. 39). The user might open the "view options" panel by clicking on a "view options" button 520 (step 428; FIG. 40), and in the "view options" panel the user might enable or disable related incident nodes and select an artifact alikeness ratio expressed as a percent number (step 430; FIG. 41). Then the re-plotted hypertree diagram is shown (step 432), displaying all artifacts having a alikeness that exceeds the user-selected alikeness threshold with respect to "DEMOCASE_NG_20" or with respect to artifacts connected to DEMOCASE_NG_20" (FIGS. 42 and 43). The alikeness ratio allows the user to refine the displayed result to have a more loose or more precise representation of similarities.

Figure 44:
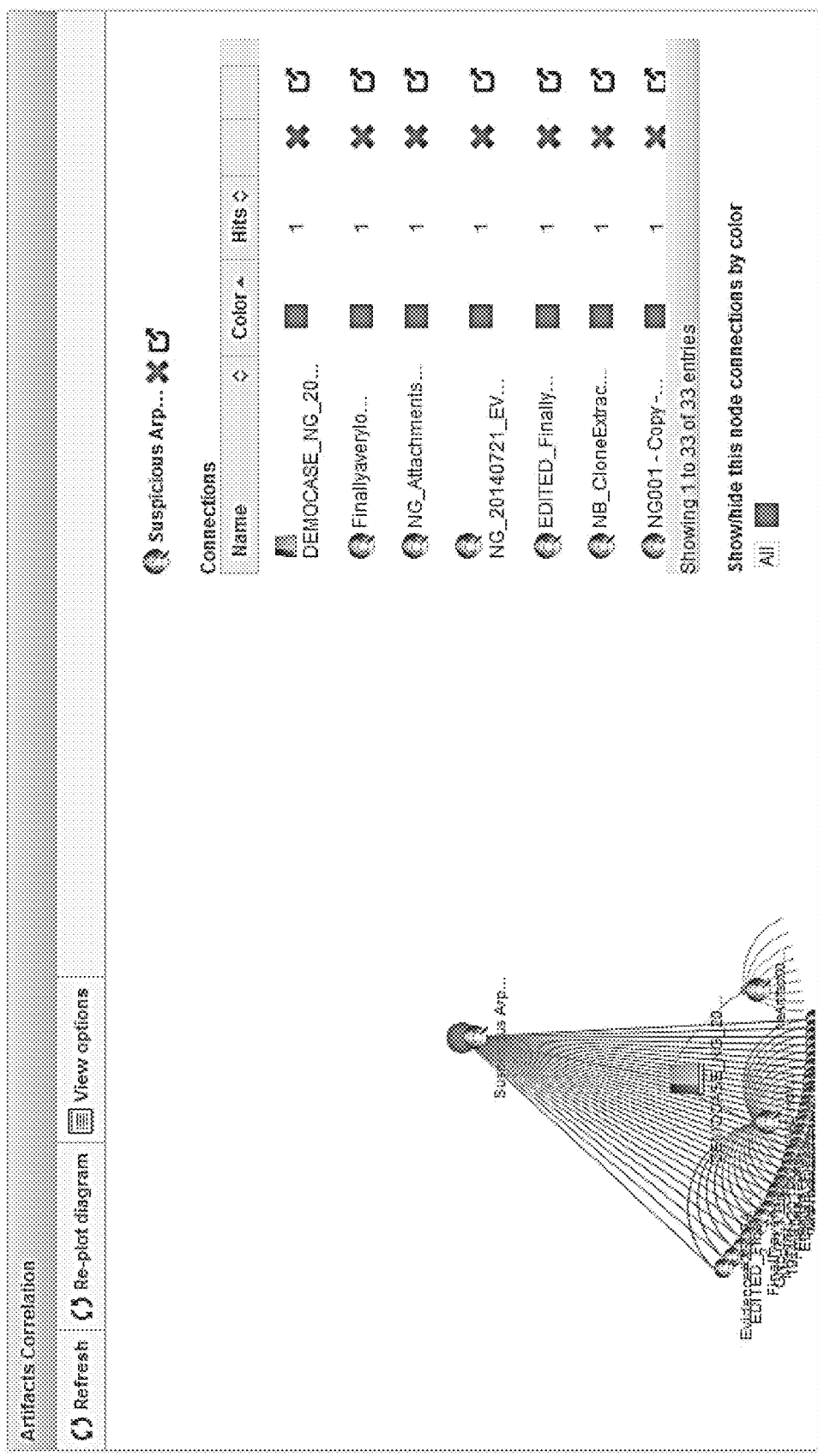
Figure 45:
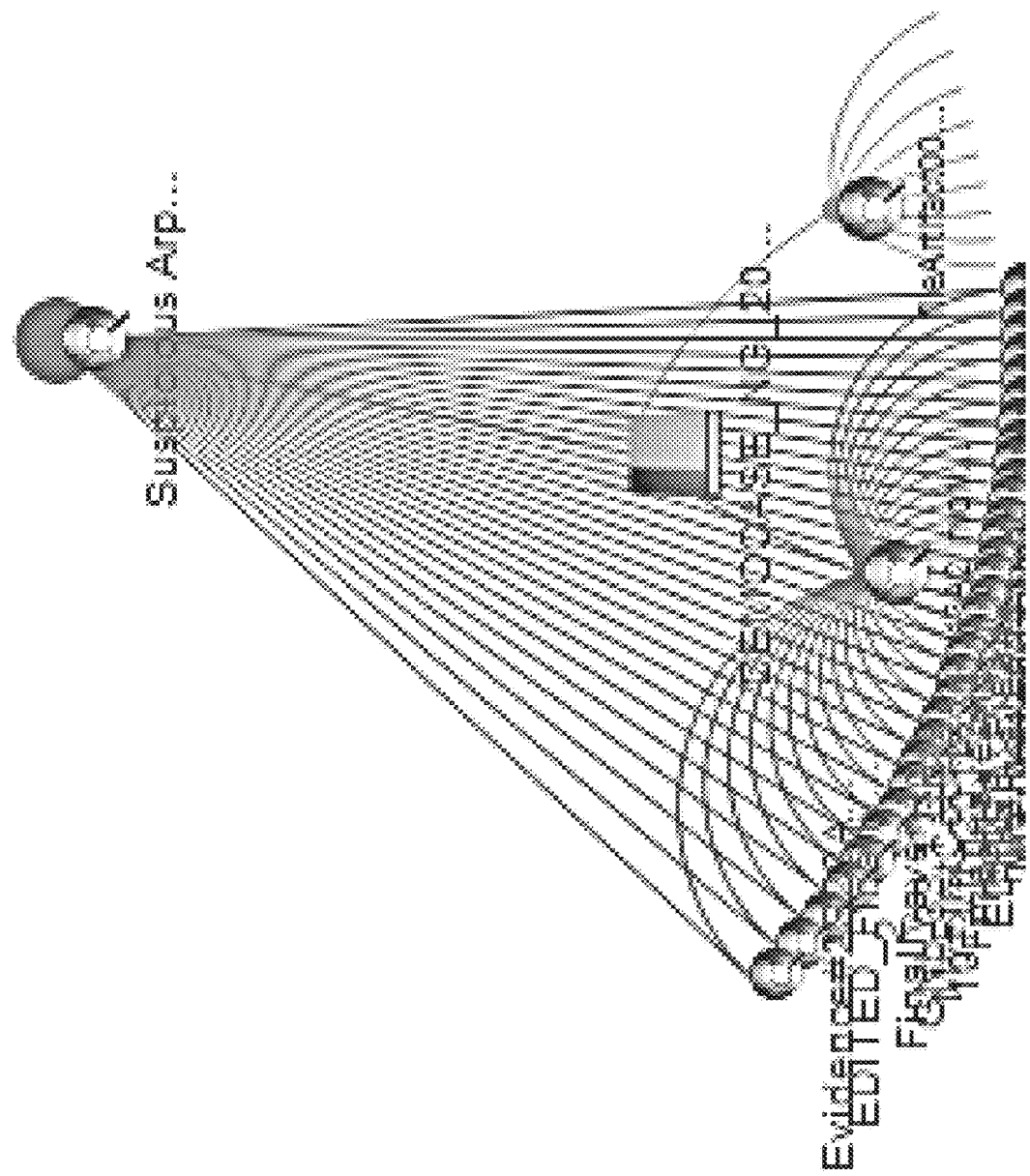

The user can navigate the hypertree diagram by clicking on the nodes (step 434; FIGS. 44 and 45). For example, in FIGS. 44 and 45, the user has clicked on "Suspicious Arp . . . " and so the diagram is centered around that particular node.

Figure 46:
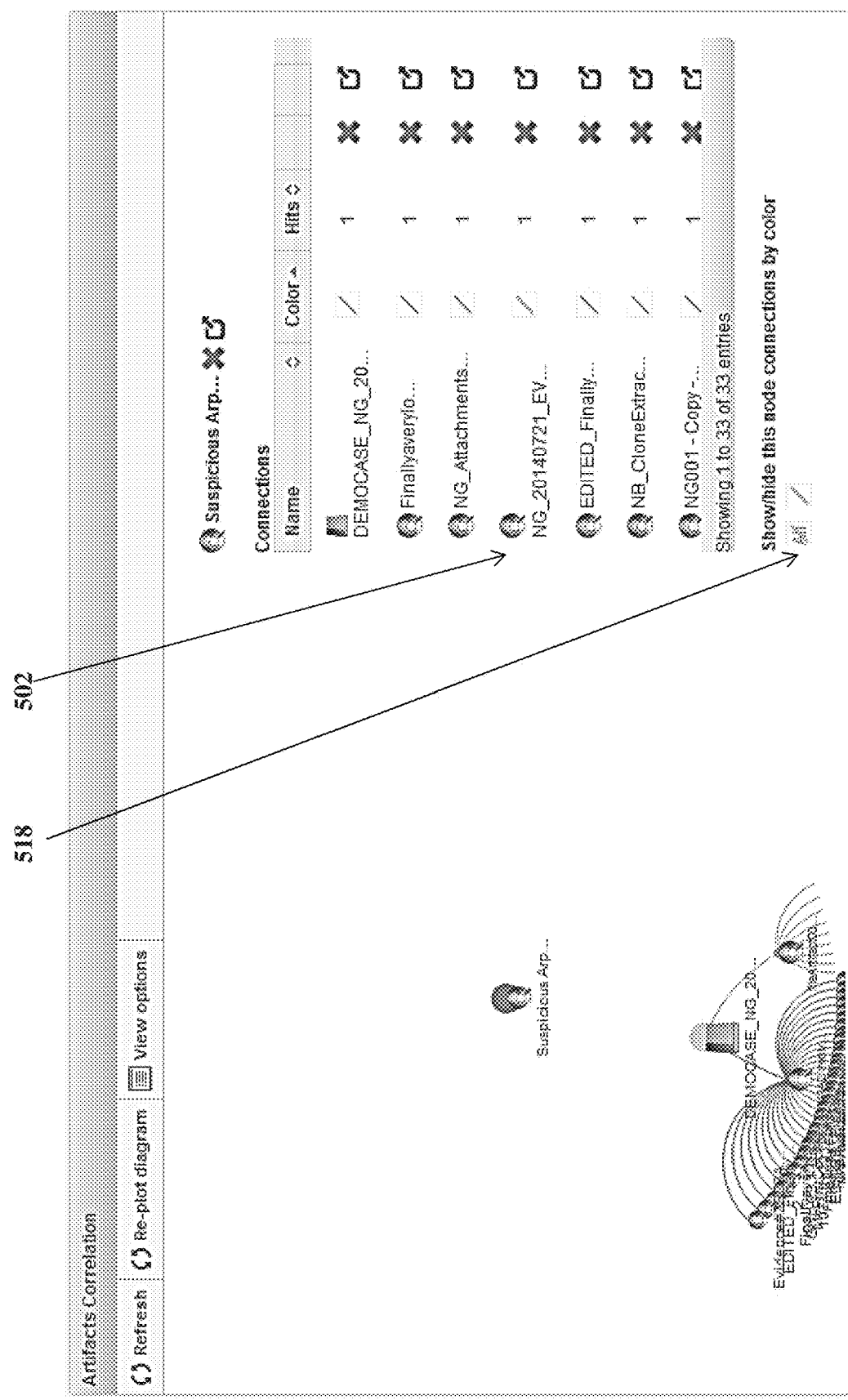
Figure 47:
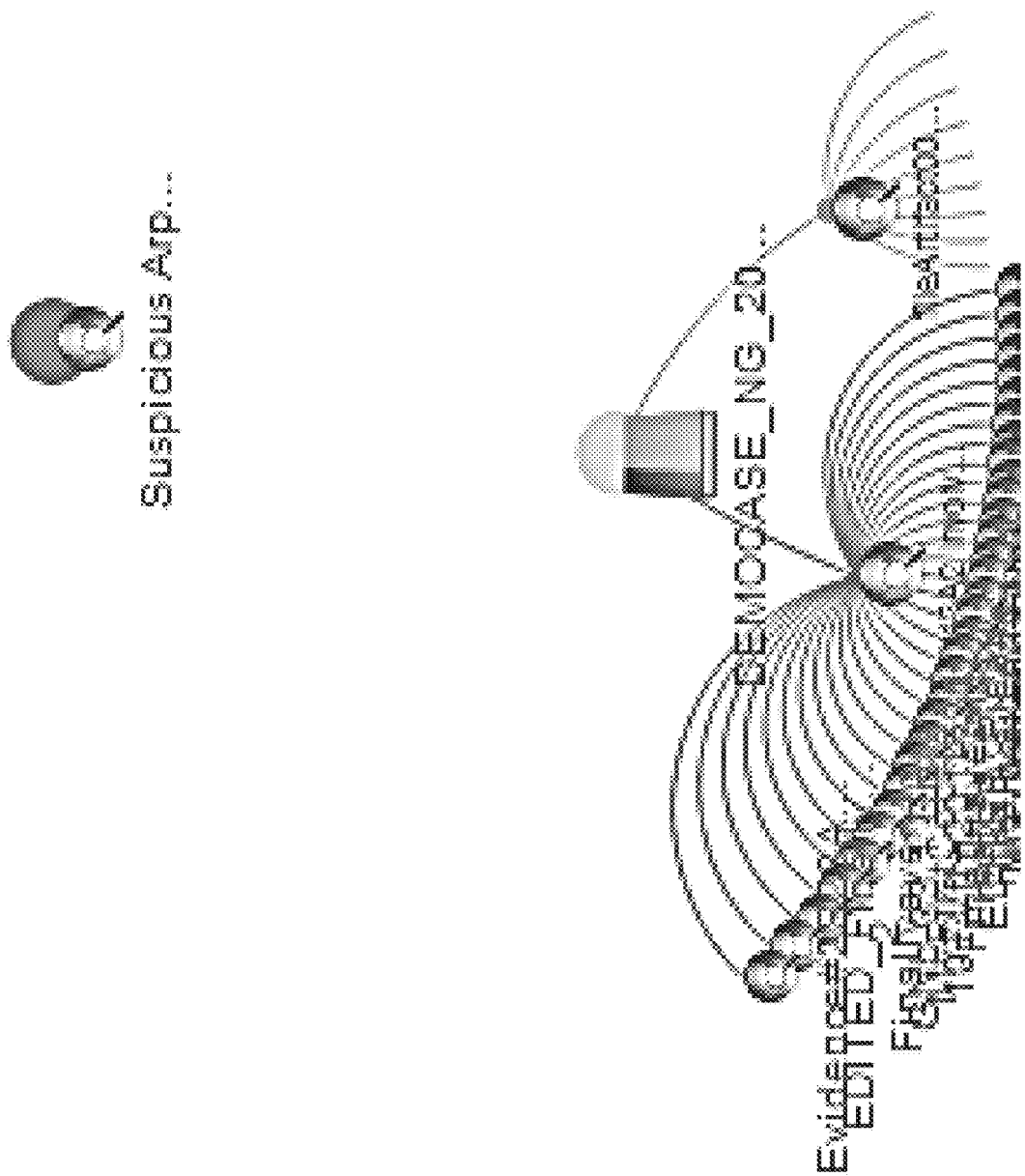

In FIGS. 46 and 47, the user has hidden all the current node connections by clicking on the "All" icon 518 under the table 502 (step 436).

There has been described a system and method for automated cybersecurity visualization and correlation. While several particular forms of the invention have been illustrated and described, it will be apparent that various modifications and combinations of the invention detailed in the text and drawings can be made without departing from the spirit and scope of the invention. Accordingly, it is not intended that the invention be limited, except as by the appended claims.

What is claimed is:

1. A method of correlating, visualizing and navigating cybersecurity information, comprising:

displaying a list of a plurality cybersecurity incidents on a display device of a computerized system;

receiving a first selection from a user of a first cybersecurity incident to be investigated from the displayed list of the plurality cybersecurity incidents;

correlating, through use of a correlation finder, one or more cybersecurity incident elements and one or more cybersecurity incidents of the plurality of cybersecurity incidents to the first cybersecurity incident by matching details of the one or more cybersecurity incident elements and the one or more cybersecurity incidents to the first cybersecurity incident, or, through use of an artifacts correlator, one or more artifacts of the plurality of cybersecurity incidents to the first cybersecurity incident by finding points of correlation between the one or more artifacts and the first cybersecurity incident;

displaying a hypertree on the display device of the computerized system, the displayed hypertree comprising a plurality of nodes linked by a plurality of edges, one of the plurality of nodes representing the first cybersecurity incident, one or more of the plurality of nodes representing the one or more cybersecurity incidents, and one or more of the plurality of nodes representing the one or more cybersecurity incident elements or the one or more artifacts of the plurality of cybersecurity incidents, the plurality of edges representing a specific relationship between the plurality of nodes linked by the plurality of edges, the specific relationship represented by the plurality of edges being the matching details of the one or more cybersecurity incident elements and the one or more cybersecurity incidents to the first cybersecurity incident, or the points of correlation between the one or more artifacts and the first cybersecurity incident;

receiving a second selection from the user of a first node of the plurality of nodes;

responsive to the second selection from the user of the first node, generating and displaying, through the computerized system, an interactive navigation aid to enable the user to navigate the hypertree, the interactive navigation aid being unique to the first node by displaying a table listing one or more nodes of the plurality of nodes linked to the first node by one or more edges of the plurality of edges, each of the one or more nodes of the plurality of nodes linked to the first node listed in the table displayed with at least one respective first user-selectable image for selectively eliminating a respective edge of the one or more edges of the plurality of edges without eliminating a respective node of the one or more nodes of the plurality of nodes linked to the first node in response to a first user selection of the at least one respective first user-selectable image and restoring the eliminated respective edge of the one or more edges of the plurality of edges in response to a second user selection of the at least one respective first user-selectable image and at least one respective second user-selectable image for selectively eliminating the respective node of the one or more nodes of the plurality of nodes linked to the first node and one or more edges of the plurality of edges linked to the respective node in response to a first user selection of the at least one respective second user-selectable image and restoring the eliminated respective node of the one or more nodes of the plurality of nodes linked to the first node and the one or more edges of the plurality of edges linked to the eliminated respective node in response to a second user selection of the at least one respective second user-selectable image, wherein the interactive navigation aid is displayed simultaneously with, and distinct from, the hypertree;

receiving at the computerized system a navigation command from the user through the interactive navigation aid comprising receiving a third selection from the user selecting either the at least one respective first user-selectable image or the at least one respective second user-selectable image displayed on the interactive navigation aid; and simulating alternative correlations of the one or more cybersecurity incidents and the one or more cybersecurity incident elements, or the one or more artifacts of the plurality of cybersecurity incidents, to the first cybersecurity incident, by the computerized system, in response to the navigation command, wherein the simulating alternative correlations in response to the navigation command comprises:

modifying, by the computerized system, the displayed hypertree by selective elimination of the respective node of the one or more nodes of the plurality of nodes linked to the first node and the one or more edges of the plurality of edges linked to the respective node in response to the user selecting the at least one respective second user-selectable image displayed on the interactive navigation aid, or selective elimination of the respective edge of the one or more edges of the plurality of edges without eliminating the respective node of the one or more nodes of the plurality of nodes linked to the first node in response to the user selecting the at least one respective first user-selectable image; and in response to modifying the displayed hypertree, receiving a fourth selection from the user of a displayed option to re-plot the hypertree; and in response to the fourth selection, replotting, by the computerized system, the modified hypertree centered on the one of the plurality of nodes representing the first cybersecurity incident.

2. The method of claim 1 wherein the one or more of the plurality of nodes representing the one or more cybersecurity incident elements include evidence, hosts, forensic images, and e-discovery objects.

3. The method of claim 1 wherein the computerized system enables the user to select an alikeness ratio defining a minimum alikeness that the one or more nodes of the plurality of nodes representing the one or more artifacts must have with respect to the one of the plurality of nodes representing the first cybersecurity incident in the hypertree, and the computerized system, in response to the user selecting the alikeness ratio, re-plots the hypertree to include the one or more nodes representing the one or more artifacts that exceed the alikeness ratio selected by the user.

4. The method of claim 1 wherein the computerized system enables the user to navigate the hypertree by selecting a second node of the plurality of nodes of the hypertree as a selected node.

5. The method of claim 4 wherein the interactive navigation aid includes a mechanism to enable the user to eliminate or restore the selected node in the displayed hypertree.

6. The method of claim 4 wherein the computerized system modifies the displayed hypertree in response to the user selecting the second node of the plurality of nodes as the selected node, at least by re-centering the displayed hypertree around the selected node.

7. The method of claim 1 wherein the interactive navigation aid includes a mechanism to enable the user to eliminate or restore all of the one or more edges of the plurality of edges linked to the first node in the displayed hypertree.

8. The method of claim 1 wherein the hypertree displays the plurality of edges differentiated by color and the interactive navigation aid enables the user to selectively eliminate or restore the plurality edges by the color.

9. The method of claim 1 wherein the interactive navigation aid includes a mechanism to enable the user to view details of any node of the one or more nodes of the plurality of nodes linked to the first node listed in the interactive navigation aid.

10. The method of claim 1 wherein the computerized system enables the user to zoom onto a portion of the displayed hypertree.

11. The method of claim 1 wherein the at least one respective second user-selectable image displayed on the interactive navigation aid is an icon representing the respective node of the plurality of nodes linked to the first node.

12. The method of claim 1 wherein the at least one respective first user-selectable image displayed on the interactive navigation aid is a colorbox representing the respective edge of the one or more edges of the plurality of edges.

13. An apparatus for correlating, visualizing, and navigating cybersecurity information, comprising:

a computerized processing system comprising a processor programmed to execute a correlation finder or an artifacts correlator; and a visual display system;

wherein the processor of the computerized processing system is programmed to:

display a list of a plurality cybersecurity incidents on the visual display system;

receive a first selection from a user of a first cybersecurity incident to be investigated from the displayed list of the plurality cybersecurity incidents;

correlate, through use of the correlation finder, one or more cybersecurity incident elements and one or more cybersecurity incidents of the plurality of cybersecurity incidents to the first cybersecurity incident by matching details of the one or more cybersecurity incident elements and the one or more cybersecurity incidents to the first cybersecurity incident, or, through use of the artifacts correlator, one or more artifacts of the plurality of cybersecurity incidents to the first cybersecurity incident by finding points of correlation between the one or more artifacts and the first cybersecurity incident;

display on the visual display system a hypertree comprising a plurality of nodes linked by a plurality of edges, one of the plurality of nodes representing the first cybersecurity incident, one or more of the plurality of nodes representing the one or more cybersecurity incidents, and one or more of the plurality of nodes representing the one or more cybersecurity incident elements or the one or more artifacts of the plurality of cybersecurity incidents, the plurality of edges representing a specific relationship between the plurality of nodes linked by the plurality of edges, the specific relationship represented by the plurality of edges being the matching details of the one or more cybersecurity incident elements and the one or more cybersecurity incidents to the first cybersecurity incident, or the points of correlation between the one or more artifacts and the first cybersecurity incident;

receive a second selection from the user of a first node of the plurality of nodes;

responsive to the second selection from the user of the first node, generate and display on the visual display system an interactive navigation aid to enable the user to navigate the hypertree, the interactive navigation aid being unique to the first node by displaying a table listing one or more nodes of the plurality of nodes linked to the first node by one or more edges of the plurality of edges, each of the one or more nodes of the plurality of nodes linked to the first node listed in the table displayed with at least one respective first user-selectable image for selectively eliminating a respective edge of the one or more edges of the plurality of edges without eliminating a respective node of the one or more nodes of the plurality of nodes linked to the first node in response to a first user selection of the at least one respective first user-selectable image and restoring the eliminated respective edge of the one or more edges of the plurality of edges in response to a second user selection of the at least one respective first user-selectable image and at least one respective second user-selectable image for selectively eliminating the respective node of the one or more nodes of the plurality of nodes linked to the first node and one or more edges of the plurality of edges linked to the respective node in response to a first user selection of the at least one respective second user-selectable image and restoring the eliminated respective node of the one or more nodes of the plurality of nodes linked to the first node and the one or more edges of the plurality of edges linked to the eliminated respective node in response to a second user selection of the at least one respective second user-selectable image, wherein the interactive navigation aid is displayed simultaneously with, and distinct from, the hypertree;

receive a navigation command from the user through the interactive navigation aid comprising a third selection from the user selecting either the at least one respective first user-selectable image or the at least one respective second user-selectable image displayed on the interactive navigation aid; and simulate alternative correlations of the one or more cybersecurity incidents and the one or more cybersecurity incident elements, or the one or more artifacts of the plurality of cybersecurity incidents, to the first cybersecurity incident, in response to the navigation command, comprising:

modifying the displayed hypertree by selective elimination of the respective node of the one or more nodes of the plurality of nodes linked to the first node and the one or more edges of the plurality of edges linked to the respective node in response to the user selecting the at least one respective second user-selectable image displayed on the interactive navigation aid, or selective elimination of the respective edge of the one or more edges of the plurality of edges without eliminating the respective node of the one or more nodes of the plurality of nodes linked to the first node in response to the user selecting the at least one respective first user-selectable image; and in response to modifying the displayed hypertree, receive a fourth selection from the user of a displayed option to re-plot the hypertree; and in response to the fourth selection, replot the modified hypertree centered on the one of the plurality of nodes representing the first cybersecurity incident.

14. A computer-readable, non-transitory, tangible medium comprising software that, when executed by a processor, causes the processor to perform a method of correlating, visualizing, and navigating cybersecurity information, comprising:

displaying a list of a plurality cybersecurity incidents on a display device of a computerized system;

receiving a first selection from a user of a first cybersecurity incident to be investigated from the displayed list of the plurality cybersecurity incidents;

correlating, through use of a correlation finder, one or more cybersecurity incident elements and one or more cybersecurity incidents of the plurality of cybersecurity incidents to the first cybersecurity incident by matching details of the one or more cybersecurity incident elements and the one or more cybersecurity incidents to the first cybersecurity incident, or, through use of an artifacts correlator, one or more artifacts of the plurality of cybersecurity incidents to the first cybersecurity incident by finding points of correlation between the one or more artifacts and the first cybersecurity incident;

displaying a hypertree on the display device of the computerized system, the displayed hypertree comprising a plurality of nodes linked by a plurality of edges, one of the plurality of nodes representing the first cybersecurity incident, one or more of the plurality of nodes representing the one or more cybersecurity incidents, and one or more of the plurality of nodes representing the one or more cybersecurity incident elements or the one or more artifacts of the plurality of cybersecurity incidents, the plurality of edges representing a specific relationship between the plurality of nodes linked by the plurality of edges, the specific relationship represented by the plurality of edges being the matching details of the one or more cybersecurity incident elements and the one or more cybersecurity incidents to the first cybersecurity incident, or the points of correlation between the one or more artifacts and the first cybersecurity incident;

receiving a second selection from the user of a first node of the plurality of nodes;

responsive to the second selection from the user of the first node, generating and displaying, through the computerized system, an interactive navigation aid to enable the user to navigate the hypertree, the interactive navigation aid being unique to the first node by displaying a table listing one or more nodes of the plurality of nodes linked to the first node by one or more edges of the plurality of edges, each of the one or more nodes of the plurality of nodes linked to the first node listed in the table displayed with at least one respective first user-selectable image for selectively eliminating a respective edge of the one or more edges of the plurality of edges without eliminating a respective node of the one or more nodes of the plurality of nodes linked to the first node in response to a first user selection of the at least one respective first user-selectable image and restoring the eliminated respective edge of the one or more edges of the plurality of edges in response to a second user selection of the at least one respective first user-selectable image and at least one respective second user-selectable image for selectively eliminating the respective node of the one or more nodes of the plurality of nodes linked to the first node and one or more edges of the plurality of edges linked to the respective node in response to a first user selection of the at least one respective second user-selectable image and restoring the eliminated respective node of the one or more nodes of the plurality of nodes linked to the first node and the one or more edges of the plurality of edges linked to the eliminated respective node in response to a second user selection of the at least one respective second user-selectable image, wherein the interactive navigation aid is displayed simultaneously with, and distinct from, the hypertree;

receiving at the computerized system a navigation command from the user through the interactive navigation aid comprising receiving a third selection from the user selecting either the at least one respective first user-selectable image or the at least one respective second user-selectable image displayed on the interactive navigation aid; and simulating alternative correlations of the one or more cybersecurity incidents and the one or more cybersecurity incident elements, or the one or more artifacts of the plurality of cybersecurity incidents, to the first cybersecurity incident, by the computerized system, in response to the navigation command, wherein the simulating alternative correlations in response to the navigation command comprises:

modifying, by the computerized system, the displayed hypertree by selective elimination of the respective node of the one or more nodes of the plurality of nodes linked to the first node and the one or more edges of the plurality of edges linked to the respective node in response to the user selecting the at least one respective second user-selectable image displayed on the interactive navigation aid, or selective elimination of the respective edge of the one or more edges of the plurality of edges without eliminating the respective node of the one or more nodes of the plurality of nodes linked to the first node in response to the user selecting the at least one respective first user-selectable image; and in response to modifying the displayed hypertree, receiving a fourth selection from the user of a displayed option to re-plot the hypertree; and in response to the fourth selection, replotting, by the computerized system, the modified hypertree centered on the one of the plurality of nodes representing the first cybersecurity incident.

* * * * *